United States Patent [19]
Watanabe et al.

[11] Patent Number: 5,942,740
[45] Date of Patent: Aug. 24, 1999

[54] METHOD AND APPARATUS FOR READING BAR CODES

[75] Inventors: Mitsuo Watanabe; Motohiko Itoh; Shinichi Satoh; Hiroaki Kawai; Isao Iwaguchi, all of Kawasaki, Japan

[73] Assignee: Fujitsu Limited, Kawasaki, Japan

[21] Appl. No.: 08/873,719

[22] Filed: Jun. 12, 1997

[30] Foreign Application Priority Data

Oct. 28, 1996 [JP] Japan .................................. 8-285648

[51] Int. Cl.⁶ .................................................. G06K 7/10
[52] U.S. Cl. ............................. 235/462.07; 235/462.16
[58] Field of Search ........................... 235/462.12, 462.01, 235/462.07, 462.16, 462.18, 494

[56] References Cited

U.S. PATENT DOCUMENTS

| | | |
|---|---|---|
| 5,036,182 | 7/1991 | Ouchi et al. ..................... 235/462.07 |
| 5,189,289 | 2/1993 | Watanabe ........................... 235/437 |
| 5,457,308 | 10/1995 | Spitz et al. ...................... 235/462.12 |
| 5,686,715 | 11/1997 | Watanabe et al. ................. 235/462.08 |
| 5,780,832 | 7/1998 | Watanabe et al. ................. 235/462.26 |

*Primary Examiner*—Donald Hajec
*Assistant Examiner*—Diane I. Lee
*Attorney, Agent, or Firm*—Staas & Halsey

[57] ABSTRACT

A method and an apparatus for reading a bar code are in which a plurality of types of bar codes which may coexist can be demodulated with higher accuracy and higher speed. A bar code data detector 31 extracts the features of a guard bar and a center bar. This information is searched for by a search section 39a and the features and the bar code types read are identified. The bar code data are demodulated in a bar code demodulator 32 by a method corresponding to the result of identification of the features and the bar code types.

32 Claims, 50 Drawing Sheets

DECDIRE FLAG=1: SGB IS DETECTED

DECDIRE FLAG=2: EGB IS DETECTED

DECDIRE FLAG=3: CB IS DETECTED

DECDIRE FLAG=4: SCB IS DETECTED

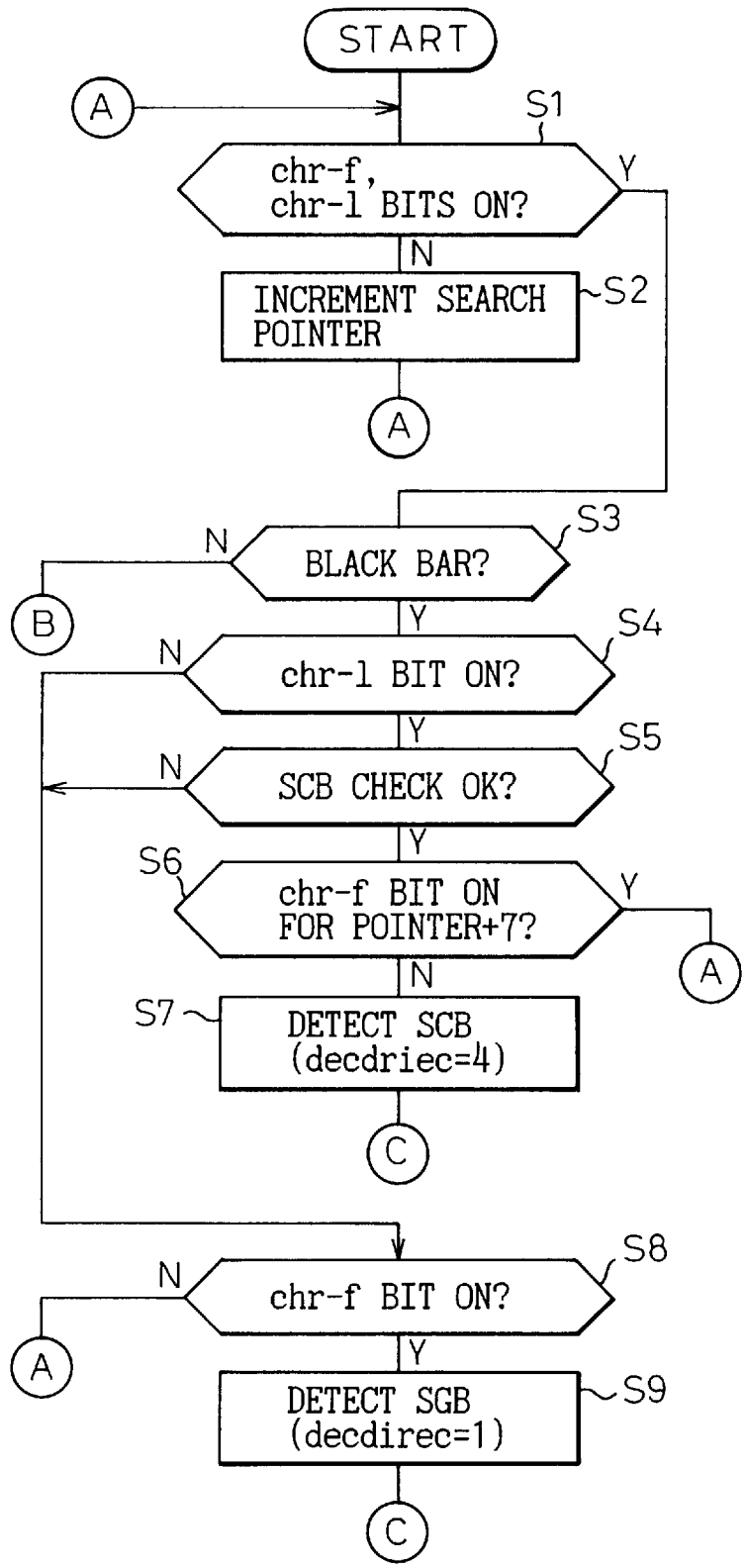

BAR WIDTH COUNTER BUFFER

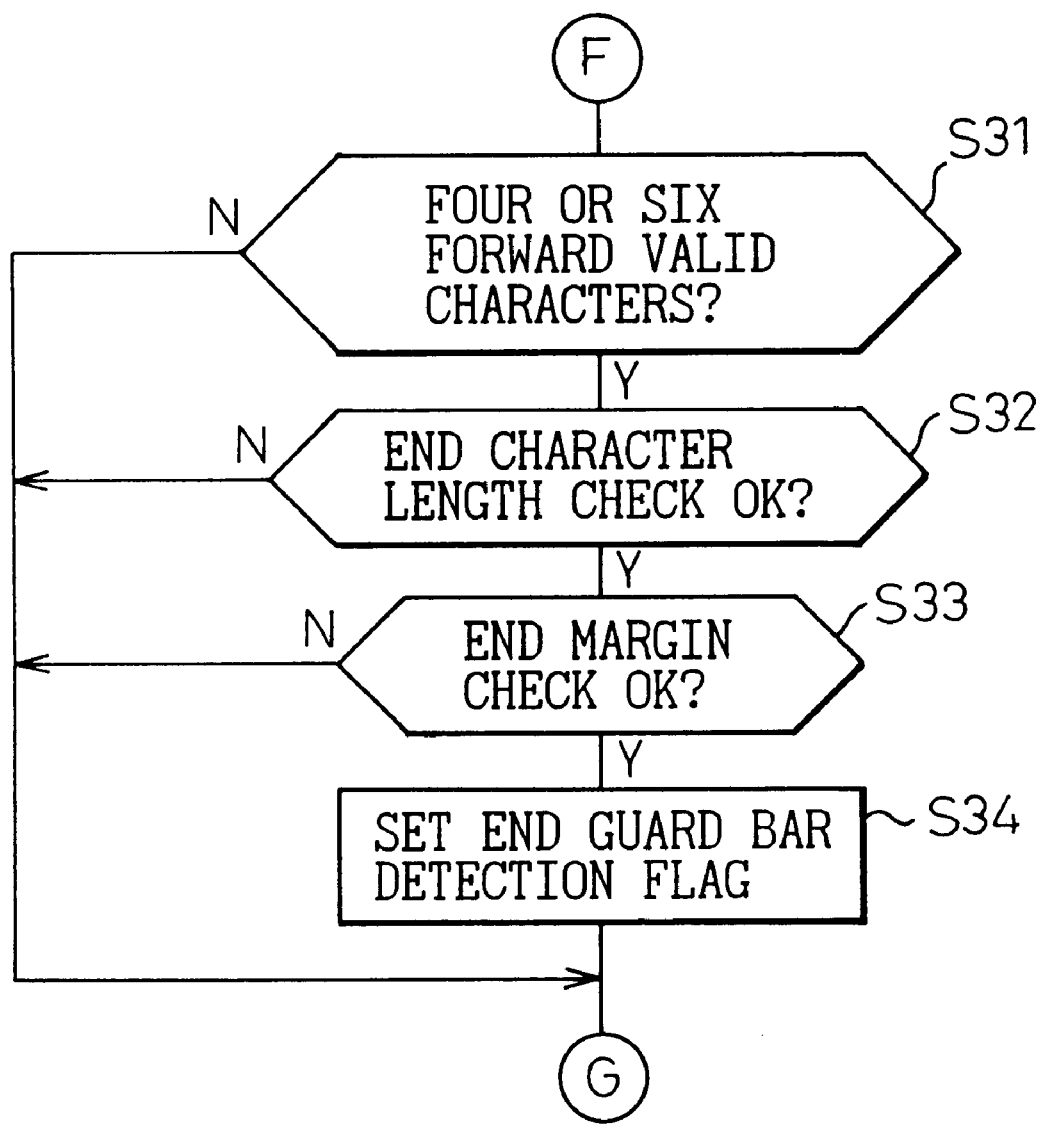

decdirec FLAG SET TO 01 decdirec FLAG SET TO 02 decdirec FLAG SET TO 03 decdirec FLAG SET TO 04 decdirec FLAG SET TO 05

Fig.33A

| LABEL FLAG | TYPE OF DEMODULATED BAR CODE |
|---|---|
| 01 | EAN-13 |
| 02 | EAN-8 |
| 03 | UPC-E |

Fig.33B

| LABEL FLAG | DIREC FLAG | SCANNING DIRECTION |
|---|---|---|
| 01 | 01 | SINGLE SWEEP OR FROM LEFT BLOCK |
| 01 | 02 | FROM RIGHT BLOCK |
| 01 | 03 | INCLUDING CB |
| 02 | 01 | SINGLE SWEEP OR FROM LEFT BLOCK |
| 02 | 02 | FROM RIGHT BLOCK |
| 03 | 01 | BLOCK MODULATION OR INCLUDING SCB |
| 03 | 03 | INCLUDING EGB |

| label=1 (EAN-13) | direc=1 | STORE IN lgbf ×× (13 STAGES) |
|---|---|---|
| | direc=2 | STORE IN rgbf ×× (13 STAGES) |
| | direc=3 | STORE IN cbbf ×× (10 STAGES) |
| label=2 (EAN-8) | direc=1 | STORE IN ean8_l× (5 STAGES) |
| | direc=2 | STORE IN ean_r× (5 STAGES) |
| label=3 (UPC-E) | direc=1 | STORE IN upce_s× (10 STAGES) |
| | direc=2 | STORE IN upce_e× (10 STAGES) |

Fig.41A

| | | |
|---|---|---|
| | 0 | ean8_l1 AND ean8_r1 |
| | | ean8_l1 AND ean8_r2 |
| | | ean8_l1 AND ean8_r3 |
| | | ean8_l1 AND ean8_r4 |
| EAN-8 | | ean8_l1 AND ean8_r5 |
| SYNTHESIS | | ean8_l2 AND ean8_r1 |
| BUFFER | | |
| | | |
| | | |
| | 24 | ean8_l5 AND ean8_r5 |
| | 25 | upce_s1 AND upce_e1 |
| | | upce_s1 AND upce_e2 |
| | | upce_s1 AND upce_e3 |
| | | upce_s1 AND upce_e4 |
| | | upce_s1 AND upce_e5 |
| | | upce_s1 AND upce_e6 |
| | | upce_s1 AND upce_e7 |
| UPC-E | | upce_s1 AND upce_e8 |
| SYNTHESIS | | upce_s1 AND upce_e9 |
| BUFFER | | upce_s1 AND upce_e10 |
| | | upce_s2 AND upce_e1 |
| | | |
| | | |
| | | |
| | 124 | upce_s10 AND upce_e10 |

Fig.41B

| | |
|---|---|
| b7 = 1 | SYNTHESIZED |
| = 0 | NOT YET SYNTHESIZED |
| b6 = 1 | M10   OK |
| = 0 | NG |
| b0 = 1 | BLOCK |
| = 0 | SEPARATED |

→ ONE (TWO) VALID DATA

← TWO (ONE) VALID DATA

[EQUATION 1]

$1.25 \cdot T1 < T2 < 0.75 \cdot T1$
$1.25 \cdot T2 < T3 < 0.75 \cdot T2$
$1.25 \cdot T3 < T4 < 0.75 \cdot T3$

[EQUATION 2]

$1.2 \cdot T1 < T2 < 0.8 \cdot T1$
$1.2 \cdot T2 < T3 < 0.8 \cdot T2$
$1.2 \cdot T3 < T4 < 0.8 \cdot T3$
$1.2 \cdot T4 < T5 < 0.8 \cdot T4$

METHOD AND APPARATUS FOR READING BAR CODES

BACKGROUND OF THE INVENTION

1. Field of the Invention

The present invention relates to a method and an apparatus for reading bar codes.

In recent years, information input using bar codes are widely used for registering and settling the account for commodities purchased by customers in shops as well as for the commodity and product management in warehouses and distribution areas.

2. Description of the Related Art

Various bar codes are in use now for different applications. If a bar code reader can meet the requirements of only a specific type of bar code, it cannot accommodate a plurality of types of bar code which may be required to be read in shops and warehouses. Installation of a plurality of bar code readers which would be required to meet this requirement would accompany an added installation cost and space. Also, installation of a plurality of bar code readers in such a case has no practical value.

In view of this fact, a single bar code reader can desirably read a plurality of types of bar codes which may be attached to commodities and articles.

Since various bar codes have different methods of recording numerical values and characters, however, the demodulation for reproducing numerical values and the like from a bar code requires a processing method corresponding to that of the particular bar code.

A bar code of any type has a feature (partition) specific to the particular bar code type. For this reason, determining the type of a bar code which has been read requires a search for the feature of each bar code type. Depending on the manner in which a bar code is read, however, a bar code configuration analogous to the type b in features may be read when the bar code of type a is actually being read. In such a case, the demodulation is performed for the type b the bar code, and the bar code a cannot be demodulated, thereby leading to a read error.

SUMMARY OF THE INVENTION

Accordingly, a first object of the invention is to provide a method and an apparatus for reading bar codes in which, in the case where a plurality of bar code types coexist, a feature (partition) representing a specific bar code type is extracted with a higher accuracy and a demodulation process in accordance with the respective bar code type.

Another object of the invention is to provide a method and an apparatus for reading bar codes, in which the scanning type including the direction of scanning bar codes is determined, and in the case where a bar code scanned is read by a scanning type difficult to extract the features from, the features are extracted by another scanning type in which the particular bar code is scanned and read, thereby substantially eliminating any error in feature (partition) extraction.

Still another object of the invention is to provide a method and an apparatus for reading a bar code in which, in the case where a bar code is of a type difficult to extract the features (partitions) from, the reading result is checked more strictly than in the case where the bar code is of another type less difficult to extract the features from, thereby preventing an erroneous reading of the bar code.

Still another object of the invention is to provide a method and an apparatus for reading a bar code that allows operators to scan the surface of the bar code with different scan lines in the direction perpendicular to, or at a wider angle to the bars arranged in the bar code, thereby reducing the time to read the bar code.

In order to solve the above-mentioned problems, according one aspect of the present invention, there is provided a method for reading a bar code having at least one code block representing a plurality of characters and partitions flanked beside the block, comprising the steps of:

scanning the surface of the bar code with different scan lines;

measuring the widths of the bars and widths of the spaces between the bars in each scan line;

storing a plurality of row of data in a storage, each row of data having a plurality of bar width and space width data obtained by scanning the bar code with each scan line;

extracting partition indicating data each having a series of bar width and space width data each corresponding to a partition and an adjacent character to the partition in the bar code from the row of data memorized in the storage;

appending a first flag to the partition indicative data, which represents the scanning sequence (chr-f, chr-l) indicating which is scanned first from among the partition and the adjacent character;

appending a second flag to the partition indicative data, which is necessary for determining the type of the partition;

determining whether the partition is a first type (center bar) or a second type (special center bar) based on the bar configuration of the partition; and determining the type and the direction of each scan line scanned when obtaining each partition indicative data based on the state of the first flag, the second flag and thus determined type of the partition.

In the method of the invention, whether the partition is the first type (center bar) or the second type (special center bar) is determined based on whether or not a character adjacent to the partition exists after the partition is scanned.

In the method of the invention, the first flag is set in a buffer that stores bar width data or space width data in the partition indicative data corresponding to a bar or a bar spacing appearing in a predetermined order in the bar code in accordance with the scanning sequence.

In the method of the invention, it is determined that the partition indicative data includes data for a first type of partition (center bar) if a first delta distance that is the sum of widths of a first bar and a first space adjacent to the first bar in the partition is substantially the same as a second delta distance that is the sum of widths of the first space and a second bar adjacent to the first space in the partition, and the successive delta distances are also substantially the same up to a predetermined time repeatedly, while it is determined that the partition indicative data includes data for a second type of partition (special center bar) if the delta distances are substantially the same up to another predetermined time repeatedly, when data for the first type of partition (center bar) or the second type of partition (special center bar) is included in the partition indicative data.

In the method of the invention, it is determined that the partition indicative data includes data for a first type of partition (center bar) if a first delta distance that is the sum of widths of a first bar and a first space adjacent to the first bar in the partition is substantially the same as a second delta distance that is the sum of widths of the first space and a second bar adjacent to the first space in the partition, and the successive delta distances are also substantially the same up to a predetermined time repeatedly, while it is determined that the partition indicative data includes data for a second type of partition (special center bar) if the delta distances are substantially the same up to another predetermined time repeatedly, when two kinds of first flags are set in a partition indicative data.

In the method of the invention, when different flags (chr-f, chr-l) representing the scanning sequences are set in a bar width data or a space width data, which flag is true may be determined by checking lengths of two successive characters adjacent to the partition to be scanned after the partition is scanned in the bar code.

In the method of the invention, the type of a bar code is determined based on the existence of a margin having a predetermined length on one side of the partition in the bar code when the bar code type to be determined has a predetermined bar configuration in at least one part of the partition.

The method of the invention further comprises:

a first step for checking whether or not the length of a first character adjacent to the partition in the forward scanning direction in each scan line is within the predetermined length from each row of data after the partition indicative data is extracted, the row of data being obtained by scanning the bar code with each scan line;

a second step for determining that the first character is true if the checking result in the first step is affirmative;

a third step for calculating lengths of a plurality of successive characters adjacent to the first character in the forward scanning direction in each scan line;

a fourth step for executing an adjacent character length check between a plurality of successive characters adjacent to the partition in the forward scanning direction in each scan line in which the adjacent character length check compares the length of a first character determined to be true to the length of a second character adjacent to the first character and determines that the second character is true if the difference between the lengths is within the determined length;

a fifth step for executing the first step to the fourth step for a plurality of successive characters adjacent to the partition in the backward scanning direction in each scan line;

a sixth step for counting the number of the successive characters which are determined to be true as a result of the execution of the above steps in each block in each scan line;

a seventh step for determining if each row of data is a first type bar code having characters on one side of the partition or a second type bar code having characters on both sides of the partition based on the number counted in the sixth step.

In the method of the invention, partially scanned data obtained by scanning along separate scan lines that pass through a partition and a part of a block adjacent to the partition in the bar code are extracted from a plurality of row of data based on the number of characters counted in each block.

According to other aspect of the present invention, there is provided a method for reading a bar code having at least one code block representing a plurality of characters and partitions flanked beside the block, comprising the steps of:

scanning the surface of the bar code with different scan lines;

reading a plurality of different scan data obtained by scanning along the different scan lines;

storing the plurality of different scan data in a storage;

extracting partially scanned data obtained by scanning along separate scan lines that pass through a partition and a part of a block adjacent to the partition in the bar code from the plurality of scan data stored in the storage;

reproducing a plurality of partially decoded data from the partially scanned data;

extracting a pair of decoded data from the partially decoded data each having the number of character digits overlapped each other and having a different partition respectively;

calculating the number of character digits overlapped between the pair of extracted decoded data;

reading the bar code by synthesizing the pair of decoded data when the calculated number is equal to or more than the determined value in response to the type of the bar code.

In the method of the invention, it further comprises the steps of:

determining whether the number of the data representing the same character exist in each of the pair of decoded data is equal to or more than the predetermined number;

reading the bar code by synthesizing the pair of decoded data when the above determining result is affirmative.

In the method of the invention, the determined number is set depending on the type of the bar code.

In order to solve the above-mentioned problems, according other aspect of the present invention, there is provided an apparatus for reading a bar code having at least one code block representing a plurality of characters and partitions flanking the block, comprising:

an optical source for illuminating the bar code;

a scanning mechanism for applying the light projected from the optical source to the surface of the bar code along a plurality of scanning lines;

an optical receiving means for receiving the light reflected from the surfaces of the bar code after the light illuminates the bar code;

a counter for measuring bar widths and space widths alternatively appearing in each scan line in response to the output of the optical receiving means;

a storage for storing each row of data having a plurality of bar width and space width data obtained from the bar width counter by scanning the bar code each time with each scan line;

an extracting means for extracting partition indicative data each having a series of bar width and bar space width data from the memorized row of data corresponding to a partition and an adjacent character to the partition in the bar code;

a flag appending means for appending a first flag to the partition indicative data which represents the scanning sequence (chr-f, chr-l) indicating which is scanned first from among the partition and the adjacent character, and for appending a second flag to the partition indicative data which is necessary for determining the type of the partition; and a scanning line type determining means for determining the type and direction of each scan line scanned when obtaining each partition indicative data based on the state of the first flag, the second flag and the type of the partition determined as a first type (center bar) or a second type (special center bar) based on the bar configuration of the partition.

In the apparatus of the invention, a first partition determining means for determining whether the partition is the first type (center bar) or the second type (special center bar) based on whether or not a character adjacent to the partition exists after the partition is scanned.

In the apparatus of the invention, the first flag is set in a buffer that stores bar width data or space width data in the partition indicative data corresponding to a bar or a space appearing in a predetermined order in the bar code in accordance with the scanning sequence.

The apparatus of the invention further comprises a second partition determining means for determining that the partition indicative data includes data for a first type partition (center bar) if a first delta distance that is the sum of widths of a first bar and a first space adjacent to the first bar in the partition is substantially the same as a second delta distance that is the sum of widths of the first space and a second bar adjacent to the first space in the partition, and the successive delta distances are also substantially the same up to a predetermined time repeatedly, while determining that the partition indicative data includes data for a second type partition (special center bar) if the delta distances are substantially the same up to another predetermined time repeatedly, when data for the first type (center bar) or the second type (special center bar) is included in the partition indicative data.

The apparatus of the invention further comprises a second partition determining means for determining that the partition indicative data includes data for a first type partition (center bar) if a first delta distance that is the sum of widths of a first bar and a first space adjacent to the first bar in the partition is substantially the same as a second delta distance that is the sum of widths of the first space and a second bar adjacent to the first space in the partition, and the successive delta distances are also substantially the same up to a predetermined time repeatedly, while determining that the partition indicative data includes data for a second type partition (special center bar) if the delta distances are substantially the same up to another predetermined time repeatedly, when two kinds of first flags are set in a partition indicative data.

In the apparatus of the invention, when different flags (chr-f, chr-l) representing types of scan lines are set in a bar width data or a space width data, which flag is true may be determined by checking lengths of two successive characters adjacent to the partition to be scanned after the partition is scanned in the bar code.

The apparatus of the invention further comprises a third partition determining means for determining the types of a bar code based on the existence of a margin having a predetermined length on one side of the partition of the bar code when the type of the bar code to be determined has a predetermined bar configuration in at least one part of the partition.

The apparatus of the invention further comprises;

a character number counting means for respectively counting the number of successive characters determined as true characters in each block in each scanning line, each of characters being determined as a true character if the length of the character is within the predetermined length based on each row of data that are obtained by scanning the bar code with each scan line, the characters being adjacent to the partition in both forward and backward scanning directions in each scanning line, after the partition indicative data is extracted from the row of data; and a bar code type determining means for determining whether or not each row of data includes a first type bar code having characters on one side of the partition or a second type bar code having characters on both sides of the partition based on the number counted by the counting means.

In the apparatus of the invention, partially scanned data obtained by scanning along separate scan lines that pass through a partition and a part of a block adjacent to the partition in the bar code are extracted from a plurality of the row of data based on the number counted by the counting means.

According to other aspect of the present invention, there is provided an apparatus for reading a bar code having at least one code block representing a plurality of characters and partitions flanking the block, comprising:

a scanned data reading means for reading a plurality of scanned data obtained by scanning the surface of the bar code with different scanning lines;

a storage for storing the plurality of scanned data;

a first extracting means for extracting partially scanned data obtained by scanning along separate scanning lines that pass through a partition and a part of a block adjacent to the partition in the bar code from the plurality of scanned data stored in the storage;

a reproducing means for reproducing a plurality of partially decoded data from the partially scanned data;

a second extracting means for extracting a pair of partially decoded data each having the number of character digits mutually overlapped and having a different partition respectively;

a calculating means for calculating the number of character digits overlapped between the pair of extracted partially decoded data; and a synthesizing means for synthesizing the pair of decoded data when the calculated number is equal to or more than the determined value.

In an apparatus of the invention, the synthesizing means determines whether the number of the data representing the same character exist in each of the pair of decoded data is equal to or more than the predetermined number and reads the bar code after synthesizing the pair of decoded data when the above determining result is affirmative.

In an apparatus of the invention, the determined number is set depending on the type of the bar code.

BRIEF DESCRIPTION OF THE DRAWINGS

FIG. 11A is a flowchart showing the primary processing of bar code search.

FIGS. 21A and 21B are a flowchart showing the secondary processing of bar code search.

FIGS. 33A and 33B are tables showing the output of the bar code demodulation processing.

FIG. 41A is a diagram showing a configuration of a pairing buffer.

FIG. 41B is a diagram showing the UPC/E pairing configuration.

DESCRIPTION OF THE PREFERRED EMBODIMENTS

Figure 1A:
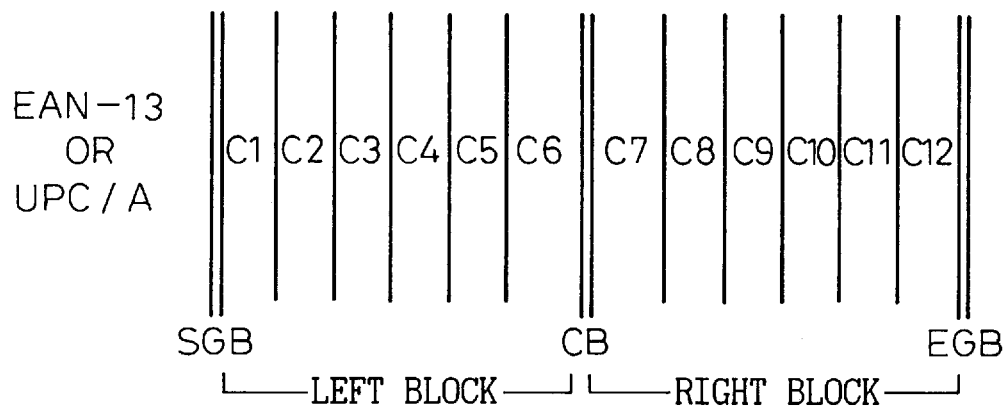
FIGS. 1A, 1B and 1C are diagrams showing configurations of EAN-13, EAN-8 and UPC/E.
Figure 1B:
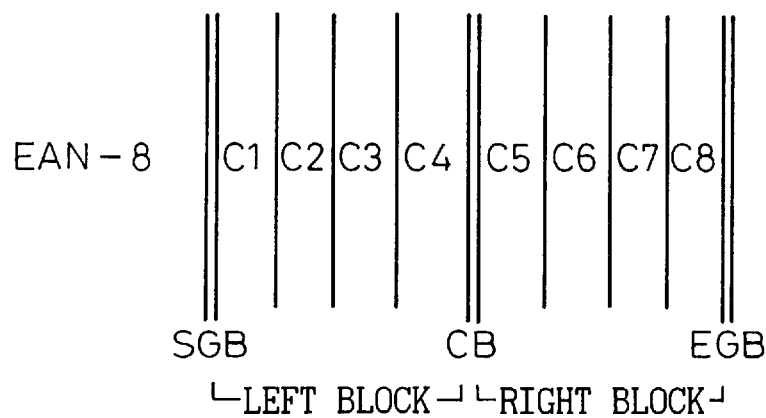
Figure 1C:
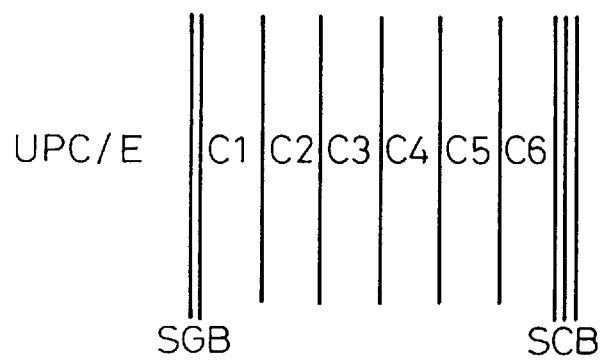

FIGS. 1A, 1B and 1C are diagrams showing UPC (Universal Product Code) type bar codes currently used.

FIG. 1A shows a bar code called EAN-13 or UPC-A. FIG. 1B shows a bar code called EAN-8. FIG. 1C shows a bar code called UPC/E. EAN is an abbreviation of European Article Numbering.

EAN-13 has a start guard bar (hereinafter referred to as SGB) at the starting end thereof, an end guard bar (hereinafter referred to as EGB) at the tail end thereof and a center bar (hereinafter referred to as CB) at the center thereof. EAN-13, therefore, can be segmented into the left block on SGB side and the right block on EGB side on both sides of the CB. The left block of EAN-13 is configured of six characters C1 to C6 and the right block thereof of six characters C7 to C12. Thus EAN-13 has a total of 12 digits. Each character is represented by two each of white and black bars for a total of four white and black bars arranged alternately wherein the term white bars mean spaces between the black bars.

The bar configuration of SGB, EGB, CB and characters are represented in unit lengths called modules. One character is configured of a total of seven modules including white and black bars. Within the range of seven modules, white and black bars are combined appropriately to record numerals 0 to 9. SGB/EGB have three modules in an alternate arrangement of black/white/black bars each having one module. The bar configuration is the same for SGB and EGB. In the case where no special distinction is required between them they are simply called GB (guard bar). The CB has a total of five modules in an alternate arrangement of white/black/white/black/white bars each having one module. With this configuration, the GB and CB can be handled as a reference bar having a reference bar width for bar code reading.

EAN-8, like EAN-13, is configured of a SGB, an EGB and a CB and has right and left blocks. The difference between EAN-8 and EAN-13 lies in the number of characters configuring the bar code. The left block of EAN-8 has four characters C1 to C4, and the right block thereof has four characters C5 to C8 for a total of eight characters. The configuration of specific characters and the CB are identical totally to those of EAN-13.

EAN-13 has different character configurations between right and left blocks. One character is represented by seven modules requiring two black bars. The characters, therefore, are of two types according to the total number of modules of black bars: even number (even configuration) and odd number (odd configuration). Each character in the right block is configured of an even number of modules of black bars. The left block, on the other hand, has both types of characters in coexistence, in which characters having an even number of modules are mixed with those having an odd number of modules of black bars (odd/even mixture). The combination of odd and even configurations for the left block is specified by a particular digit of the odd/even mixture.

By checking the bar configuration of the characters making up the bar code, it is possible to determine which block is scanned or in which direction the bar code is scanned.

UPC/E, unlike EAN-13 or EAN-8, has no block corresponding to the right block of the latter. UPC/E is configured in such a manner that characters are sandwiched between a SGB and a center bar called a special center bar (hereinafter after referred to as SCB) having a different configuration from the CB of EAN-13 or the like. SCB has an alternate arrangement of three white bars and three black bars each having one module for a total of six modules. UPC/E is configured of six characters C1 to C6 and apparently has the same configuration as one of the blocks of EAN-13. Also, UPC/E has a configuration of odd/even mixture, which makes an apparent analogy with EAN-13.

For EAN-13 and EAN-8, each bar code data is established only in a combination of right and left blocks. In the case where one of the blocks is lacking, therefore, the reading result is determined as NG. Since UPC/E is configured of six-digit characters (the same as one block of EAN-13), however, the legitimacy of the result of reading cannot be determined from the presence or absence of the other block. Hence, the following problems are liable to arise.

When the vicinity of the CB of EAN-13 is scanned, it may appear as if the SCB of UPC/E has been scanned depending on the configuration of the characters adjacent to CB. This problem occurs, for example, in the case where the first black bar of the character (C7) following the CB is one module and the second black bar of C7 fails to be scanned.

In the case where the UPC/E or the left block of the EAN-13 is scanned in a single sweep, the bar code that has been read can be easily identified due to the difference in bar code configuration (odd/even configuration, etc.). When a bar code or the left block thereof is read in plural sweeps, however, the feature of the whole bar code remains unclear, and therefore the bar code type cannot be identified from other than the features existent in the range that has been read. Especially in the case where only the neighborhood of CB is scanned, for example, the probability is high that a portion (CB) of EAN-13 is erroneously read as a portion (SCB) of UPC/E and subsequent processing may continue in an erroneous way.

The erroneously read data might be called waste data which cannot be normally demodulated. An improved successful read rate, which is the intention of the plural-sweep reading of the bar code, cannot be attained. One method of preventing this erroneous reading for UPC/E is not to read the bar code in plural sweeps but only in a single sweep from SBG to SCB. Nevertheless, in view of the fact that the probability is considered very low that the UPC/E, though smaller in the number of digits than EAN-13, can be scanned through with a single scanning line, there is a very low successful read rate of the UPC/E.

According to this embodiment, a bar code demodulation method and apparatus, in which the UPC/E as well as EAN-13 and EAN-8 can be read in plural sweeps and in which the type of the bar code read can be identified more accurately, are described later. Also, UPC/E, which is easier to read erroneously than EAN-13 or EAN-8, is subjected to a more strict bar code read check, thereby preventing intrusion of waste data.

A bar code reader is widely used in which a scanning light such as a laser beam is emitted from a window of the bar code reader to scan and read the bar code. The scanning light irradiated on the bar code surface is reflected from the bar code surface and some of the reflected light enters the bar code reader. The light sensor of the bar code reader detects the reflected light, and after reading and demodulating the bar code, the demodulated data is output from the bar code reader.

Figure 2:
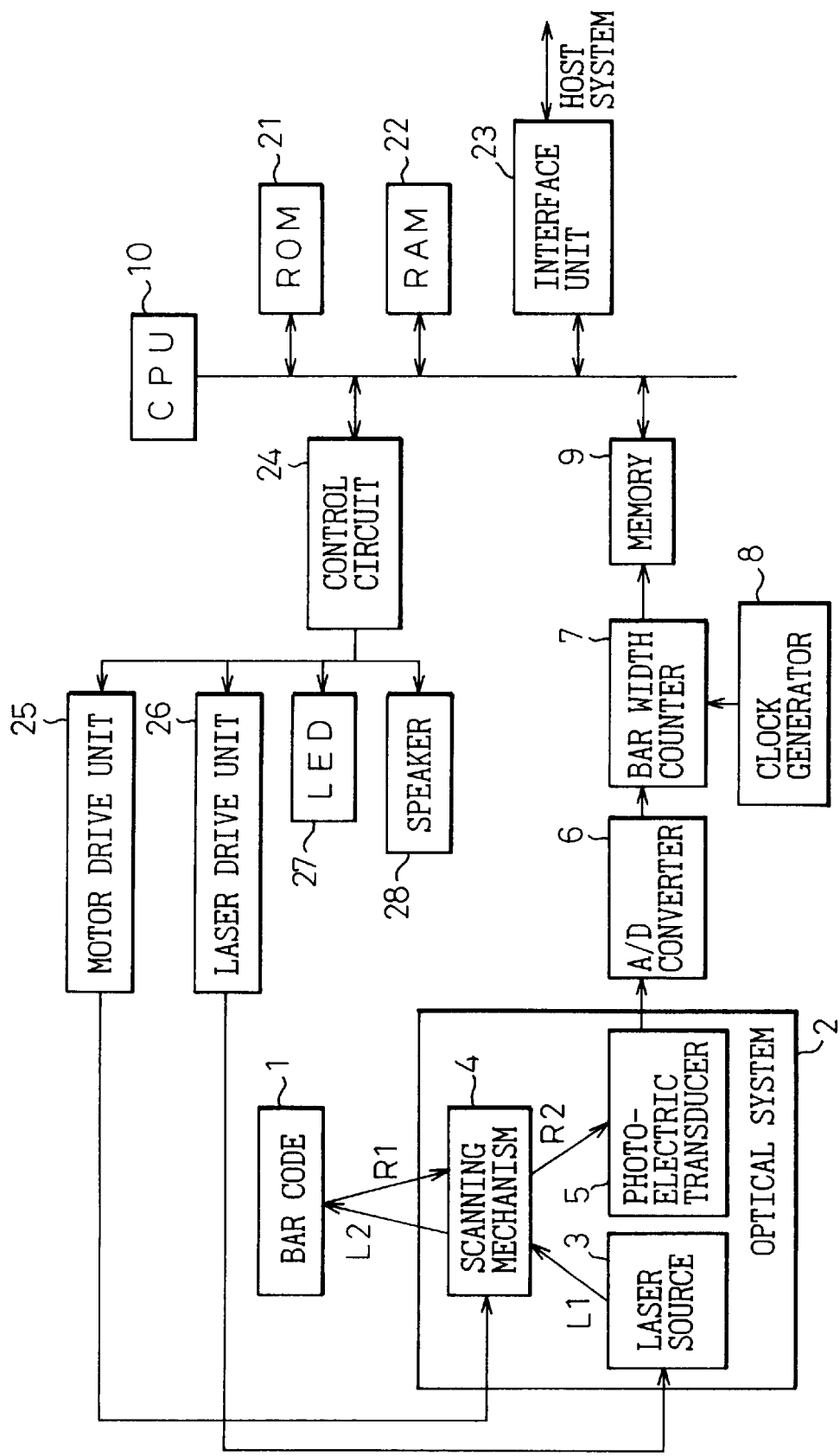
FIG. 2 is a diagram showing a configuration of a bar code reader according to an embodiment.

FIG. 2 is a block diagram showing a configuration of the bar code reader.

In FIG. 2, numeral 1 designates a bar code, and numeral 2 an optical system for generating a scanning light to scan the bar code, detecting the light reflected from the bar code and demodulating the bar code.

The optical system 2 includes a laser light generator 3 having a semiconductor laser, for example, a scanning mechanism 4 having a rotary polygon mirror or a pattern mirror for generating scanning patterns in various directions, and a photo-electric transducer 5 for receiving the light reflected from the bar code.

The energization of the laser light generator 3 is controlled by a laser drive unit 26. The rotary polygon mirror is mounted on a motor not shown and rotated by the motor. The motor, in turn, is driven by a motor drive unit 25.

The photo-electric transducer 5 outputs a signal corresponding to the amount of the light reflected and received from the bar code 1, which signal is applied to an analog-digital converter (A/D converter) 6. The A/D converter 6 outputs a binary signal having a value corresponding to each black or white bar of the bar code.

The signal converted into a digital value by the A/D converter 6 is sent to a bar width counter 7, which counts the clock signal generated from a clock generator 8 thereby to determine the width of the black and white bars of the bar code. The bar width values determined by the bar width counter 7 are temporarily stored in a memory 9.

The bar width values stored in the memory 9 are applied to a CPU 10 for executing the demodulation. Also, the demodulated data is stored temporarily in a RAM 22. A ROM 21 has stored therein a program for operating the bar code reader and a demodulation program.

The bar code reader is connected to a host system such as a POS terminal through an interface unit 23. The demodulated bar code data are output to the host system from the interface unit 23.

The CPU 10 also controls the operation of the bar code reader. Specifically, the operation of the motor drive unit 25, the laser drive unit 26, a LED 27 and a speaker 28 is controlled through a controller circuit 24. The LED 27 is adapted to turn on when the bar code is read successfully, and the speaker 28 produces a sound for notifying whether the bar code has been read successfully or not.

Figure 3:
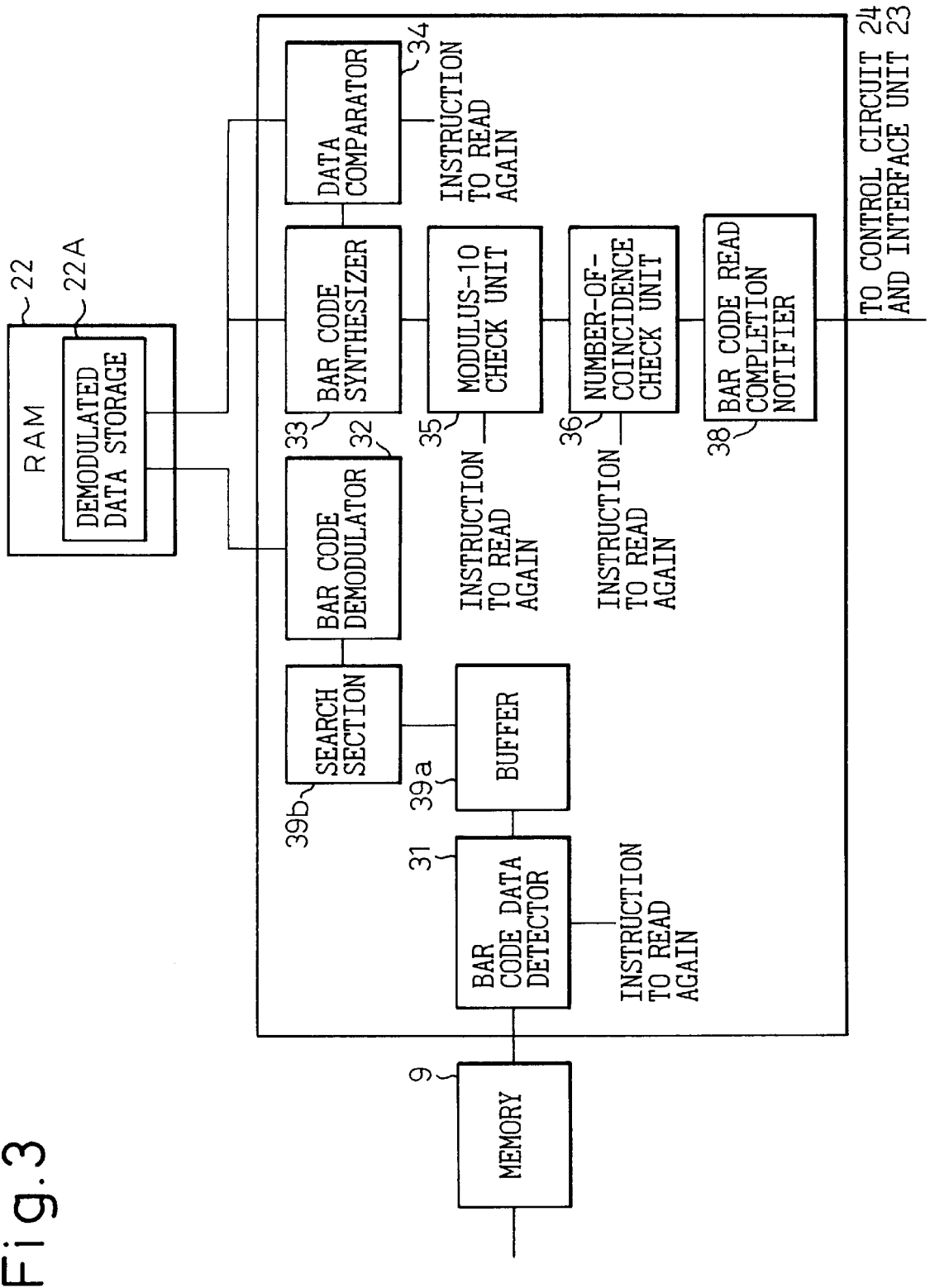
FIG. 3 is a diagram showing an internal configuration of the CPU shown in FIG. 2.

FIG. 3 is a block diagram showing in detail the operation and process of the internal components of the CPU 10 and the RAM 22 of FIG. 2.

The bar width data sent from the memory 9 to the CPU 10 are transferred further to a bar code data detector 31. The bar code detector 31 detects whether the data read represents a bar code or not with reference to the bar width data read from the memory 9. The features of a particular bar code are further extracted in the bar code detector 3. The data which has been determined to be a bar code by the bar code detector 31 is temporarily stored in a buffer 39a and then sent to a search section 39b. The search section 39b searches the data stored in the buffer 39a for data on the features and identifies the type of the particular bar code from the features thus detected. The data detected in the search section are sent to a bar code demodulator (hereinafter referred to simply as the demodulator) 32.

Assume that the checking of the bar width data in the bar code data detector 31 shows that no bar code data is included in the data. The bar code detector 31 gives an instruction to read again. At the same time, a notification that the reading was unsuccessful is issued or announced through the LED and the speaker to the operator.

The demodulator 32 performs the process for reproducing the numerical data recorded in the bar code. The demodulation of the bar code is carried out according to the type of the bar code read and identified by the search section 39b.

The demodulated data output from the bar code demodulator 32 is temporarily stored in a demodulated data storage section 22A set within the RAM 22. In the case where a plurality of bar code portions are scanned, a plurality of demodulated data are synthesized to reproduce a bar code. The bar code synthesizer 33 is for performing such a process.

The bar code synthesizer 33 reads the demodulated data from the demodulated data storage unit 22A, and upon a decision that the demodulated data represents only a portion of a bar code, then the demodulated data of the remaining portions are obtained and synthesized with the first portion. The demodulated data synthesized by the bar code synthesizer 33 are subjected to a modulo-10 check by a modulo-10 check section 35. The technique of modulo-10 check for various bar codes is well known and will not be described in detail.

Once the result of the modulo-10 check is OK, it follows that a normal bar code data is obtained. In the case where the modulo-10 check result is NG, on the other hand, an erroneous reading is indicated, and therefore it is necessary to give an instruction to read again.

In the case where the modulo-10 check result is OK, the number-of-coincidence check section 26 checks the number of times the same bar code data is obtained. The modulo-10 check, which is for determining whether the data of a given bar code is correct in configuration, cannot determine whether the configuration of the read data happens to coincide with that of the bar code or whether the result of reading and demodulation is truly correct. In view of avoiding this inconvenience, a plurality of coincident bar codes are detected.

In the case where data analogous to a bar code in configuration is obtained by accident, the particular data is not reproducible and the likelihood of the same data being read is almost nil. In the case where a correct bar code data is reproduced, on the other hand, the fact that the same bar code is scanned a plurality of times assures a high possibility of producing a plurality of the same data. By checking the number of data coincidences, therefore, the legitimacy of the bar code data read can be checked.

In the event that coincident data could not be obtained a predetermined number of times, a read error is decided and an instruction is given to read again. In the case where the number-of-coincidence check is successful, on the other hand, the controller circuit 24 and the interface unit 23 are notified of complete reading through a bar code read completion notifier 38. The controller circuit 24 executes the process for turning on the LED 27 and sounding the speaker 28 appropriately in accordance with the completion notice. The interface unit 23, on the other hand, outputs the demodulated bar code data to the host system.

In synthesizing the bar code data, a data comparator 34 checks the number of characters overlapped in the two demodulated data to be synthesized. When synthesizing the demodulated data, the bar code reader according to this embodiment assumes that a predetermined number of characters are required to be overlapped. In the case where the number of the overlapped characters is less than a predetermined number, the particular demodulated data are not synthesized.

In performing the bar code read operation with this type of reader, the operator holds an article and passes it in front of a read window. In the process, the reading operation performed with the bar code oriented in a fixed direction would impose an increased burden on the operator. It is thus required to be able to read the bar code in whichever direction the bar code has passed the read window.

A measure for meeting this requirement is to apply the scanning line from the bar code reader not in one direction but in a plurality of directions. An existing example is a device for emitting a plurality of mutually-crossing scanning lines.

Also, as far as a single scanning line can scan the whole range from one GB to the other GB (from SGB to SCB for UPC/E) of the bar code, the complete reading could be assured. Actually, however, the relation between the direction in which the scanning line is applied and the angle at which the bar code passes the read window often results in only a portion of the bar code being read, and it is rare that the whole bar code is successfully read in a single sweep.

In view of this, the recently-developed bar code readers assume that the data read by scanning only a portion of the bar code is considered valid, and is synthesized with the other portion of data successfully scanned in what is called a plural-sweep reading.

Figure 4:
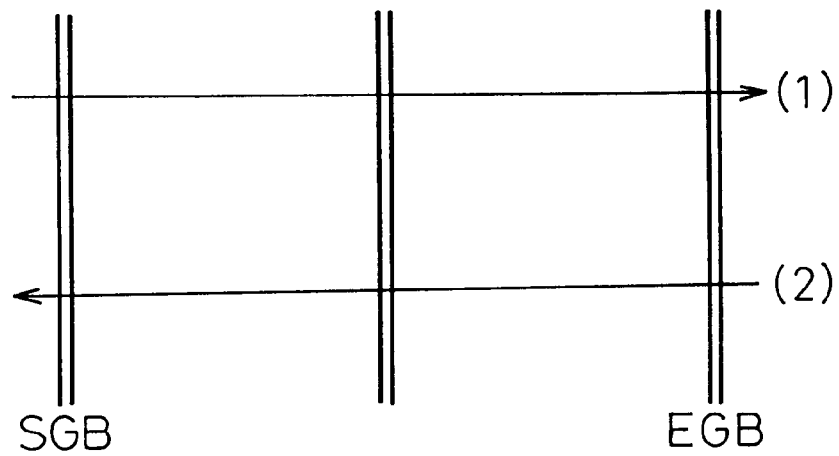
FIG. 4 is a diagram showing the types of directions in which the bar code is scanned.

The relation between the bar code and the scanning direction is shown in FIG. 4. In this drawing, the scanning of EAN-13 is assumed. The scanning direction of the bar code is roughly divided into two cases: (1) from SGB toward EGB (or SCB for UPC/E) and (2) from EGB (SCB) toward SGB.

Figure 5:
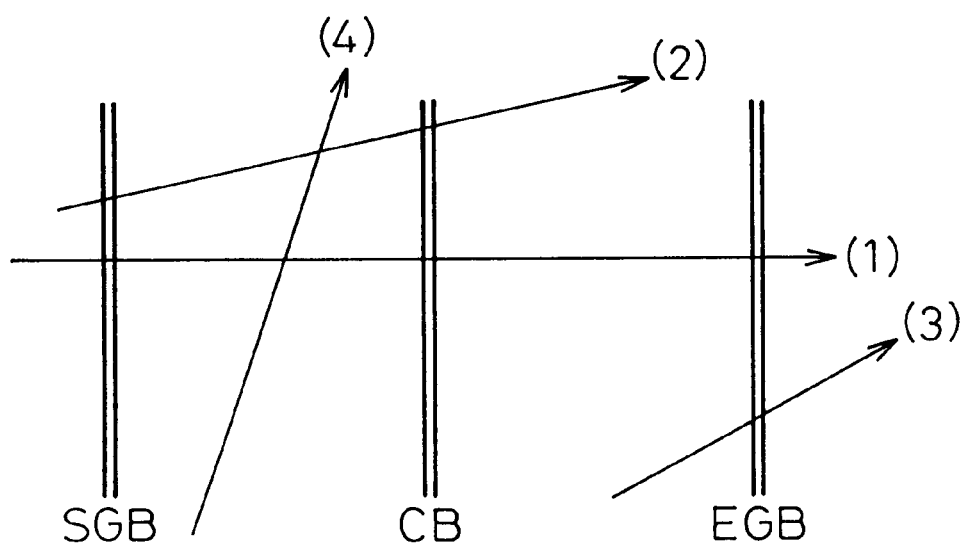
FIG. 5 is a diagram showing the manner in which the bar code is scanned.

The bar code scanning roughly includes four types of cases shown in FIG. 5: (1) scanning a bar code in a single sweep, (2) scanning both one of GBs and CB but not the other GB (scanning only one block in a single sweep), (3) scanning only one of CB and GB, and (4) scanning the characters but neither GB nor CB.

In the single-sweep scan of (1) above, there is no requirement for a plural-sweep scan. In the other cases, which account for an overwhelming proportion of all the cases of bar code reading, the scanning line passes the bar code diagonally. The diagonal scanning of the bar code cannot produce a complete bar code data, and therefore the bar code read in this way is required to be synthesized with other bar code data in some way or other. According to this embodiment, in order to secure legitimacy of the data read, all the data read with the bar code passing neither the CB nor GB constituting the features as in the case (4) of FIG. 4 are treated as invalid data. In the case of (4) of FIG. 4, the failure to scan the bars constituting the features of the particular bar code makes it difficult to decide whether the read data represents a bar code or not. Instead, the chance, though rather slim, is that the data read is noise happening to have the same pattern as the configuration of the intended bar code.

As described above, the bar codes of similar types have different configurations. The bar code reader reading the data in which these bars coexist is required to identify the type of the bar code read and perform such processes as demodulation and synthesis according to the bar code type thus identified.

The data read by the bar code reader, however, covers only a portion of a bar code except when it is read in a single sweep. Consequently, it sometimes occurs that the information on the features indicating the bar code type is difficult to extract.

The method and apparatus for demodulating the bar code according to this embodiment is aimed at extracting the feature information of the bar code type, demodulating the bar code in accordance with the bar code type thus identified, and thereby successfully reading a bar code with higher accuracy even in the case where there coexist a plurality of types of bar codes.

Figure 6:
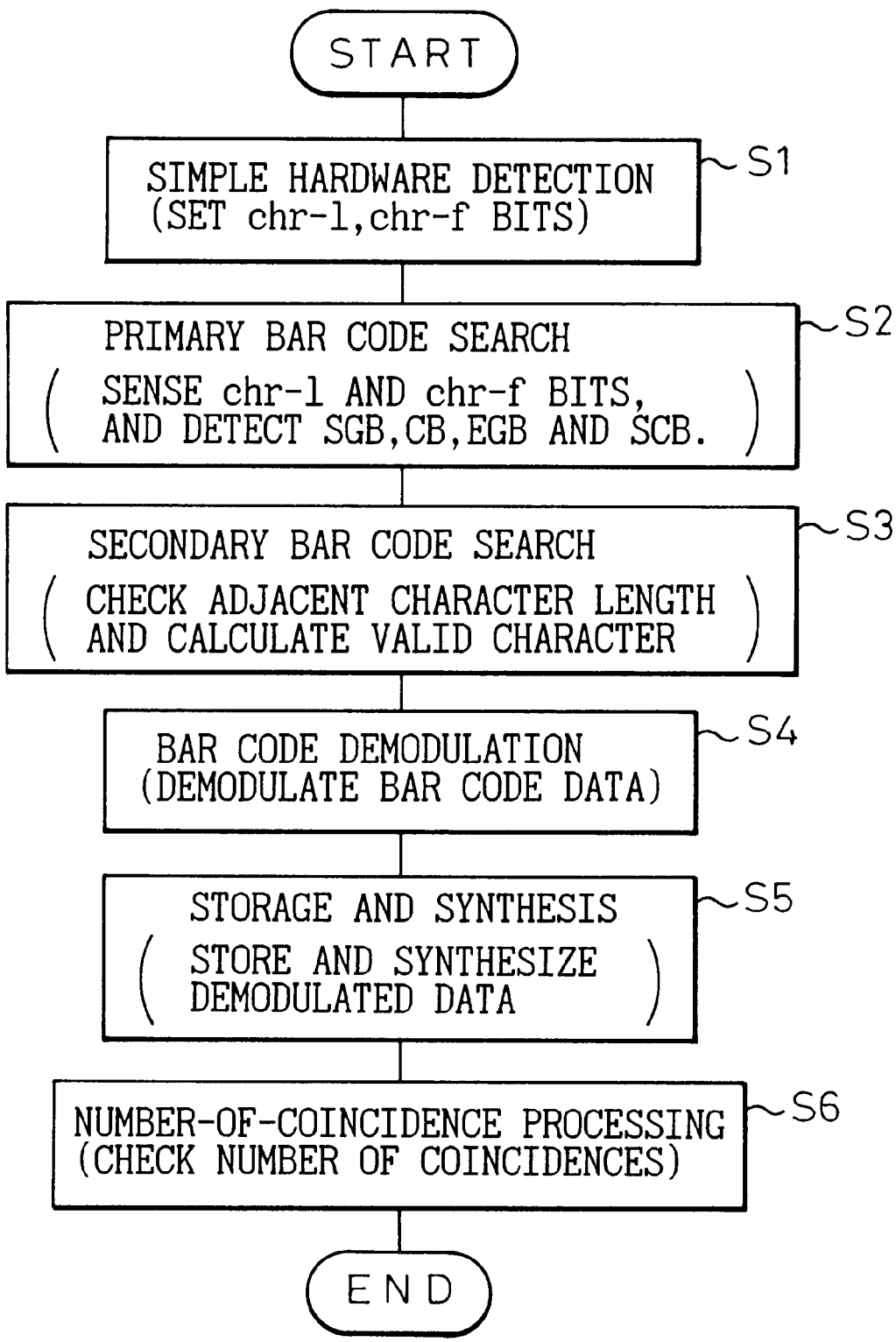
FIG. 6 is a flowchart schematically showing the manner in which the bar code is demodulated according to an embodiment.

FIG. 6 is a flowchart showing an outline of the process of demodulating the bar code according to this embodiment. In FIG. 6, step 1 is the process of "simple hardware detection" in which a bar code data (or what appears to be a bar code data) is detected from among the data read using a hardware logic or the like. In the process, the chr-l flag or the chr-f flag described later is set according to the detection result. The bar code data detected are temporarily stored in a buffer. This process includes the bar width counting.

Step 2 is the process of "primary bar code search", in which the SGB, EGB, CB and the SCB are detected on the basis of the bar code data stored in the buffer. The detection of these bars uses the chr-l and the chr-f flags described above.

Step 3 involves the process of "secondary bar code search", in which the length of the mutually adjoining characters is checked on the basis of the bar code data of which the various bars are detected in the primary bar code search, and a valid character is calculated in accordance with the result of check.

Step 4 involves the process of "bar code demodulation", in which the bar code is demodulated on the basis of the bar code data obtained in the secondary bar code search thereby to reproduce the data recorded in the bar code. This demodulation process is carried out for each portion read in the case of plural-sweep reading.

Step 5 is the process of "storage and synthesis", in which the demodulated bar code data are stored in a data storage buffer, and the bar code data read in plural sweeps are synthesized to reproduce a single bar code data.

Step 6 is the process of "number-of-coincidences check". The mere reading of a bar code data cannot determine whether the particular bar code data is correct or not. For this reason, a plurality of demodulated data obtained in a series of reading process are compared with each other, and the number of times the demodulated data coincide with each other is counted to check the accuracy of the result of reading.

Through these processes, the demodulation of a bar code is completed. Each process will be described in detail later.

In the simple hardware detection process, the following processes are performed on the basis of the light signal received.

First, the bar width is counted according to the light signal received.

The light signal from the bar code has a light level corresponding to the white or black bar. This signal is used to first detect the edge of the white bar or the black bar.

Figure 7:
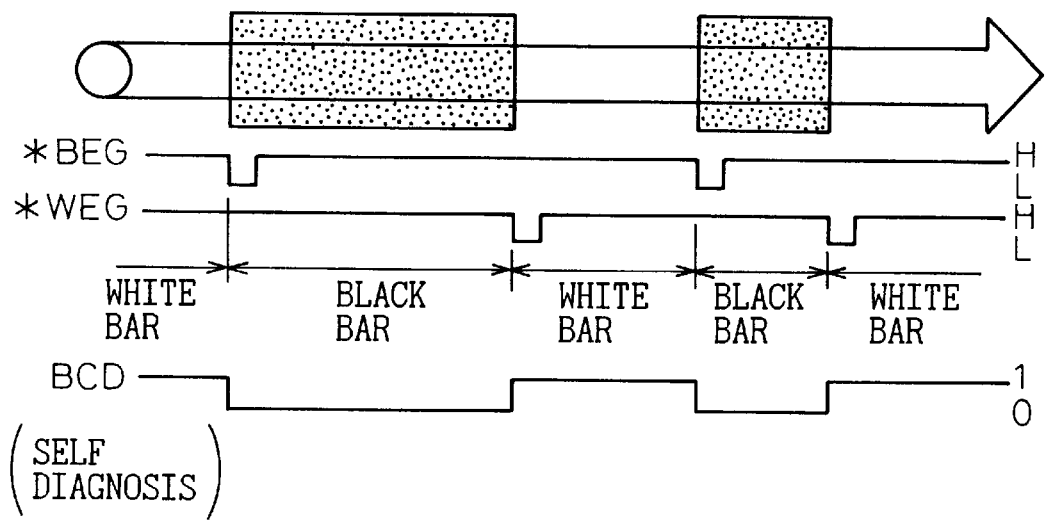
FIG. 7 is a diagram showing the relation between the scanning of the bar code and an edge detection signal.

FIG. 7 is a diagram showing the relation between the bars scanned by the scanning beam and an edge detection signal. In FIG. 7, the upper portion shows the bars constituting a bar code and the trace of the scanning beam. Characters *BEG and *WEG indicate the edge detection signals. The edge detection signal *BEG is one which falls upon detection of a edge changing from white to black bar, and the edge detection signal *WEG is adapted to fall upon detection of an edge changing from black to white bar. The BCD signal is output indicating the white or black of the bar in accordance with the sequence of the signals *BEG and *WEG. The BCD signal falls to low level in response to the black bar, and rises to high level in response to the white bar.

The width (time) from the fall of *BEG to the fall of *WEG corresponds to the width of the black bar. In similar fashion, the width (time) from the fall of *WEG to the fall of the *BEG corresponds to the width of the white bar.

These edge detection signals are applied to the bar width counter thereby to count the bar width.

The bar width counter has the function of measuring the bar width continuously on the basis of an input signal, and outputting the count value in a sequence of numbers.

The bar width counter includes therein a clock source for generating count clocks. The clock source may generate clocks of 40 MHz, for example.

The bar width counter detects the fall of each edge detection signal, and counts the number of clocks between the two edge detection signals. The count of the clocks corresponds to the bar width, and the ratio between different counts corresponds to the relative bar width.

The bar width counter measures the clocks from the fall of *BEG to the fall of *WEG, and produces the resulting count as a 11-bit data, for example. In similar fashion, the count of clocks from the fall of *WEG to the fall of *BEG is output.

The bar width counter has its own specific upper limit of the count. Such an upper count limit is defined at a value which is considered to never occur when a bar code is read.

In normal bar code read operation, the fall of *BEG and the fall of *WEG should alternate as shown in FIG. 7. Depending on the presence of noises or the state of the light reflected from the bar code, however, the same edge detection signals may be generated in succession. Such a state is shown in FIG. 8.

Figure 8:
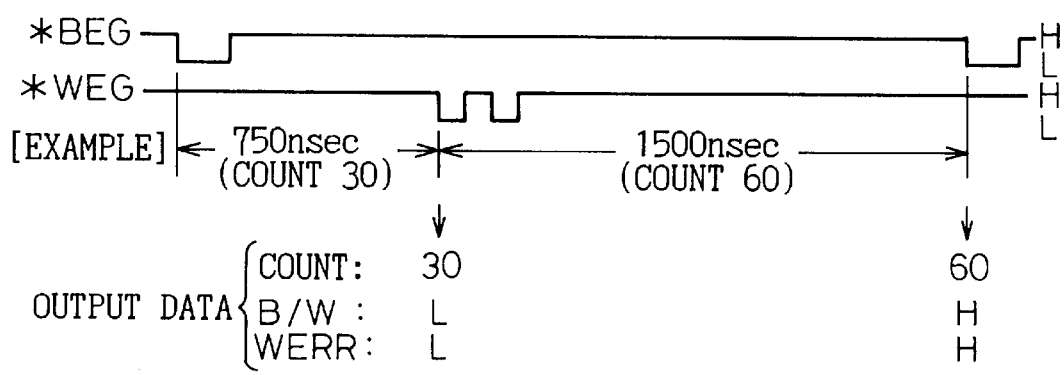
FIG. 8 is a diagram showing the state of an edge detection signal at the time of occurrence of a wave error.

In the case of FIG. 8, *WEG is generated twice successively. This state in which the edge detection signals are not generated alternately is called a wave error by way of explanation. The wave error is so called in view of the fact that *BEG and *WEG are output by detecting the inflection points of a signal associated with the contrast of the bars produced from a light sensor and that the noises and the resulting error present in the waveform of the light signal are liable to cause the inflection point on the same side to be detected twice apparently.

In the case where the edge detection signals on the same side are detected, the count started from the signal first generated is considered valid, and the number of clocks is counted from that point to the fall of the other edge detection signal. In the case of FIG. 8, for example, the time from *BEG to the first *WEG is 750 nsec which is assumed to be 30 in count. The next count is represented from the first *WEG to the next *BEG and represents 1500 nsec (60 in count). Also, the successive generation of a plurality of the same edge detection signals (*WEG) can be recognized by the bar width counter. In such a case, therefore, the wave error bit WERR is set to H from L.

Characters B/W shown in FIG. 8 are a symbol indicating the black and/or white and is a bit indicating whether the bar being counted is a black or a white bar. The B/W bit in L state indicates that the black bar width is being counted, while the B/W bit in H state shows that the white bar width is being counted. The B/W bit changes in polarity according to the detection of *BEG and *WEG and corresponds to the BCD signal shown in FIG. 7.

Figure 9:
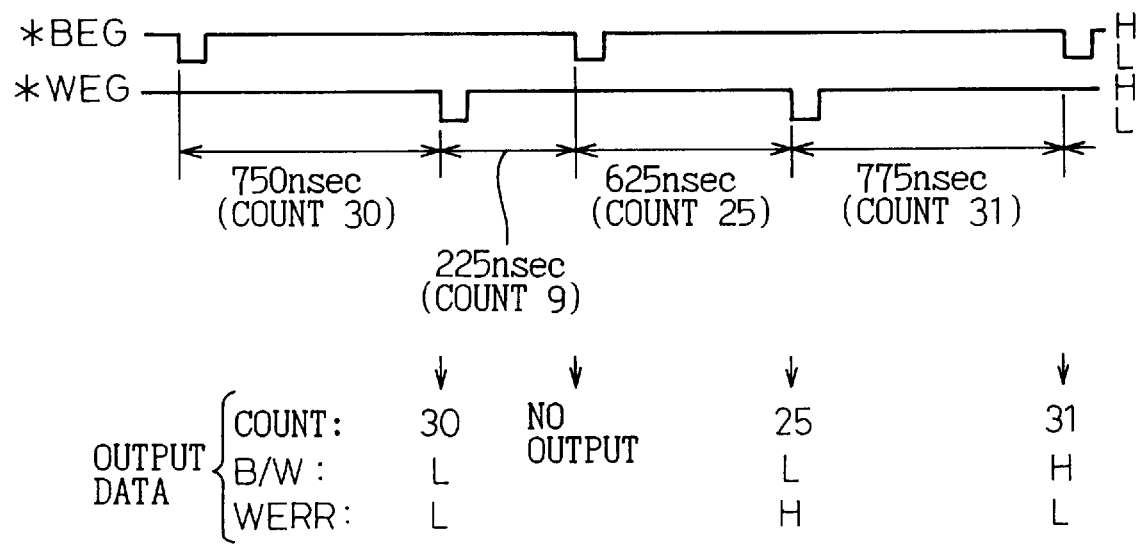
FIG. 9 is a diagram showing the occurrence of other wave errors.

FIG. 9 is a diagram showing another example of a decision that a wave error has occurred. The lower limit as well as the upper limit of the bar width count are set. In the case where the count between edge detection signals is less than the lower limit (10 in the shown case), the count value obtained at the particular time point fails to be produced. In such a case, the *BEG detected after count 9 is considered an error (noise, etc.).

With reference to FIG. 9, the count from the first *BEG to the first *WEG is 30, while the count from the first *WEG to the second *BEG is 9. Therefore, the count (9) fails to be produced. The count from the second *BEG to the second *WEG is 25 which exceeds count 10. Count 25 is produced and the WERR bit is raised to high from low level.

In this way, as soon as the count of 10 or more is produced after the count of less than 10, the WERR bit is raised from L to H level. In similar fashion, in the case where two or more counts of less than 10 are output successively, the WERR bit is raised to H level when the count of 10 or more is produced next.

Then, the UPC pointer detection process is performed on the count data thus obtained. The UPC pointer as it is referred to here is a reference bar or a feature bar like GB or CB in the UPC bar code. This detection process detects such a CB or GB.

Figure 10A:
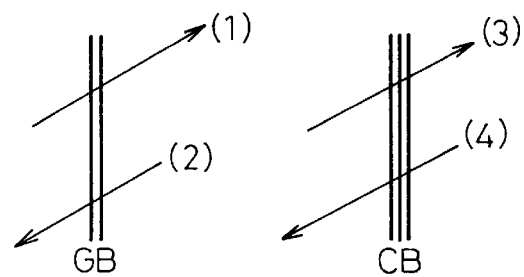
FIG. 10A is a diagram showing types of bar code scanning and a method of discrimination thereof.

In the case where the scanning light passes at least one of CB (including SCB of UPC/E) and GB (SGB or EGB), one of the following four scanning types shown in FIGS. 10B to 10E is assumed. Although the bar code shown in FIG. 10A is UPC/E, the same can be said also of EAN-13 if SCB is considered as a type of CB.

The first waveform (FIG. 10B) represents the case in which the scanning light is applied from the GB (which may be SGB or EGB depending on the bar code orientation and the scanning direction) toward the first character (CHR) adjacent to the GB. The second waveform (FIG. 10E) is associated with the case where the light is scanned from the CB toward the adjacent first character. The third waveform (FIG. 10C) is the case in which the scanning light is applied from a character toward the adjacent GB, and the fourth waveform (FIG. 10D) is associated with scanning from a character toward the adjacent CB.

In this diagram, the first character is the one scanned following GB or CB, and the last character is the one scanned immediately before CB or GB.

The following process is performed in the present embodiment.

GB and CB each have a total of three bars each having one module width. Also, one character is configured of bars of seven modules. Taking advantage of this fact, the character length of CB or GB is compared with that of the first or last characters thereby to check the length of the first or the last character, respectively.

In checking a character, first, it is necessary to check the bar configuration. CB and GB have the feature of three bars of equal width juxtaposed. Also, one character has two each of black and white bars adjacent thereto and is 7 module wide, as known. In view of this, the portion where the data having the feature of CB or GB is adjacent to the data having the features of a character is extracted on the basis of the bar width data obtained. In addition, the character length is checked according to the comparison between CB or GB and the character.

In the case (FIG. 10B), for example, the bar width Tn including the two tail end bars of GB is two modules. The width $C_{n+2}$ of the first character, on the other hand, is 7 modules. The length of the first character is checked. In the check of the length of the first character, it is decided whether $C_{n+2}$ is larger than $3 \times Tn$ and smaller than $4 \times Tn$. When only the actual number of modules is compared, $C_{n+2}$ is 3.5 times larger than Tn. Taking into consideration the error due to the bar code distortion caused by the printing on a curved surface, however it is decided that the result of the first character length check is OK as far as $C_{n+2}$ is included in the above-mentioned range. The flag chr-f=1 is set for the tail end bar of the first character, where f is the leading letter f of "first" and represents the first character.

Explanation will be made about the reason that the width combining the two bars of black and white is employed as the bar width of GB.

The width of the black and white bars should be exactly the same. Due to the printing, however, the black bar width may increase due to a blot or may be thin or may otherwise develop a distortion. The use of such a bar as a reference would undesirably lengthen or shorten the black bar as compared with the reference length, often making it impossible to check the character length correctly.

Consider that the blot/thinning is of the same size for all the black bars on the same bar code. The increase (decrease) in the thickness of the black bar is directly reflected in the thinning (thickening) of the white bar. The addition of the widths of the white and black bars, therefore, can offset the thinning and thickening of the two types of bar.

In the example explained above, the addition of the black bar and the white bar in width is employed as the width of a reference GB in order to exclude the effect of the bar distortion caused in printing. In checking the bar width, the sum of the black and white bars in width will be used in the explanation that follows.

In the case where the effect of the printing block is not required to be taken into consideration, the length of the first character can of course be checked on the basis of the width of a single black bar of GB.

In the case shown in (FIG. 10E), as with the case shown in (FIG. 10B), the bar width Tn of the two tail end bars of CB is compared with the width $C_{n+2}$ of the first character. If the condition $3 \times Tn < C_{n+2} < 4 \times Tn$ is met, the chr-f flag is set to 1 for the bar representing the tail end of the first character.

Figure 10B:
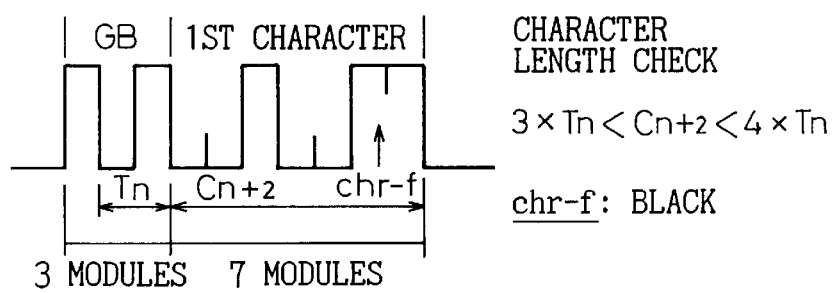
FIGS. 10B, 10C, 10D, and 10E show basic bar configurations of bar codes with chr-f/chr-l flags.
Figure 10C:
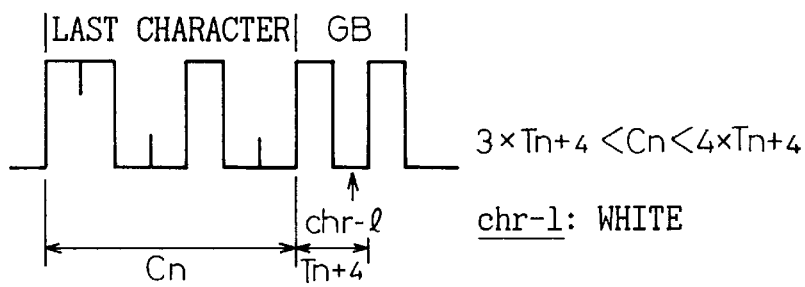
Figure 10D:
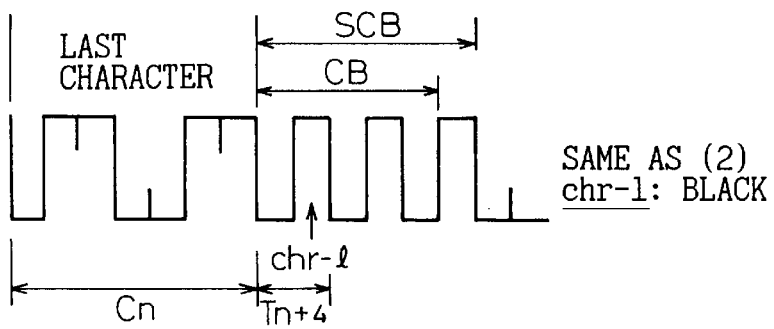
Figure 10E:
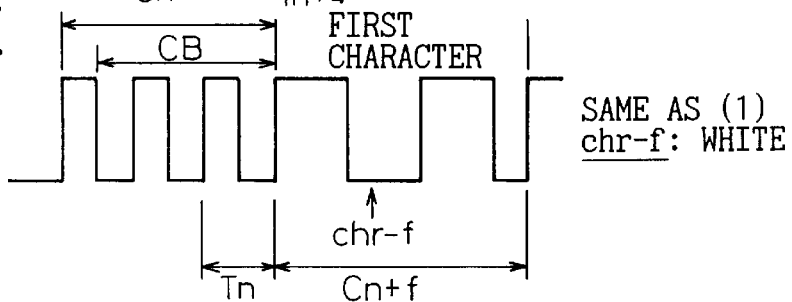

The bar for which the chr-f flag is set is different between cases (FIG. 10B) and (FIG. 10E). For case (FIG. 10B), the chr-f flag is set for the black bar, while it is set for the white bar in case (FIG. 10E). This is due to the fact that the EAN-13 has a symmetric arrangement of the white and black bars on both sides of CB. Taking advantage of this feature, it is determined whether the first character is scanned following GB or following CB.

The case shown in (FIG. 10C) concerns the scanning of GB from the end character. In this case, the length of the end character is checked. This process compares the bar width $Cn$ of the end character with the width $Tn+4$ of the two leading bars of GB. Decision is made as to whether the condition $3 \times Tn+4 < Cn < 4 \times Tn+4$ is met or not. If the condition is met, the chr-l flag is set to 1 for the bar at the tail end of the $Tn+4$ providing a portion of CB. The letter "1" represents that of "last" and indicates the end character.

In the case shown in (FIG. 10D), on the other hand, CB (SCB) is scanned from the end character side. In this case, as in case (FIG. 10C), it is checked whether a similar condition can be met for Cn. If the condition is met, the chr-l flag is set to 1 for the tail end bar of $Tn+4$.

Case (FIG. 10C), as compared with case (FIG. 10D), shows that the chr-l flag is set for the white bar while case (FIG. 10D) is the one where the chr-l flag is set for the black bar. This stems from the difference in configuration between GB and CB. As a result, as in the cases shown in (FIG. 10B) and (FIG. 10E), it can be determined whether an end character is adjacent to GB or to CB according to the color of the bar with the chr-l flag thereof set.

As described above, the four scanning types can be distinguished by the values of the chr-l and the chr-f flags and the color of the bar for which the chr-l or chr-f flag is set. It is thus possible to distinguish the direction in which the bar code is scanned and the sequence in which the bars are scanned.

Figure 11B:
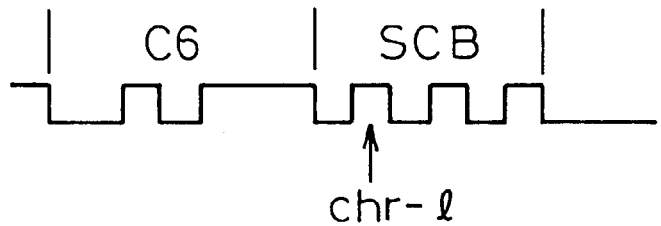
FIGS. 11B, 11C and 11D show bar configuration examples of bar codes with chr-f/chr-l flags.
Figure 12A:
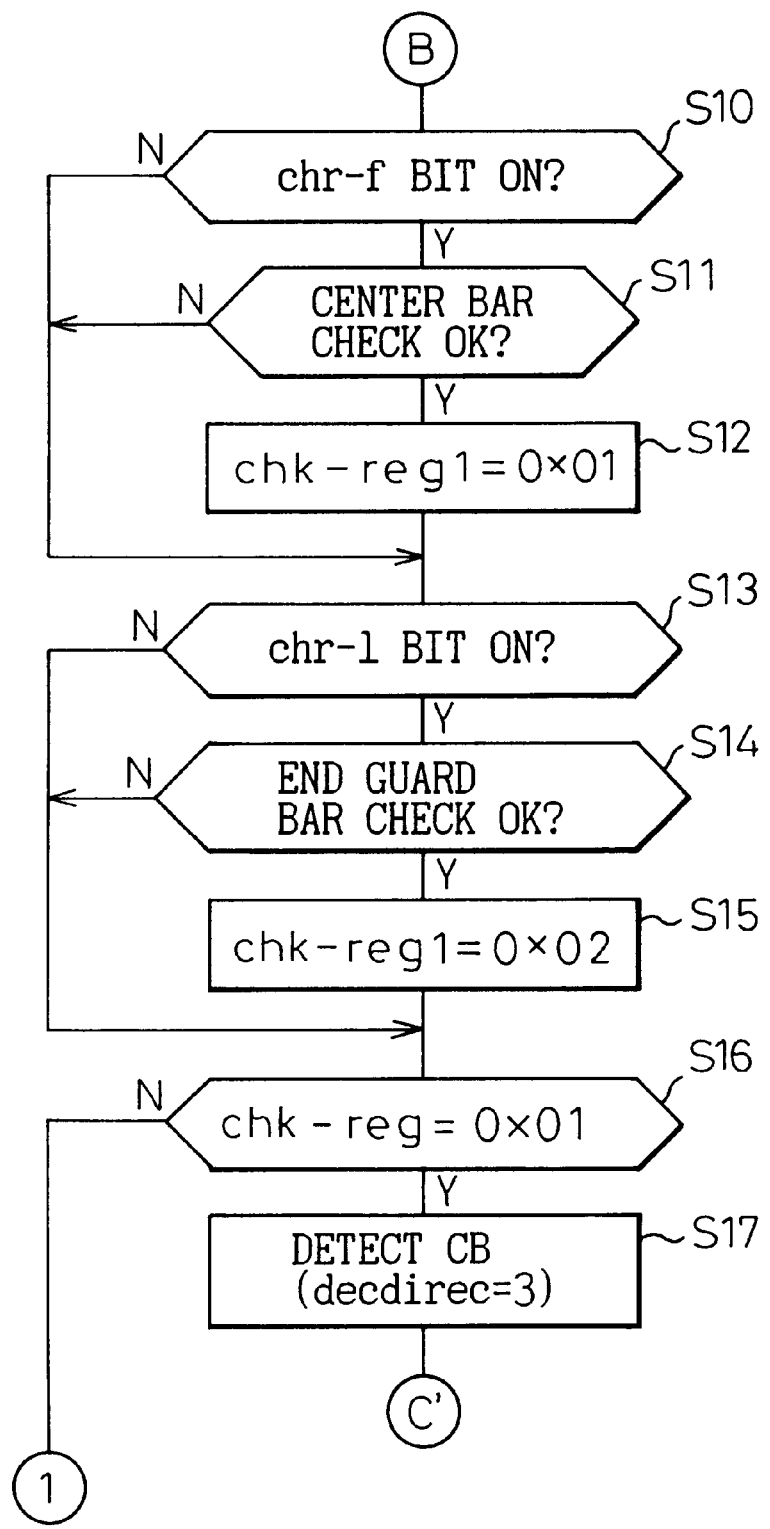
FIGS. 12A and 12B are a flowchart showing the primary processing of a bar code search.
Figure 12B:
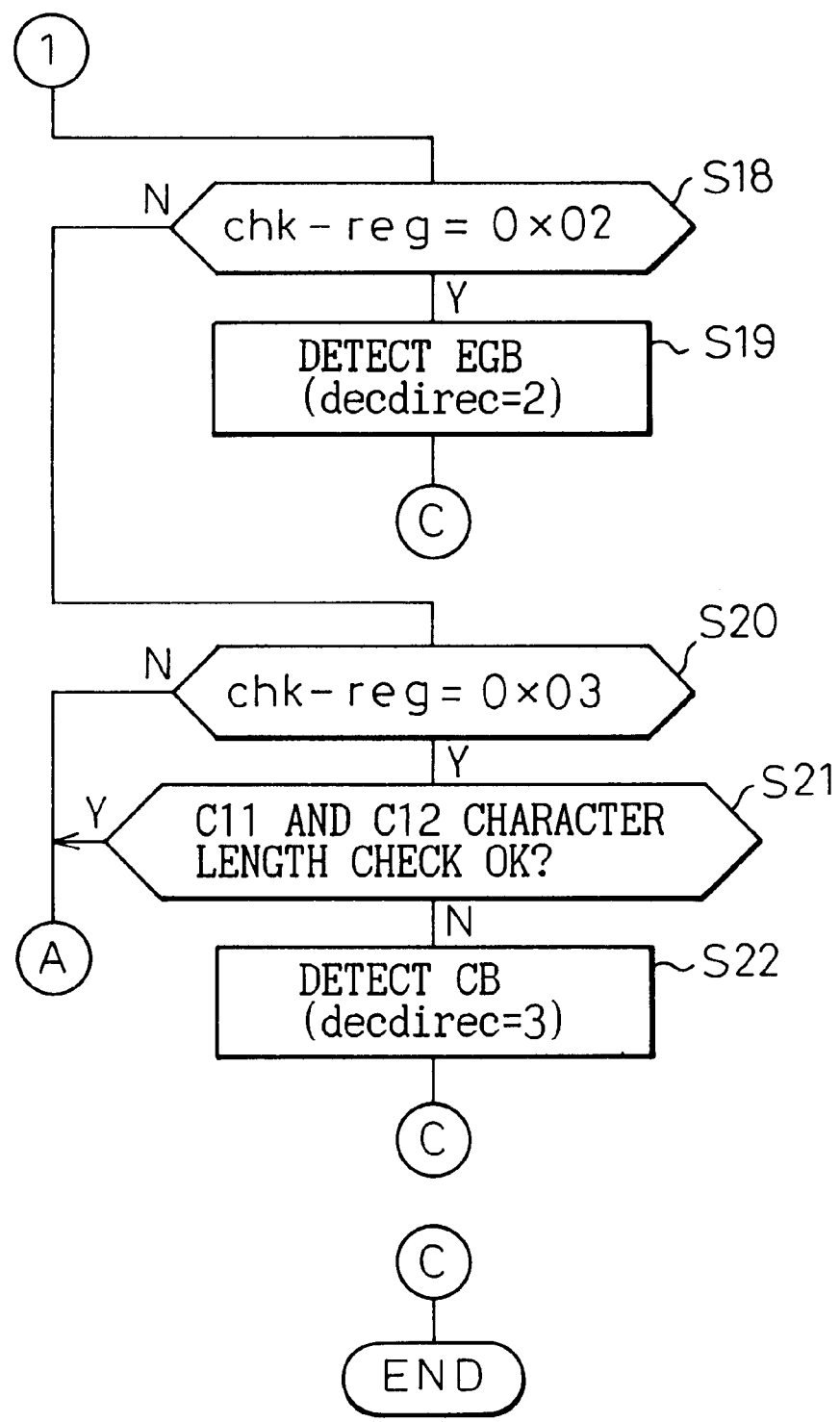

FIGS. 11A, 12A and 12B are flowcharts showing the detailed process of the primary bar code search. In these flowcharts, a buffer storing the read data (count data) is searched for bar code data.

Figure 13:
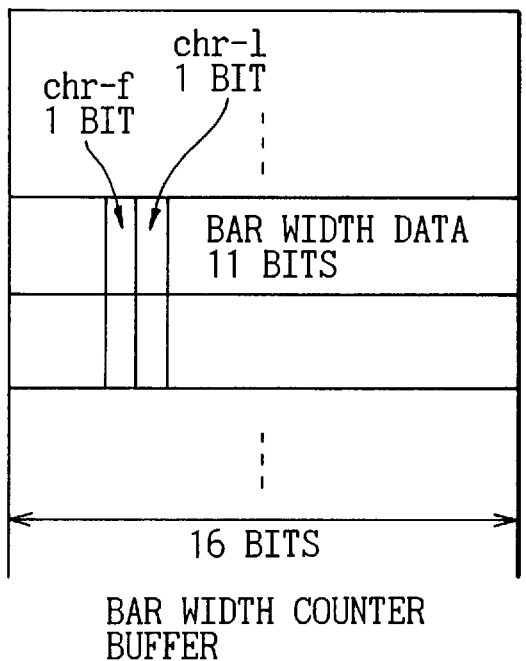
FIG. 13 is a diagram showing a configuration of a bar width buffer.

FIG. 13 is a diagram showing the buffer storing the count data. The count data buffer is assumed to have a width of 16 bits. Of these bits, 11 bits represent a field for storing the bar width count, one bit a field for storing the chr-l flag, and one bit a field for storing the chr-f flag. The count data corresponding to each bar width is stored in vertical arrangement in FIG. 13. The other information stored in vacant fields include the information for distinguishing the black and white bars and the information for indicating the presence or absence of a wave error.

In the bar code search process, the count data buffer is searched for the count, according to which the process is executed for detecting GB or CB. In the description that follows, CB is assumed to include SCB, and GB to include both EGB and SGB. The expression SGB-EGB may indicate that GB scanned prior to a character as viewed in the scanning direction is assumed to be SGB, and the GB scanned following a character is assumed to be EGB.

In FIG. 11A, step 1 searches the buffer to decide whether the chr-l bit or the chr-f bit obtained for the read data as a result of the simple hardware detection process is set. Unless these bits are set, step 2 increments the search point, and the process returns to A to search for the next data.

In the case where the chr-l or chr-f bit is set, on the other hand, step 3 decides whether or not the bar involved is the black bar. This decision can identify the direction in which the bar code is scanned. Specifically, as shown in FIGS. 10A to 10E, in the case where the scanning is from GB toward a character or from a character to CB, the bar for which the chr-l or chr-f bit is set is black. The remaining cases involve the white bar.

Figure 14A:
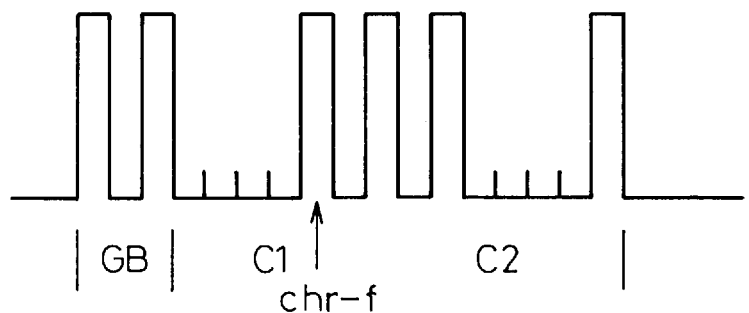
FIGS. 14A and 14B are diagrams showing the possibility of different interpretations of bar codes of the same configuration.
Figure 14B:
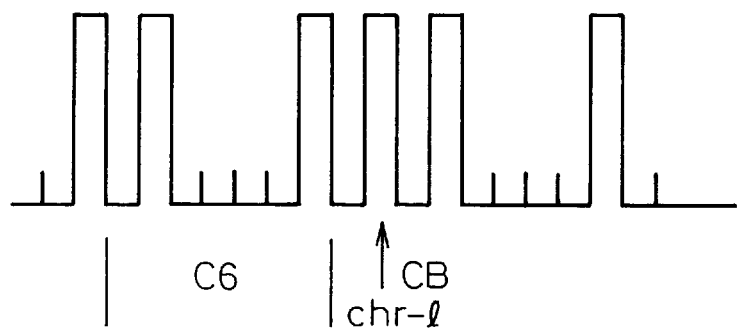

When the bar for which the flag is set is black, it is known that the scanning is in the direction from GB toward a character as shown in FIG. 10B (the state shown in FIG. 14A) or from a character toward CB as shown in FIG. 10D (the state shown in FIG. 14B). In the case where a white bar is involved, on the other hand, the scanning is known to be from a character toward GB as shown in FIG. 10C or from CB toward a character as shown in FIG. 10E.

Assume that step 3 decides that a black bar is involved. The following step 4 decides whether or not the chr-l bit is set. If the chr-l bit is set, the scanning from a character toward CB is indicated (the state shown in FIG. 11B). In this case, whether the bar for which the chr-l flag is set is SCB or not is determined by deciding whether the SCB check result in step 5 is OK.

In the case under consideration, the bar width is checked for SCB. As described above, SCB is configured of three white bars alternating with three black bars each one module long. Consequently, the bar width check can estimate whether the particular data represents SCB or CB of a bar code such as EAN-13.

Figure 15A:
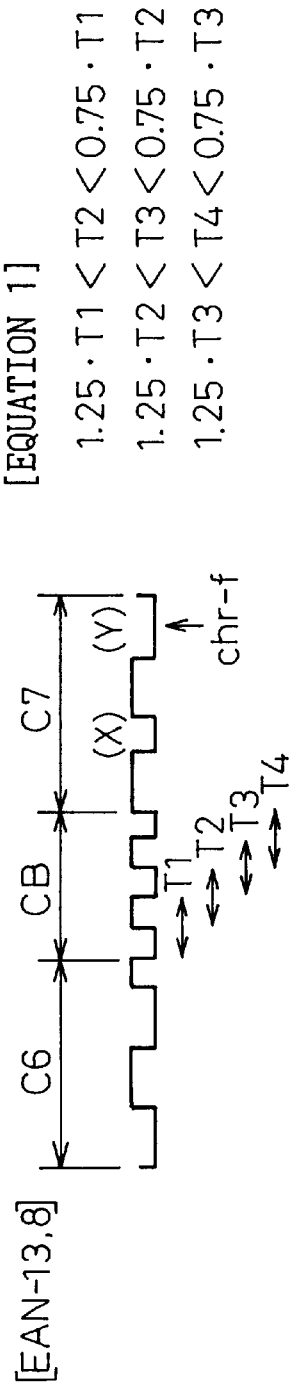
FIGS. 15A and 15B are diagrams showing a character check of the center bar and the special center bar.
Figure 15B:
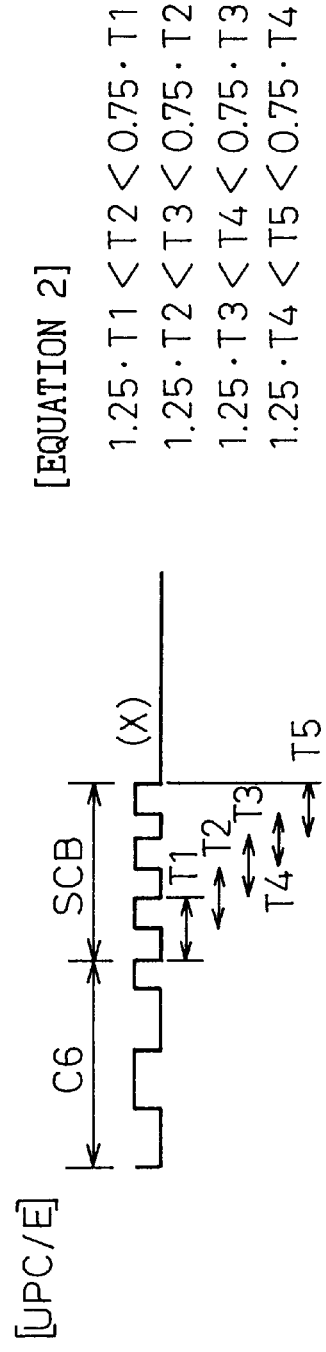

FIGS. 15A and 15B are diagrams showing a method of checking the SCB according to the present embodiment.

In the case of SCB check, like other checks, the bar width is checked based on the combined bar width of adjacent black and white bars in order to exclude the effect of blotting or thinning of the bar print. In FIGS. 15A and 15B, T1 to T5 designate the combined bar width of adjacent white and black bars, respectively.

For a simplistic check of the bar width, whether or not all the widths of T1 to T5 are the same is determined. However, the bars of a bar code printed on a curved surface, though of the same width, may appear thicker or thinner than their actual width to the bar code reader. The same can be said when a bar code is printed in distorted fashion. In the SCB bar width check, therefore, the widths of the adjacent T1 to T5 bars are considered the same as far as the bar widths compared are included within a predetermined range.

According to this embodiment, the bar width is checked to see whether the width of the bar involved (left side in the drawing) is included within +25% of the width of the reference bar (right side in the drawing). In comparing T1 and T2, therefore, the bar width of T2 which is included in the range of 1.25T1 to 0.75T1 as shown in FIGS. 15A and 15B is considered OK.

In similar fashion, T2 is compared with T3, T3 with T4 and T4 with T5 sequentially, and once the condition set forth above is met for each case, step 5 decides the SCB check result is OK.

The technique of CB check for EAN-13 or the like is shown also in FIG. 15A (in upper portion). In the case of CB check, a total of five bars constituting the CB are compared with each other. In FIGS. 15A and 15B, T1 to T4 combining the widths of the adjacent black and white bars are calculated, so that the relations are compared between T1 and T2, between T2 and T3 and between T3 and T4.

Comparison is made for deciding whether the width of one bar is within ±25% of the other as in the SCB check.

Figure 11C:
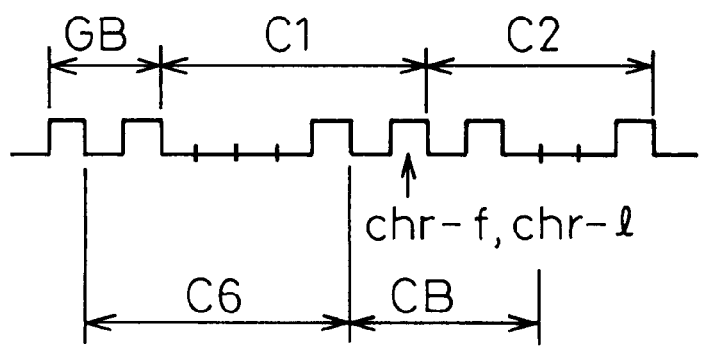

The decision in step 5 that the SCB check result is OK can confirm that the bar configuration for which the chr-l flag is set is the same as for SCB. The confirmation has yet to be made, however, as to whether this bar is really SCB. In the state as shown in FIG. 11C, for example, the bar with the chr-l flag attached thereto is black, while at the same time the chr-f flag is attached to the same bar. A pattern of alternating black and white bars is found the same way as for SCB.

Figure 16A:
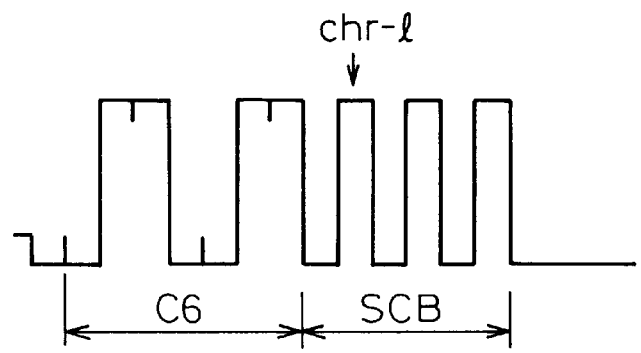
FIGS. 16A and 16B are diagrams showing examples in which the center bar and the special center bar are not distinguishable from each other.
Figure 16B:
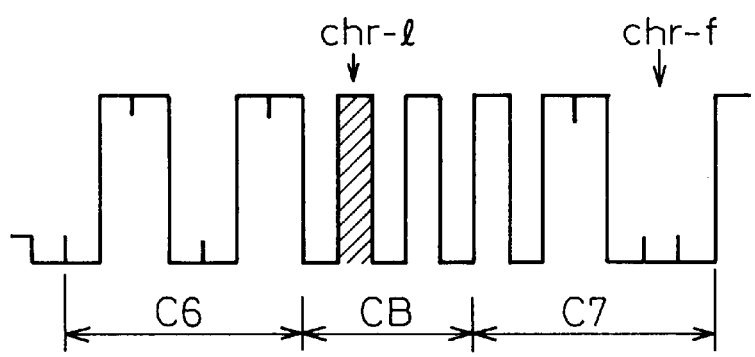

FIGS. 16A and 16B are diagrams showing configurations where the decision on the apparent existence of SCB is likely as in the above-mentioned case. In the case of FIG. 16A, a pattern of a total of six modules with alternate black and white bars is confirmed. This bar, therefore, can be estimated to be SCB.

Suppose the interpretation is as shown in FIG. 16B, on the other hand. This bar can be considered CB of EAN-13 or the like and the first bar of the character C7 adjoining the CB can be considered the black bar having one module length.

Therefore, the mere fact that the SCB check result is OK is not a sufficient confirmation that the bar involved is SCB. In view of this, it is necessary to confirm whether the bar judged to be SCB in configuration is really SCB or not.

Figure 11D:
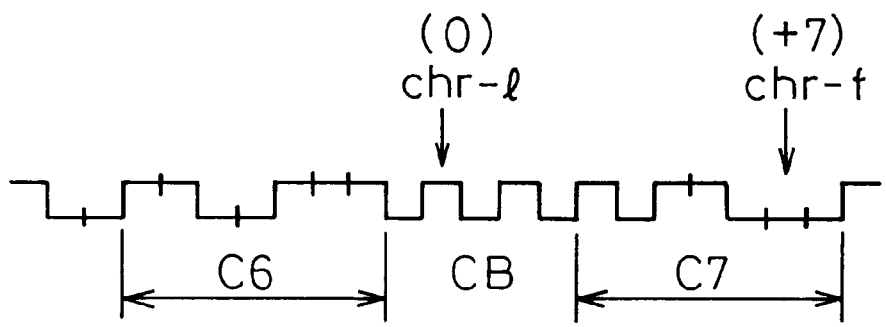

In the case where the SCB check result is OK, therefore, the following step 6 checks whether the chr-f flag bit is set at the position where the search pointer of the count buffer is +7 (counted from the bar carrying chr-f or chr-l flag) (the state shown in FIG. 11D).

In this case, the scanning directed from a character toward CB is assumed. Once the SCB read is found to be SCB, therefore, any characters adjacent in the scanning direction should be absent. The result would be that the chr-f bit is never set at the position of the search pointer +7. In the case where the chr-f bit is set, on the other hand, it indicates the presence of a character at the adjacent position in the direction of scanning the bar read, resulting in the presence of the characters before and after CB. Considering this configuration, the possibility is high that the read bar is not SCB of UPC/E but CB of EAN-13 or the like.

In the case where the decision in step 6 is that the chr-l bit is not set, the SCB detection is determined (step 7), so that 4 is set to the register "decdirec" indicating the scanning type, followed by proceeding to C for ending the primary search process. In the case where the chr-f bit is set, by contrast, the process proceeds to A.

In the case where the decision in step 4 is that the chr-l bit is not set or in the case where the decision in step 5 is that the SCB check result is NG, on the other hand, step 8 decides whether or not the chr-f bit is set.

If the decision in step 8 is that the chr-f bit is set (the state shown in FIG. 11A), the read bar is judged to be SGB (step 9), and 1 is set in the register "decdirec" followed by proceeding to C. In the case where the chr-f bit is not set, on the other hand, an error is decided and the process proceeds to A for a repeated search.

In the case where the decision in step 3 is that the bar involved is not black, step 10 (FIG. 12A) decides whether the chr-f bit is set or not. If the chr-f bit is set, the scanning type is mostly probably in FIG. 10D. As a result, in order to determine whether or not the data scanned before the character for which the bit is set is CB (like EAN-13), decision is made as to whether the CB check result is OK (step 11).

Decision made here is as to whether the bar adjacent before the character for which the chr-f bit is set is configured of five modules or not. The process for this operation is shown in FIGS. 15A and 15B and was described above in detail.

Figure 12C:
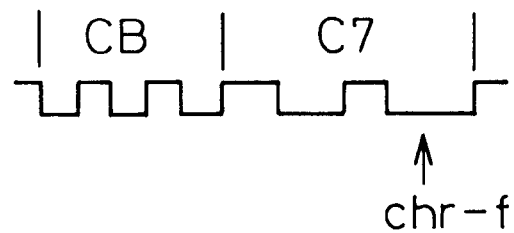
FIGS. 12C, 12D and 12E show bar configuration examples of bar codes with chr-f/chr-l flags.

In the case where the CB check result is OK (corresponding to FIG. 12C), step 12 sets "chkreg" to 0x01. "chkreg" will be described later.

In the case where the answers in steps 10 and 11 are both NO, "chkreg" is in the state set to 0x00. Even if the CB check result is OK, it cannot be determined whether the apparent CB is a real CB or not unless the relation between two sides is decided. As of this time, therefore, the decision is not made as to whether CB is detected or not.

Figure 12D:
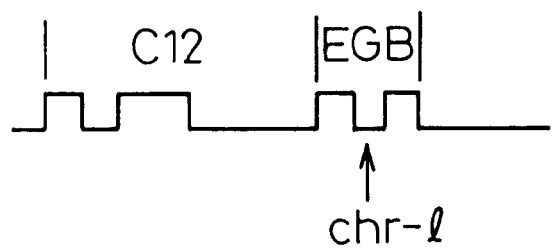

Then, step 13 checks whether or not the chr-l bit is set. In the case where the chr-l bit is set (equivalent to FIG. 12D), the scanning type is probably FIG. 10C, so that it is necessary to determine whether the data for which the chr-l bit is set is EGB or not. Step 14 accordingly checks the EGB. Since the EGB is three modules, T1 and T2 corresponding to the combined length of black and white bars are compared with each other (in a manner similar to FIG. 10C), and if T2 is in the range of 1.25 T1 to 0.75 T2, the check result is considered OK.

In the case where the EGB check result is OK, step 15 sets "chkreg" to 0x02. In the case where 0x01 is set in step 12, the contents of "chkreg" is the sum 0x0.3 of the two. In the case where the EGB check is NG, on the other hand, the value of "chekreg" is held.

Then, steps 16, 18 and 20 check the value of "chrkreg". In the case where chkreg=0x01, the CB detection is determined (step 17), and 3 is set in "decdirec" is set with the process proceeding to C.

In the case where the "chkreg" value is 0x0.2, the EGB detection is determined (step 19), so that 2 is set in "decdirec" with the process proceeding to C.

Figure 12E:
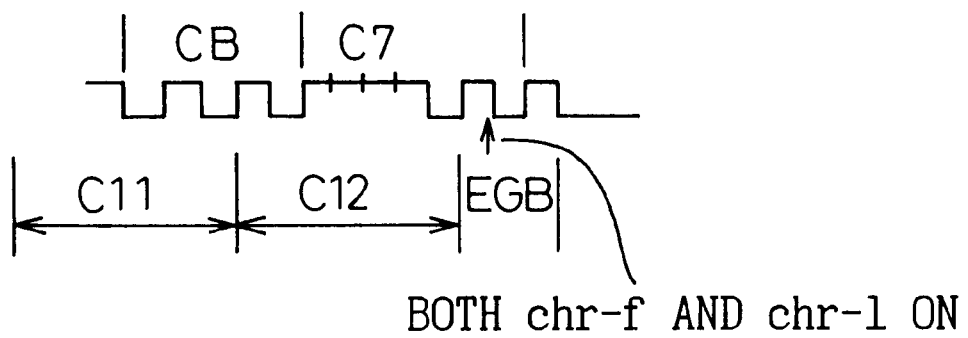

In the case where neither conditions is met, it indicates that in spite of their apparently correct configuration, it is not actually known whether they are actually CB and EGB, respectively. In the case where 0x0.3 is set in "chkreg", the condition of FIG. 12E or FIGS. 17A and 17B is estimated.

Figure 17A:
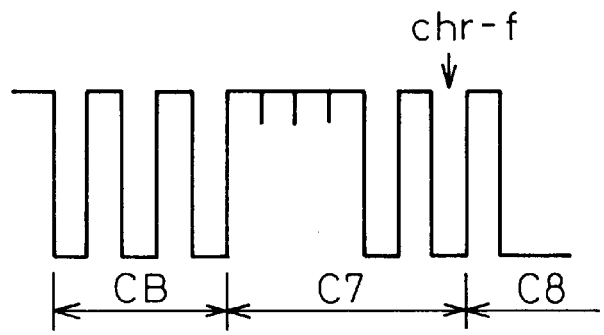
FIGS. 17A and 17B are diagrams showing the state in which the chr-f flag and the chr-l flag are set for the same bar.
Figure 17B:
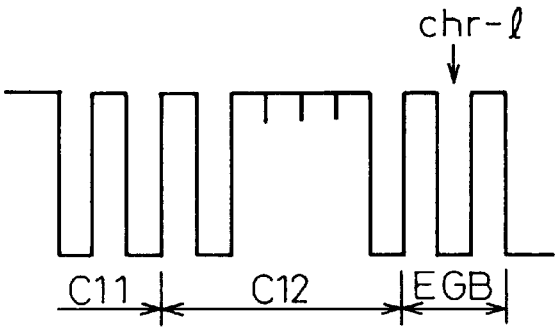

In FIG. 17A, shows the provisional decision based on steps 10 to 12, and FIG. 17B shows the provisional decision based on steps 13 to 15.

Explanation will be made about FIG. 17A. The contents of the decision show that the read bar code has C7 adjacent to CB and the black bar of one module adjacent to C7 is considered the leading bar of C8.

In the case of FIG. 17B, on the other hand, C12 can be considered to have been read before EGB. In this case, the bar recognized as CB in FIG. 17A is interpreted to be a bar constituting a part of the character C11 in FIG. 17B.

Comparison of the two cases shows that the two bars at the tail end of CB and the two leading bars in C7 in FIG. 17A constitute C12 of FIG. 17B, while the two tail end bars of C7 and the leading black bar of C8 in FIG. 17A can be interpreted to constitute EGB of FIG. 17B.

As a result, with the bar in FIG. 17A, both chr-l and chr-f flags are set. In the case where the decision in step 20 is that chkreg=3, therefore, step 21 checks the character length of the C11 and C12, and decides whether characters C11 and C12 of FIG. 17B are both seven modules or not.

In the case where the character length check result is NG, the bar which has been determined to be EGB in FIG. 17B is actually considered a portion of C8 in FIG. 17A. Thus the detection of CB is decided (step 12), and "decdirec" is set to 3, with the process proceeding to C. In the case where the character check result is OK, on the other hand, a decision can be made for neither in FIG. 17A or in FIG. 17B, so that the process proceeds to A to search the next data. The search of the next data can determine the configuration of the succeeding data. It is possible whether or not the bar of FIG. 17 for which decision is pending in step 21 is associated with FIG. 17A or FIG. 17B.

Now, the process of the primary bar code search is over.

Figure 18:
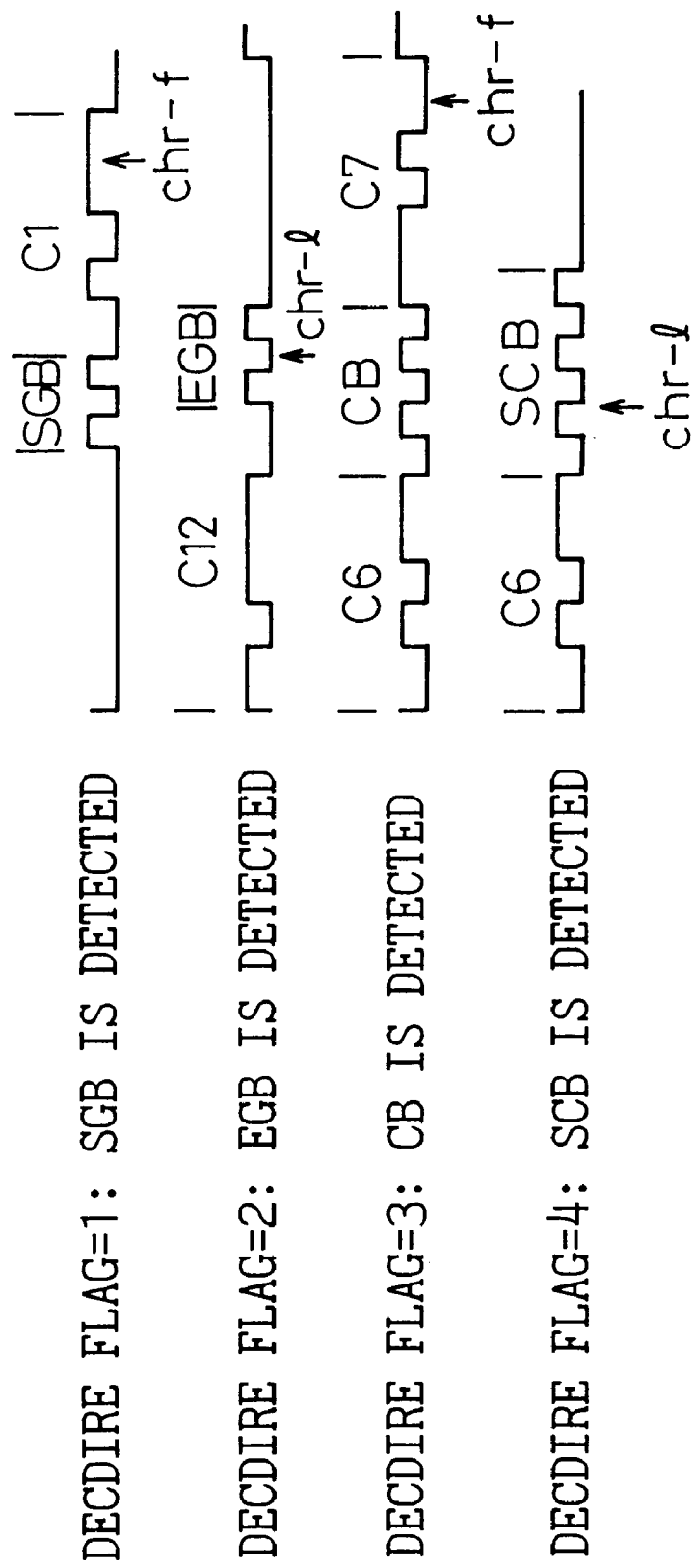
FIG. 18 is a diagram showing the output result of the primary search processing.
Figure 19A:
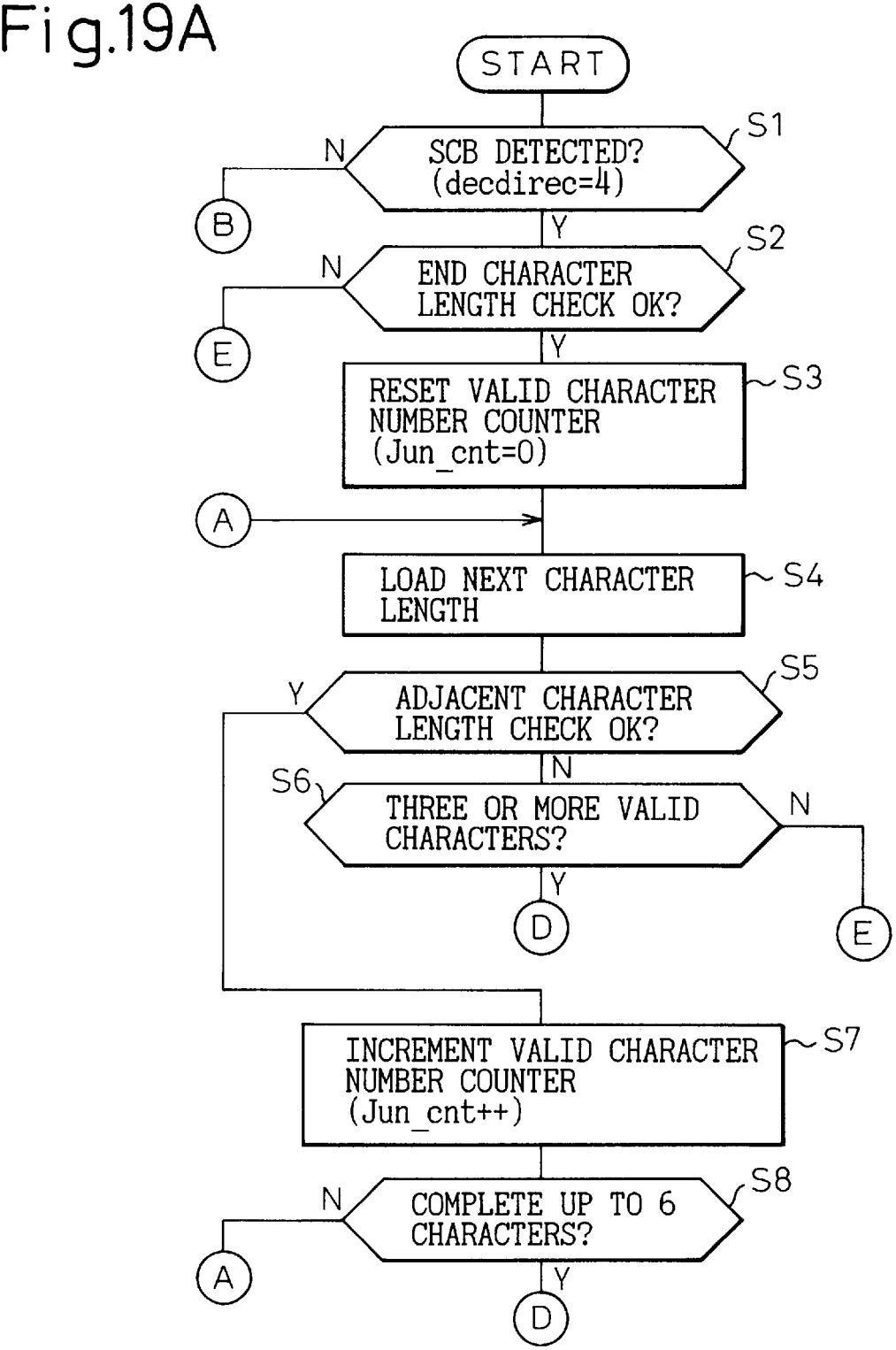
FIG. 19A is a flowchart showing the secondary processing of bar code search.
Figure 19B:
FIG. 19B shows a bar configuration example of a bar code.

FIG. 18 is a diagram for explaining the "decdirec" flag. The "decdirec" flag assumes a value of 1 to 4, and indicates the scanning type shown in FIG. 10A to FIG. 10E as well as the features (CB, GB or the like) detected.

In the case where "decdirec"=1, the detection of SGB is indicated. In similar fashion, when "decdirec"=2, 3 or 4, the detection of EGB, CB or SCB, respectively, is indicated. As a result of the primary search process, the value of "decdirec" is produced.

FIGS. 19A to 22D are flowcharts showing in detail the secondary bar code search process.

In this process based on the result of the primary bar code search process, whether or not the decision of the scanning type as shown in FIG. 10D is right or not is checked. For the scanning type as shown in FIG. 10D, the data interpreted to be SCB must be checked whether it is really SCB or not.

First, step 1 determines the value of "decdirec", and decides whether or not SCB is detected (in other words, "decdirec"=4). Upon decision that SCB is not detected, the process proceeds to step B. Upon a decision that SCB is detected, on the other hand, step 2 checks the character length of the data (the length of the end character corresponding to C6 in FIG. 19B) detected before SCB. In the process, it is checked whether or not C6 has a width of seven modules.

In the case where the decision in step 2 is that C6 is not seven modules, the process proceeds to E. If the end character length check result in step 2 is OK, on the other hand, step 3 resets the valid character number counter (juncnt=0).

The valid character number counter is for counting the number of characters for which the length check result is OK, or especially, the number of characters for which the result of the successive character length checks is OK. "jun" indicates the forward direction which is the same direction as scanning. In this case, the "juncnt" count value is assumed to be the number of valid characters scanned before SCB.

After the valid character number counter is reset, step 4 reads the length of the next character, i.e., character C5 before character C6, thereby checking the length of the adjacent characters (step 5). In the process, the character length of C6 is compared with that of C5. In the case where the C5 character length is included within a predetermined range, say, within ±25% of the C6 character length, the adjacent character length check result is considered OK.

As described above, in the case where the adjacent character length check result is OK, step 7 increments the valid character number counter (juncnt). Then, the next step decides whether or not the six-character check corresponding to the number of characters for one block of UPC/E is over on the basis of the "juncnt" value (step 8).

If the decision is that the check is not complete up to six characters, the process proceeds to A and returns to step 4, where the character lengths are sequentially read to check the adjacent character lengths. Upon complete check of six characters, on the other hand, the process proceeds to D.

In the case where the adjacent character length check result is NG in step 5, in contrast, decision is made as to whether the number of valid characters up to that point is at least three characters (step 6). In the process, it is assumed that at least three successive characters are required to be valid. In the case where three or more successive characters are valid, the reading is decided to be OK and the process proceeds to D. If three or more successive characters are not valid, on the other hand, the reading is considered NG and the process proceeds to E.

Figure 20A:
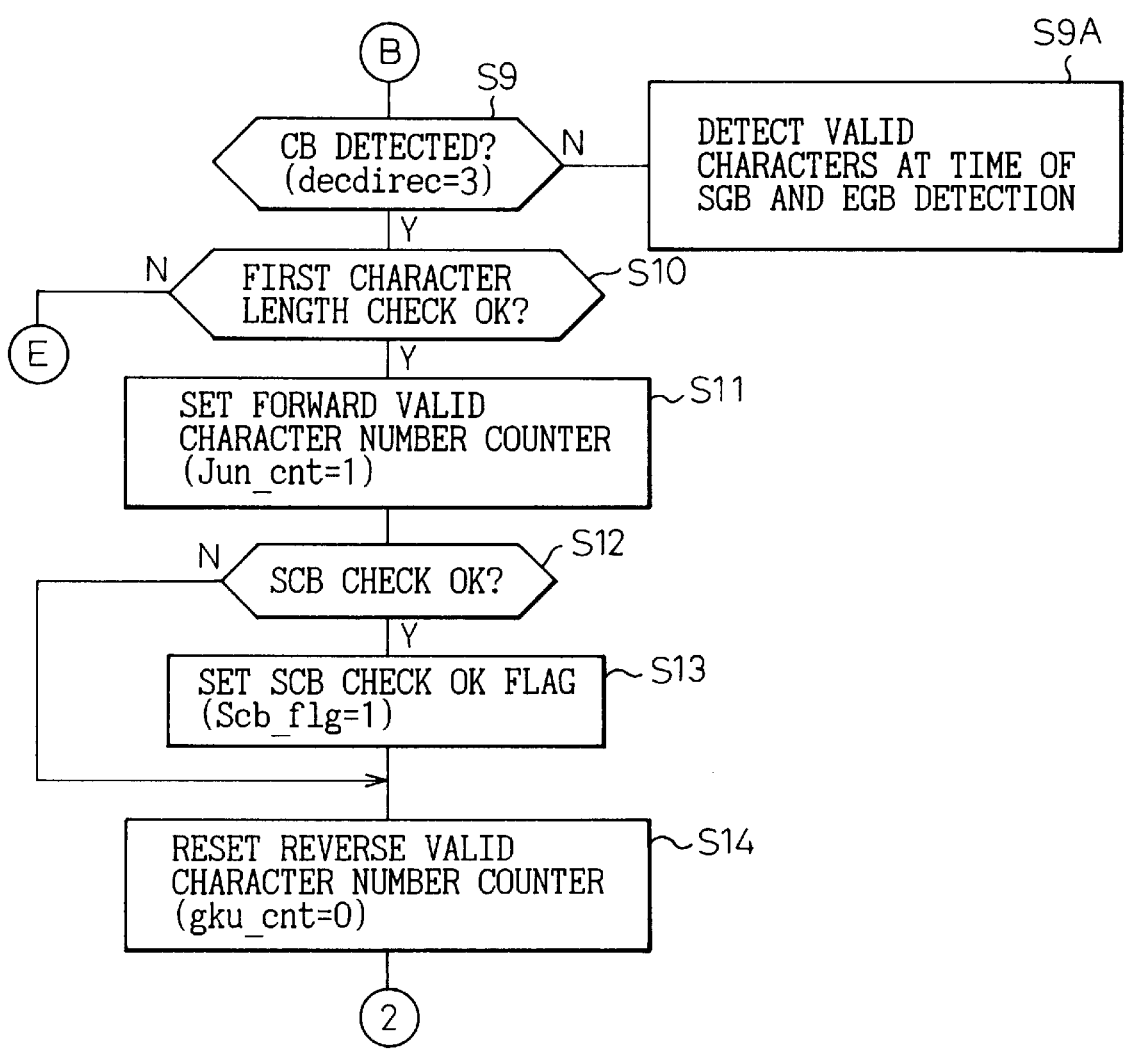
FIGS. 20A and 20B are a flowchart showing the secondary processing of a bar code search.

In the case where the decision in step 1 is that SCB is not detected, then step 9 in FIG. 20A decides whether CB (EAN-13) is detected, that is, whether or not "decdirec"=3.

If the decision is that CB is not detected, decision is made whether SGB or EGB is detected or not. Further, the process is performed for detecting a valid character. This can be achieved by using the technique thus far used for bar code process.

Even in the case where step 9 detects CB, this may be only an apparent phenomenon depending on the manner of scanning the bar code. Instead, the possibility remains that only the two black bars of SCB of UPC/E have been scanned (FIG. 20C). For this reason, the following process is carried out for ascertaining that the detected bar is CB of EAN-1 or the like.

Step 10 checks the character length (first character length) following CB (or SCB). A decision is made whether the first character is configured of seven modules. If the character length check result is NG, the process proceeds to E.

When the character length check result is OK, count 1 is set in the forward valid character number counter (juncnt) (step 11). Then, in order to ascertain whether the bar determined to be CB is SCB or not, step 12 decides whether the SCB check result is OK or not. It is also checked whether the bar involved is configured of six modules like SCB. In the case where the SCB check result is OK, the SCB check OK flag (scbflg) is set to 1 (step 13).

Next, step 14 resets the reverse valid character number counter (gkucnt=0). "gku" indicates the reverse direction, i.e., the direction opposite to the scanning direction. The reverse valid character number counter is for counting the number of valid characters scanned following CB/SCB.

Figure 20B:
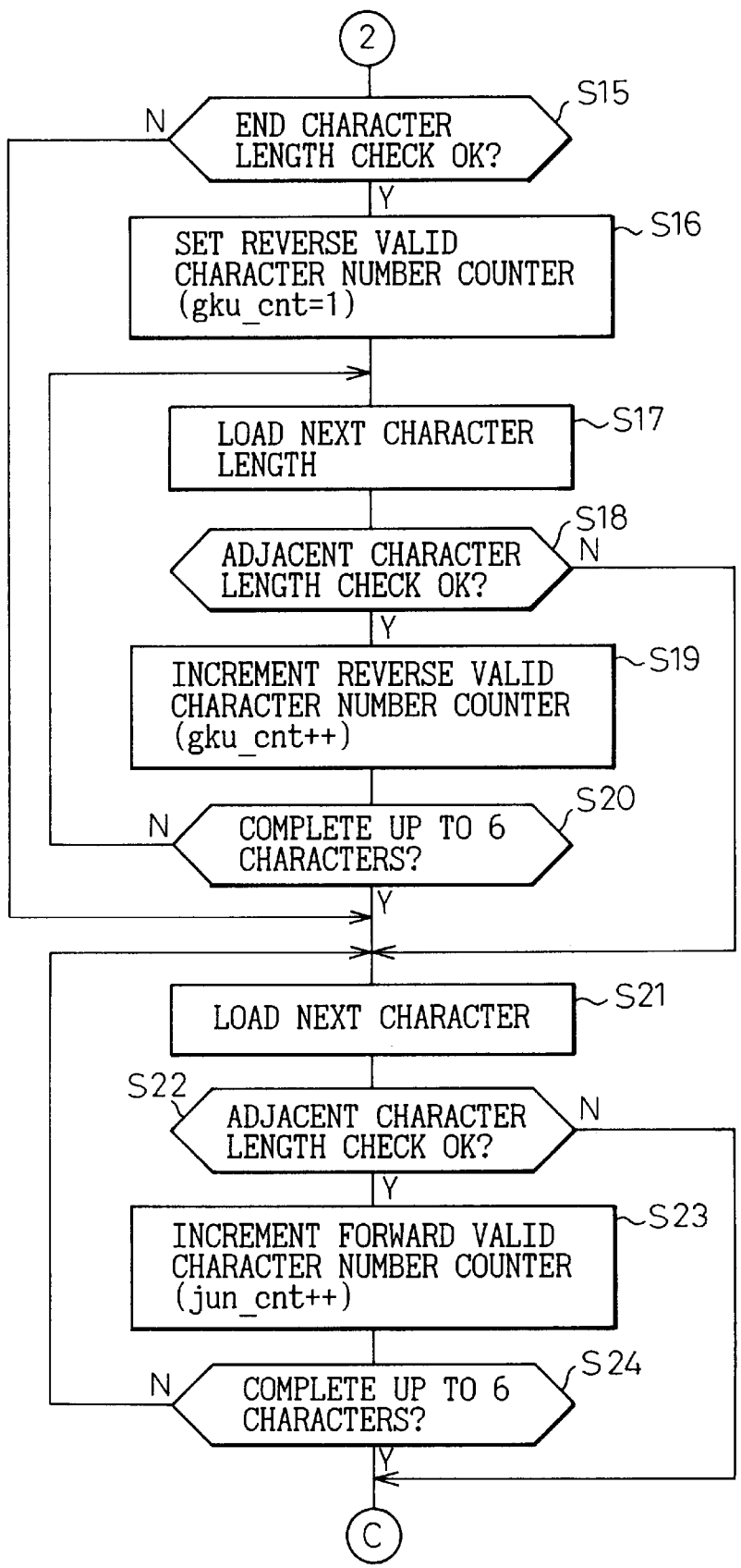
Figure 20C:
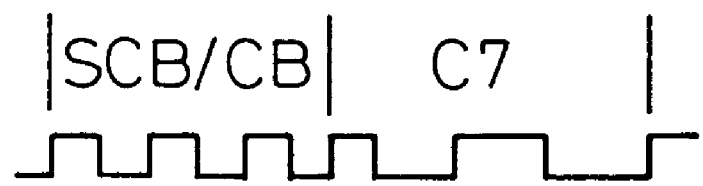
FIGS. 20C and 20D show bar configuration samples of bar codes.
Figure 20D:
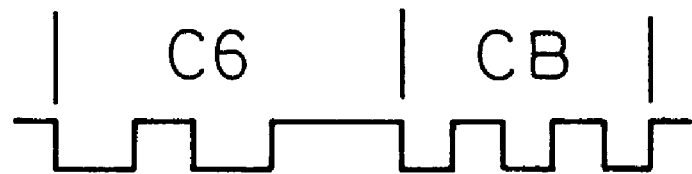

After step 14, the end character length is checked in step 15 in FIG. 20B (corresponding to the character length C6 in FIG. 20D). If the end character length check result is OK, count 1 is set in the reverse valid character number counter (step 16). The detection of valid characters in forward and reverse directions is indicative of the existence of a character before and after the bar taken as CB. The bar under consideration, therefore, is more likely to be CB of EAN-13 than SCB of UPC/E.

Then, step 17 reads the next character length (corresponding to C5 adjacent to C6) and checks the adjacent character length (step 18). This process is the same as step 5 except for the difference between forward and reverse directions. In the case where the adjacent character length check result is OK, the reverse valid character number counter is incremented (step 19). In this way, until the length of six successive adjacent characters are completely checked, or until the adjacent character check result is rejected as NG midway, the character length is checked sequentially.

In the case where the adjacent character length check result is NG, on the other hand, step 21 reads the next character length in forward direction and conducts the adjacent character length check (step 22). According to the result of this check, the forward valid character number counter is incremented (step 23). The adjacent character length check is continued until the six characters are covered, or until the adjacent character length check result is rejected as NG midway.

Upon complete check of six characters, or upon rejection as NG midway of the adjacent character length check, the process proceeds to C.

Figure 21A:
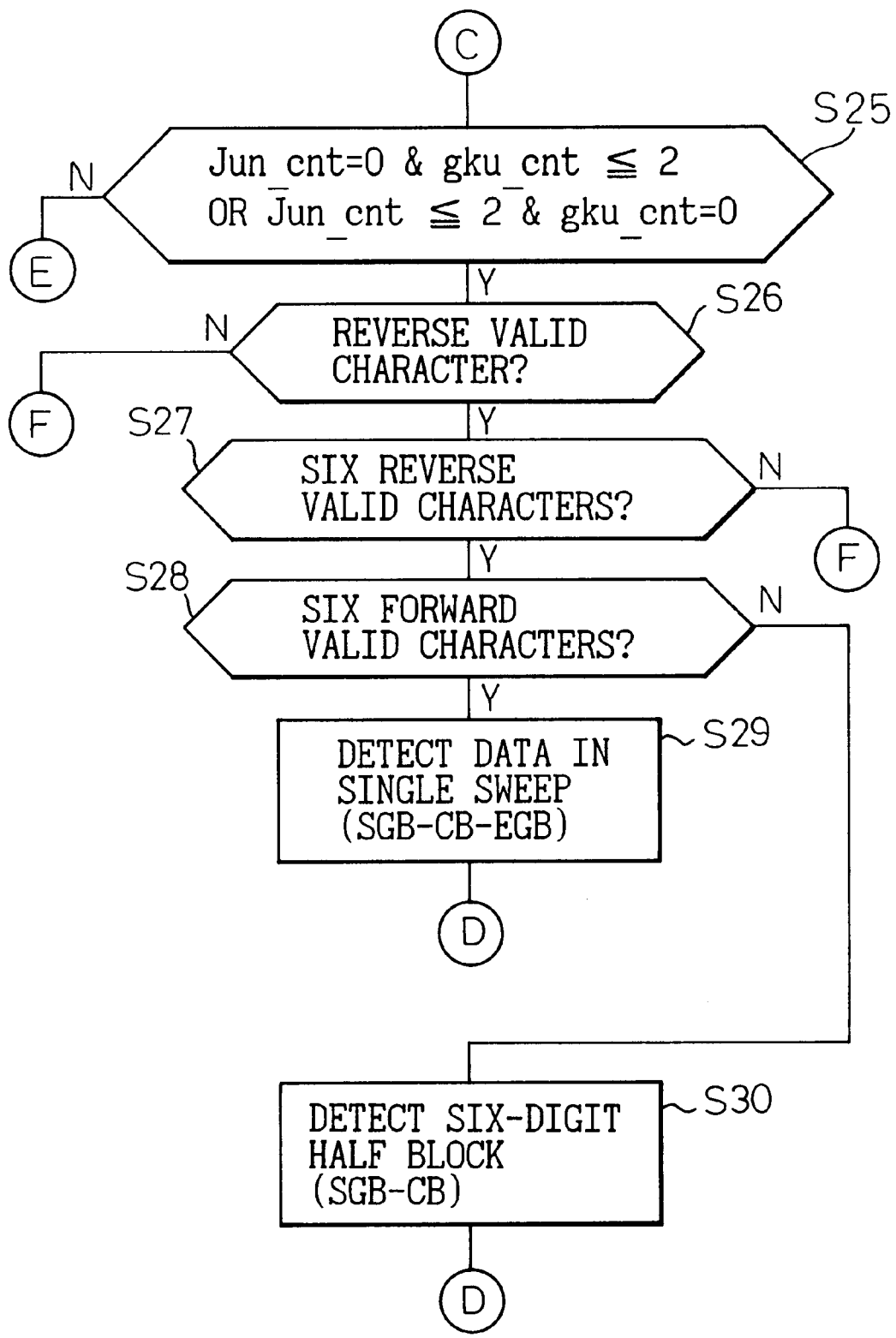

Step 25 in FIG. 21A decides whether "juncnt"=0 and "gkucnt"≦2, or "juncnt"≦2 and "gkucnt"=0. In the case where this condition is not met, the process proceeds to E for deciding that no valid character is detected thereby terminating the process.

In the case where the condition mentioned above is met in step 25, on the other hand, step 26 decides whether or not a valid character exists in reverse direction (i.e., whether "gkucnt">0). In the absence of a valid character in reverse direction, the process proceeds to F.

In the case where the condition is met in step 26, the following step is to decide whether or not the number of valid characters in reverse direction is six (step 27). If the number of valid characters in reverse direction is less than six, the process proceeds to F.

In the case where the number of valid characters in reverse direction is six, the following step is to decide whether the number of characters in forward direction is six or not (step 28). If the number of valid characters in forward direction is six, the presence of a total of 12 valid characters indicates that the UPC/A has been read in a single sweep (expressed as "single-sweep scan" or "block scan" in the drawing). Step 29 decides that the data is detected in a single sweep, and the process is passed to D.

If the number of valid characters in reverse direction is six but the number of valid characters in forward direction is less than six, on the other hand, the decision is that the six-digit block on one side of the EAN-13 (side in reverse direction) is detected, and the process proceeds to step D (step 30).

Also, if the decision in step 25 or step 27 is NO, the next decision is as to whether or not the number of valid characters in forward direction is 4 or 6 (step 31 in FIG. 21B). Then, in the case where the number of valid characters in forward direction is 4 or 6, step 32 decides whether or not the end character length check result is OK. If the end character length check result is OK, step 33 further decides whether the length of the end margin outside of the end character is OK. The end margin is checked whether it has a specified length.

If the end margin length check result is OK, it is determined that EGB (means GB located at the last scanning part of the bar code in the scanning direction) of EAN-13, EAN-8 or UPC/E (step 34) is detected, so that the EGB detection flag is set with the process proceeding to G. Also in the case where the decision in steps 31 to 33 are all NO, the process proceeds to G.

Figure 22A:
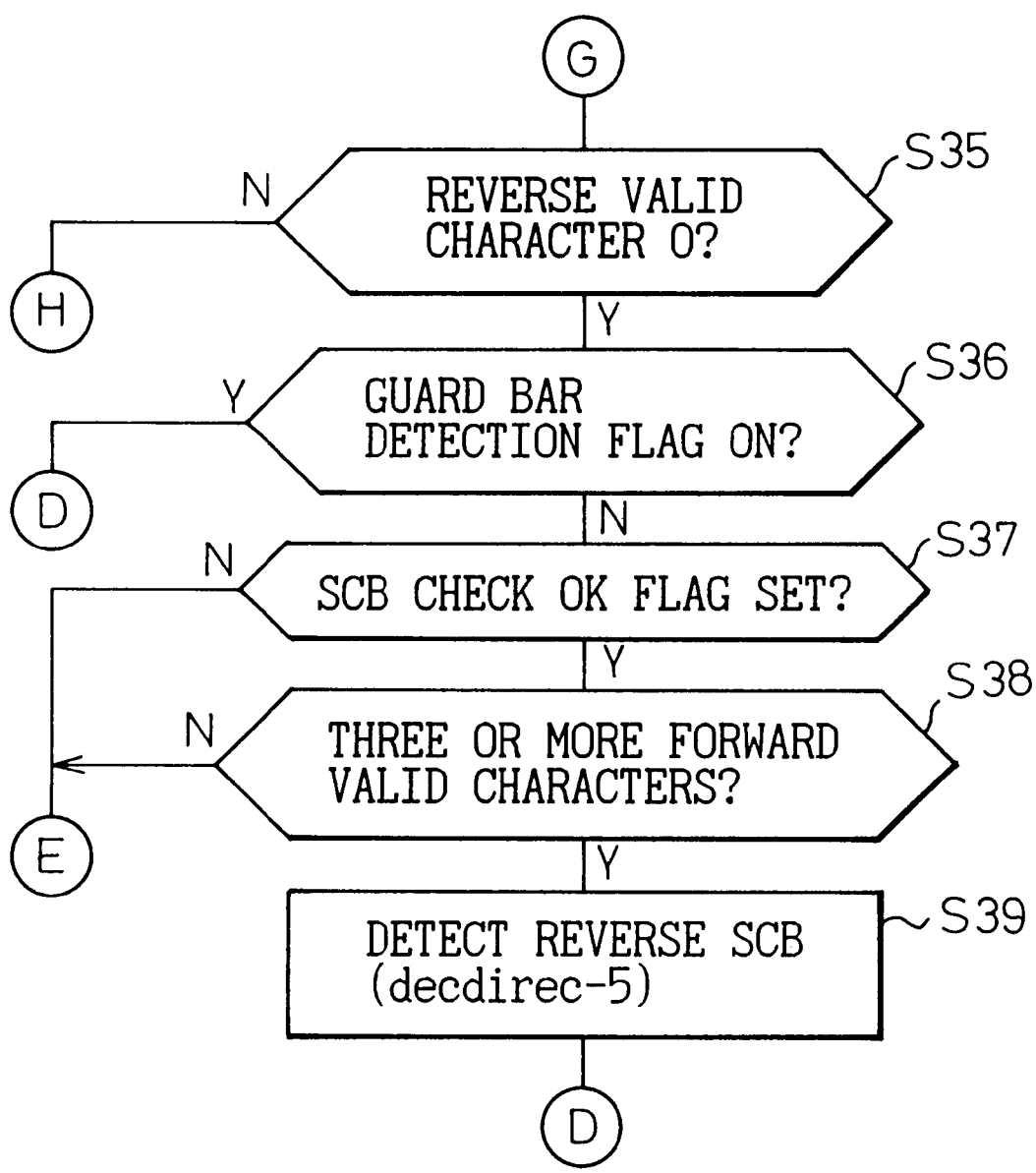
FIGS. 22A, 22B, 22C and 22D are a flowchart showing the secondary processing of bar code search.

These decisions are followed by the decision in step 35 of FIG. 22A as to whether or not the number of valid characters in reverse direction is 0. If the number of valid characters in reverse direction is not less than one, the process proceeds to H.

In the case where the number of valid characters in reverse direction is 0, on the other hand, the presence of characters in forward direction but not in reverse direction is indicated, and therefore the possibility of the particular bar code being UPC/E arises. Step 36 accordingly decides whether the guard bar detection flag (equivalent to that of step 34) is set or not. In the case where the guard bar detection flag is set, the bar code involved is determined to be one block of EAN-1 or the like, so that the process proceeds to D to decide that a valid character is detected thereby terminating the process.

If the guard bar detection flag is off, on the other hand, the next step 37 decides whether or not the SCB check OK flag is set. If the SCB check OK flag is set, the bar code can be determined to be UPC/E. In order to determine the legitimacy of the data, however, step 38 decides whether or not the number of valid characters in forward direction is three or more. The number of these valid characters may be arbitrary. A greater number of characters can improve the legitimacy of the result of reading at the expense of a lower probability of successful reading. A decreased number of characters, on the other hand, leads to a higher probability of decision on successful reading since the condition to be met is relaxed at the expense of a higher possibility of decision error.

In the case where the number of valid characters in reverse direction is three or more, step 39 decides that a reverse SCB is detected. In other words, the decision indicates that the SCB is detected at the far end in the scanning direction. Then, "decdirec" flag is set to five, with the process proceeding to D.

Figure 22B:
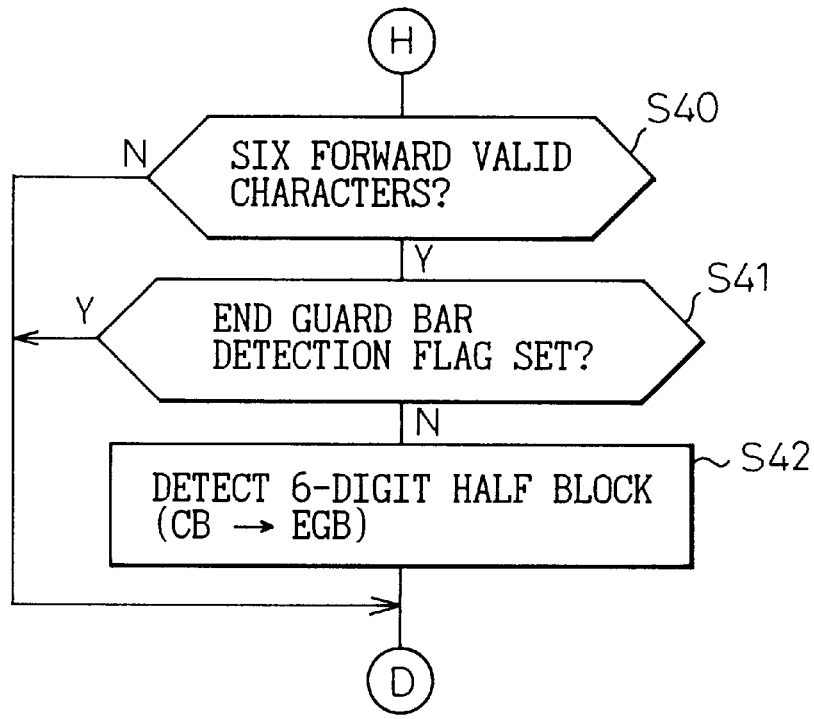
Figure 22C:
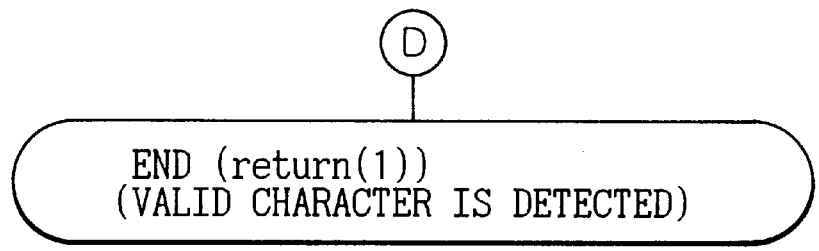
Figure 22D:
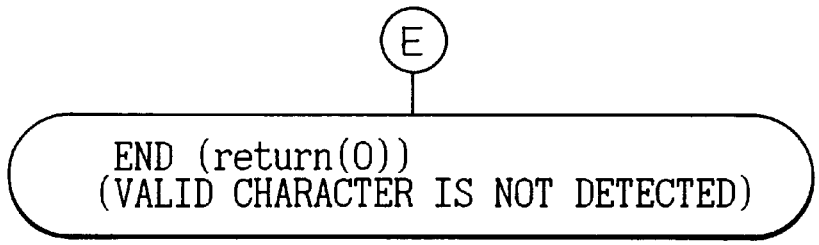
Figure 23A:
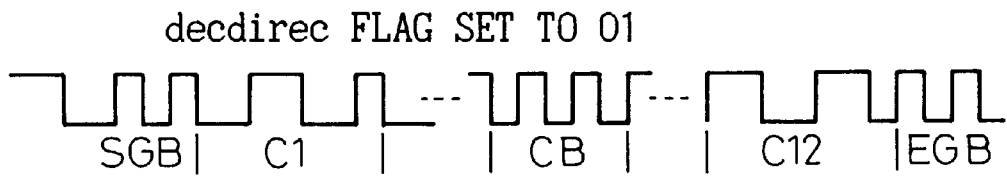
FIGS. 23A, 23B, 23C, 23D and 23E are diagrams showing the result of the secondary processing of bar code search.
Figure 23B:
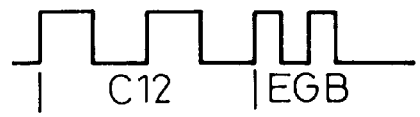
Figure 23C:
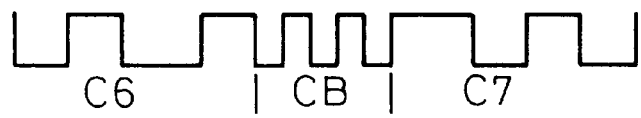
Figure 23D:
Figure 23E:
Figure 24A:
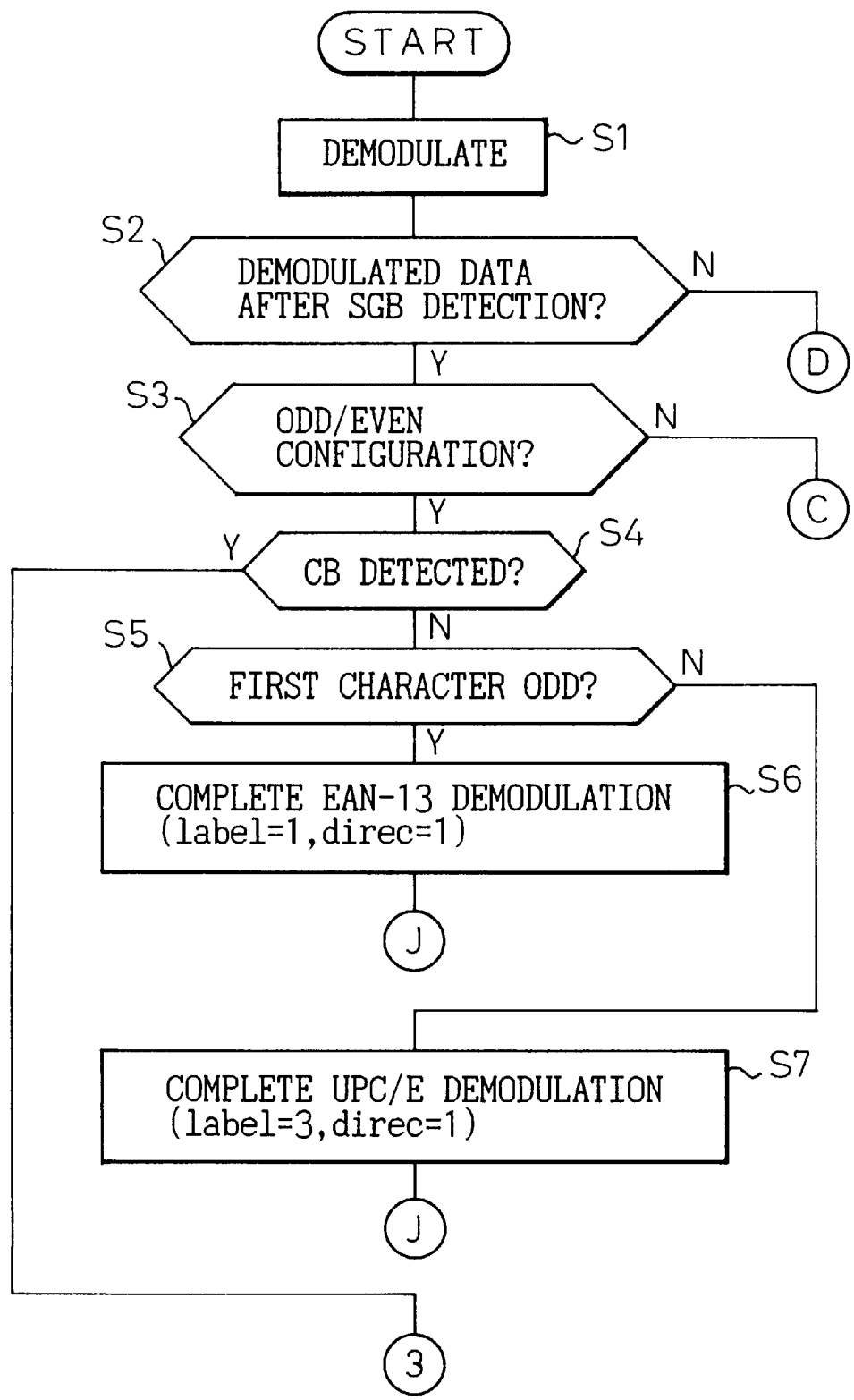
FIGS. 24A and 24B are a flowchart showing the processing of bar code demodulation.
Figure 24B:
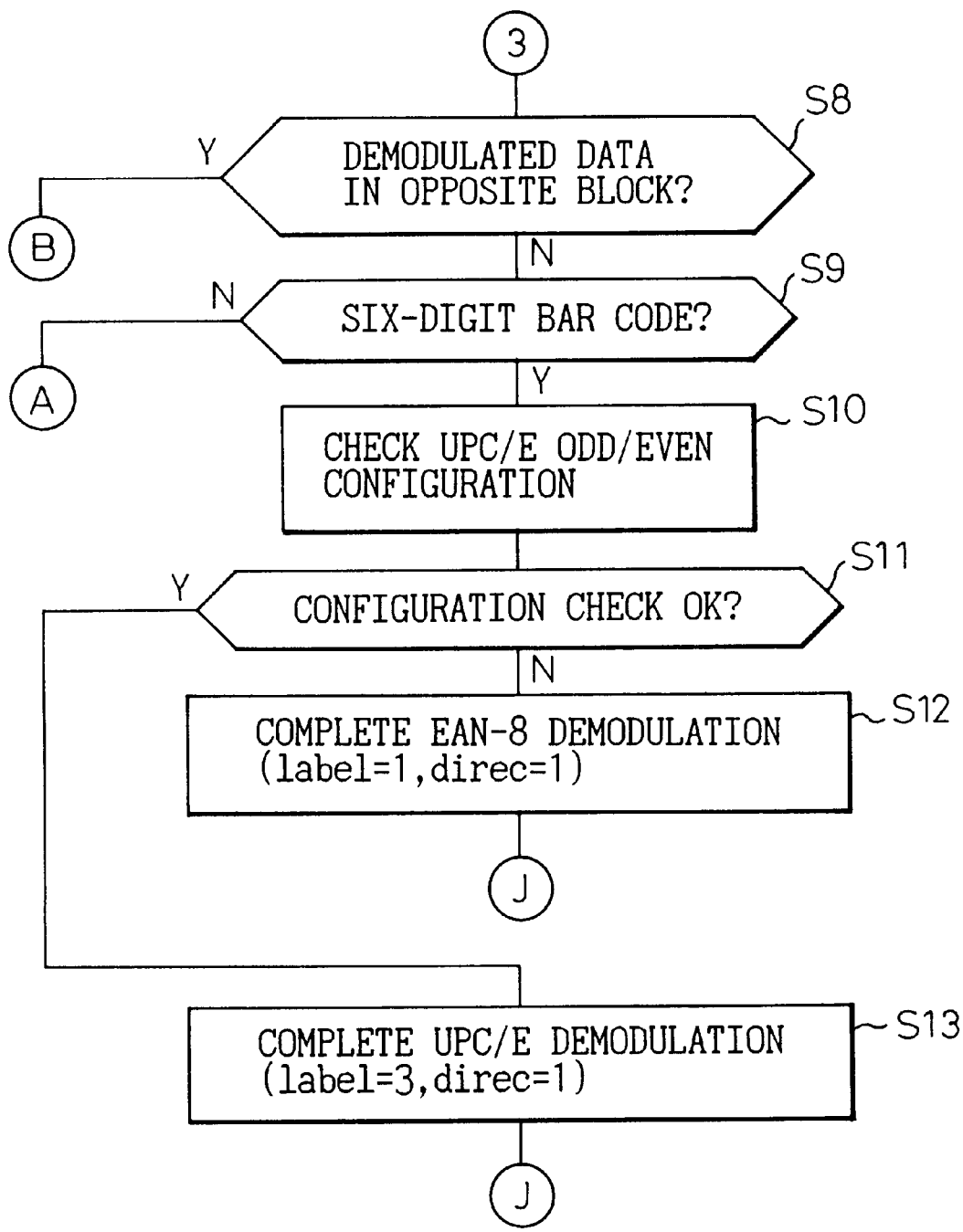

In the case where the decision in step 35 is that the number of valid characters in reverse direction is not zero, it is decided whether or not the number of valid characters in forward direction is 6 (step 40 in FIG. 22B). In the case where the number of valid characters in forward direction is 6, it is further checked whether the EGB detection flag is set or not (step 41). If the check result is NO, it is decided that one block of the EAN-13 scanned from CB to EGB is detected, and the process proceeds to D (step 42).

In the case where the decision in step 40 is that the number of valid characters in a forward direction is not six, on the other hand, the number of valid characters is four considering the conditions specified in step 31. As a result, the bar code detected is determined to be one block of the EAN-8. Also, in the case where the EGB detection flag is set in step 41, it indicates that CB is scanned but not GB and that all the characters constituting the block are valid.

FIGS. 23A to 23E are diagrams collectively showing the output result of the secondary search process.

In the case where a valid character is calculated after SGB detection, the "decdirec" flag is set to 1 (FIG. 23A), the "juncnt" count indicates the number of valid characters (3 to 6) in the left block, and the "gkucnt" count represents the number of valid characters (0 to 6) in the right block.

If a valid character is calculated after detection of EGB, the "decdirec" flag is set to 2 (FIG. 23B), and the "juncnt" count (number of valid characters) becomes 3 to 6.

If a valid character is calculated after CB detection, on the other hand, the "decdirec" flag is set to 3 (FIG. 23C), so that the "juncnt" count indicates the number of valid characters in the right block, and the "gkucnt" count indicates the number of valid characters in the left block.

If a valid character is calculated after detection of SCB in forward scanning, the "decdirec" flag is set to 4 (FIG. 23D), and the "juncnt" count indicates the number of valid characters (3 to 6).

In the case where a valid character is calculated after SCB detection in reverse scanning, the "decdirec" flag is set to 5 (FIG. 23E), and the "juncnt" indicates the number of valid characters (3 to 6).

FIGS. 24A to 29C are a flowchart showing the demodulation process in detail.

A bar code is demodulated from the bar code data considered valid as a result of the secondary search process. Even in the case where only a portion of the bar code is scanned, the demodulation process is carried out if the particular portion is judges to be valid. The demodulation process makes it possible to produce numerical information represented by each character.

Step 1 of the demodulation process is to demodulate each character. In the UPC/E bar code, the numerical values of 0 to 9 are assigned according to the number of modules of white and black bars. Also, there are 20 character combinations due to the coexistence of the characters of odd configuration (in which the total number of modules for black bars is odd) and the characters of even configuration (in which the total number of modules for black bars is even).

Figures 30, 31A, 31B:
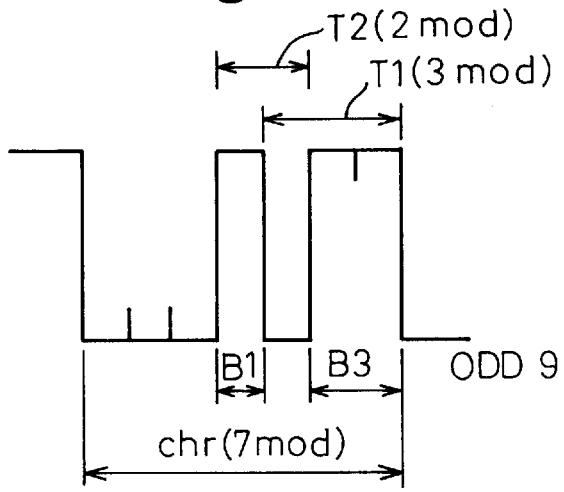
FIG. 30 is a diagram showing the delta distance.
FIGS. 31A and 31B are diagrams showing a configuration of a table for bar code demodulation using the delta distance.

Various methods of bar code demodulation are known. In order to minimize the effect of the blotting and thinning of the bar code in printing operation as described above, a known demodulation method is based on the combined size of the widths of adjacent white and black bars (called the delta distance) (FIG. 30). This method is widely known. In this method, the tables shown in FIGS. 31A and 31B are referred to based on the bar width in terms of delta distance, whereby the demodulation result is obtained.

FIG. 31A shows the relation between the number of modules in T01 and the number of modules in T02 of one character shown in FIG. 30 and the numerical values of the corresponding character. In the tables, E' designates a character of even configuration, and O' a character of odd configuration. By reference to these tables, most characters can be demodulated. Like E2 and E8, however, the same number of modules of T01 and T02 may represent different numerical values. This is due to the fact that 20 numerical values are specified while 2 to 4 modules for both T01 and T02 can make only 16 combinations available.

Consequently, as for the eight characters that cannot be defined from the table of FIG. 31A, the table of FIG. 31B is referred to on the basis of the width of the black bars B1 and B3 making up each character. Considering the conditions specified in the table of FIG. 31A and the conditions specified in the table of FIG. 31B at the same time, these eight characters can also be demodulated.

As described above, the numerical value represented by a character can be determined on the basis of the bar width of the character.

Upon completion of the demodulation process (step 1), the type of the bar code read is decided. This decision is used for the synthesis of the bar code data described later.

Step 2 decides whether the demodulated data is the one after detection of SGB. In the case where the demodulated data is not the one after SGB detection, the process proceeds to D. If the decision is that the data is the one after SGB detection, on the other hand, it is decided whether the particular data has an odd/even configuration (step 3).

The odd/even configuration, as described with reference to EAN-13, is a configuration in which characters having an odd number of modules of black bars coexist with the characters having an even number of modules of black bars, and corresponds to the bar configuration of the left block of EAN-13 (EAN-8) or UPC/E. In the absence of the odd/even configuration, on the other hand, it follows that the particular bar code data represents the right block data of EAN-13 (EAN-8).

In the case where the decision in step 3 is that the bar code data providing the basis of the demodulation data has not any odd/even configuration, the process proceeds to C.

In the case where step 3 decides that the odd/even configuration is involved, on the other hand, the next step is to decide whether CB (SCB) is detected (step 4). If CB is not detected, the next decision is whether the first character (character adjacent to SGB) is an odd number, i.e., the total number of modules of the black bars is an odd number (step 5).

Figure 32A:
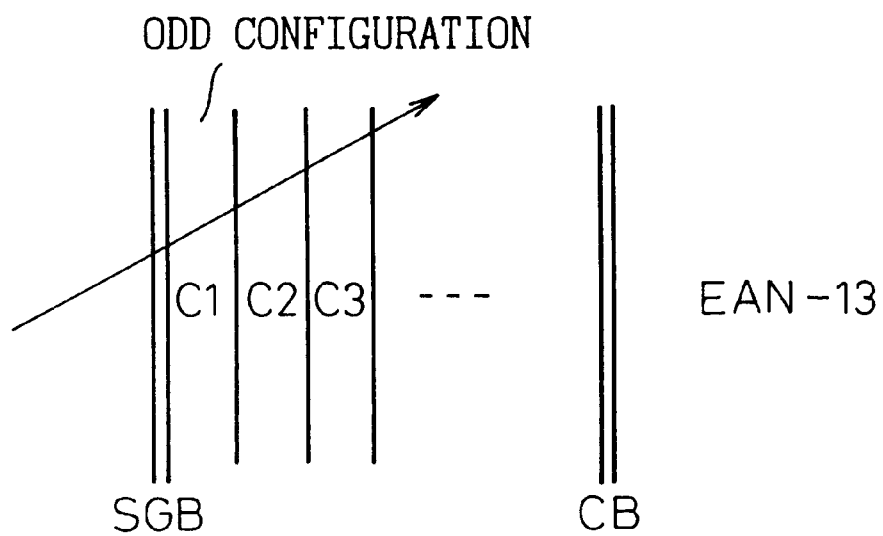
FIGS. 32A and 32B are diagrams showing the configuration difference of the leading characters in EAN-13 and UPC/E.
Figure 32B:
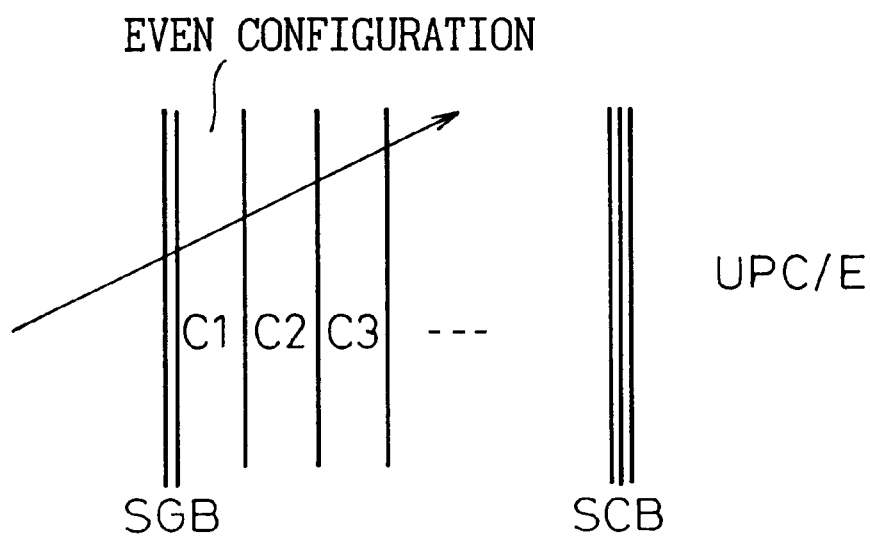

As shown in FIGS. 32A and 32B, the first character of EAN-13 is defined to have an odd configuration and the first character of UPC/E is defined to have an even configuration. As a result, whether a particular bar code belongs to EAN-13 or UPC/E can be determined by checking the configuration of the first character.

In the case where step 5 decides that the first character has an odd configuration, step 6 decides that the EAN-13 is completely demodulated, and the "label" flag is set to 1 and the "direc" flag is set to 1. The meaning of these labels will be described later.

In the case where the first character has no odd configuration, on the other hand, it is decided that the demodulation of UPC/E is complete, and the "label" flag is set to 3 and the "direc" flag to 1 (step 7).

If the decision in step 4 is that CB is detected, step 8 decides whether or not the opposite block (on the other side of CB) contains demodulated data. In the presence of the demodulated data in the opposite block, the process proceeds to B.

In the absence of demodulated data in the opposite block, step 9 decides whether the particular bar code is a 6-digit one. If it is not a six-digit one, the particular demodulated data can be determined as the data for EAN-13 read in plural sweeps or the data for EAN-8 (left block for both). In such a case, the process proceeds to A.

In the case where the decision in step 10 is that the demodulated data represents a 6-digit bar code, on the other hand, it can be decided that UPC/E or one block of EAN-13 has been read in plural sweeps. In this case, the particular bar code is checked whether it has the odd/even configuration of UPC/E (step 10). The configuration is checked according to whether the particular bar code meets a specified configuration requirement.

In the case where the decision in step 11 is that the configuration check result is NG, the demodulated data is determined as EAN-13, and the "label" flag is set and "direc" flag to 1 (step 12).

In the case where the configuration check result is OK, on the other hand, it is decided that the demodulation of UPC/E is complete and "label" flag is set to 3 and "direc" flag to 1 (step 13).

Figure 25A:
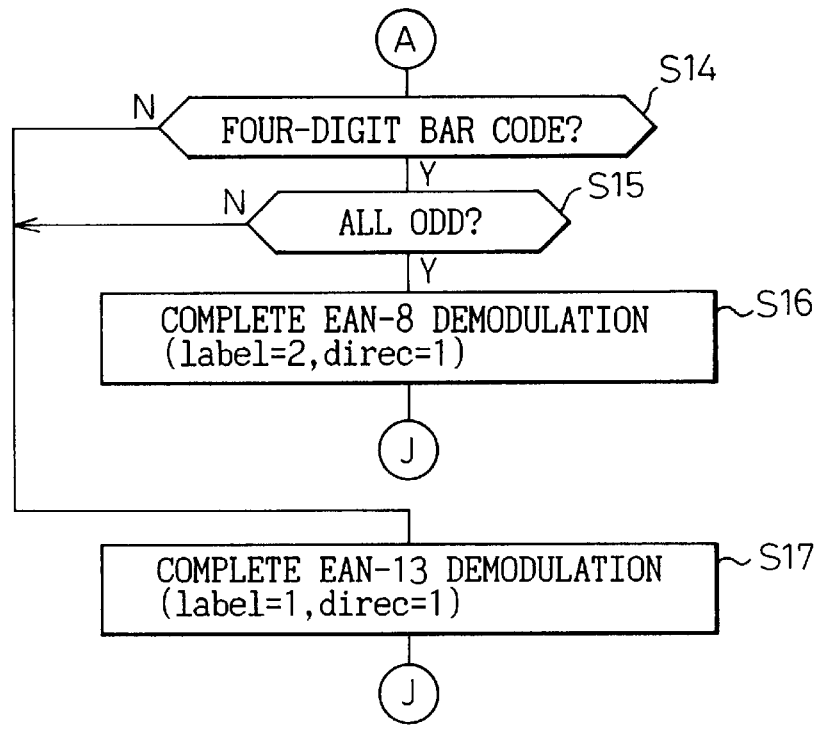
FIGS. 25A and 25B are a flowchart showing the processing of bar code demodulation.

In the case where the decision in step 9 is that the demodulated data is not that of a 6-digit bar code, step 14 in FIG. 25A decides whether the demodulated data is that of a four-digit bar code data (or contains a portion corresponding to a four-digit demodulated data). In the case where the decision in step 14 is that the demodulated data is that of a four-digit bar code and the GB and CB are detected, then the next decision is whether the bar code has an odd configuration (step 15). In the case where all characters are of odd configuration, it is determined as the demodulated data of EAN-8 (left block), so that the "label" flag is set to 2 and the "direc" flag to 1 (step 16).

In the case where the decision in steps 14 and 15 are both NO, the demodulated data is determined as that of EAN-13 (left block), so that the "label" flag is set to 1 and the "direc" flag to 1 (step 17).

Regardless of which demodulated data is obtained, the process proceeds to J.

Figure 25B:
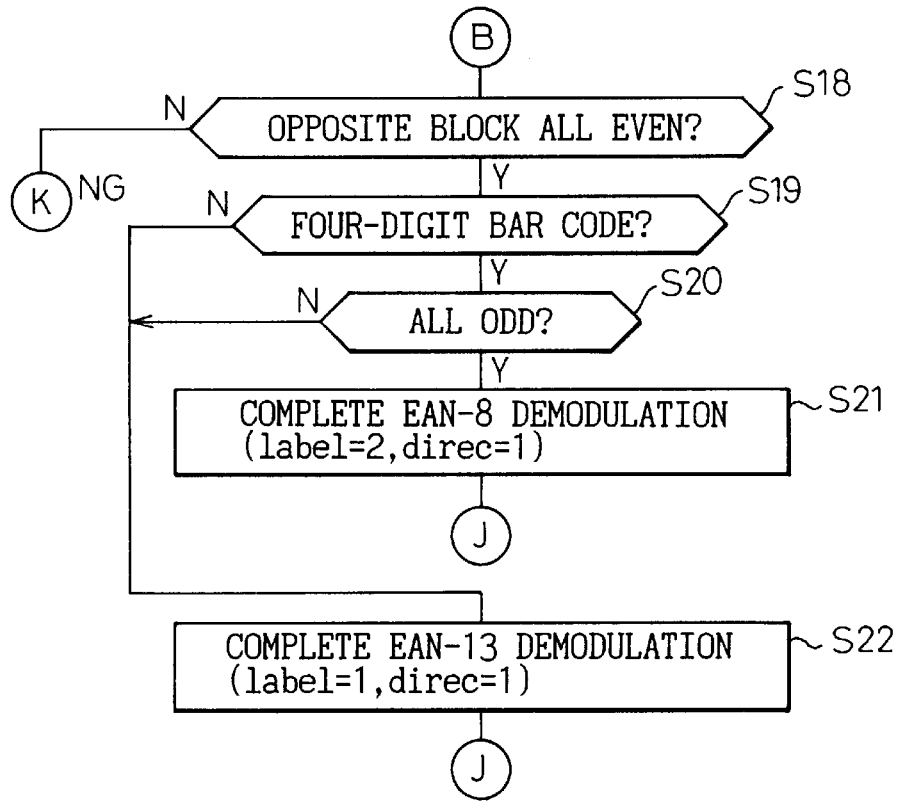

In the case where the decision in step 8 in FIG. 25B is that the demodulated data is present in the opposite block of CB, step 18 decides whether all the characters of the opposite block are of even configuration. In the case where all the characters of the opposite block are not of an even configuration, the read operation is determined as NG and the process proceeds to K.

When all the characters of the opposite block are of an even configuration, on the other hand, step 19 decides whether a four-digit bar code is involved or not. In the case of a four-digit bar code, step 20 decides whether al the characters in the block are of an odd configuration. If all the characters in the block have an odd configuration, the demodulated data are determined to represent the left block of EAN-8, so that the "label" flag is set to 2 and the "direc" to 1 (step 21).

In the case where the decisions of steps 19 and 20 are both NO, the demodulated data is determined as representing the left block of EAN-13, and the "label" flag is set to 1 and "direc" to 1 (step 22).

In either case, the process proceeds to J.

If step 3 decides that the block data are not of an odd/even configuration, the data may be the right block data for EAN-13 and EAN-8.

Figure 26A:
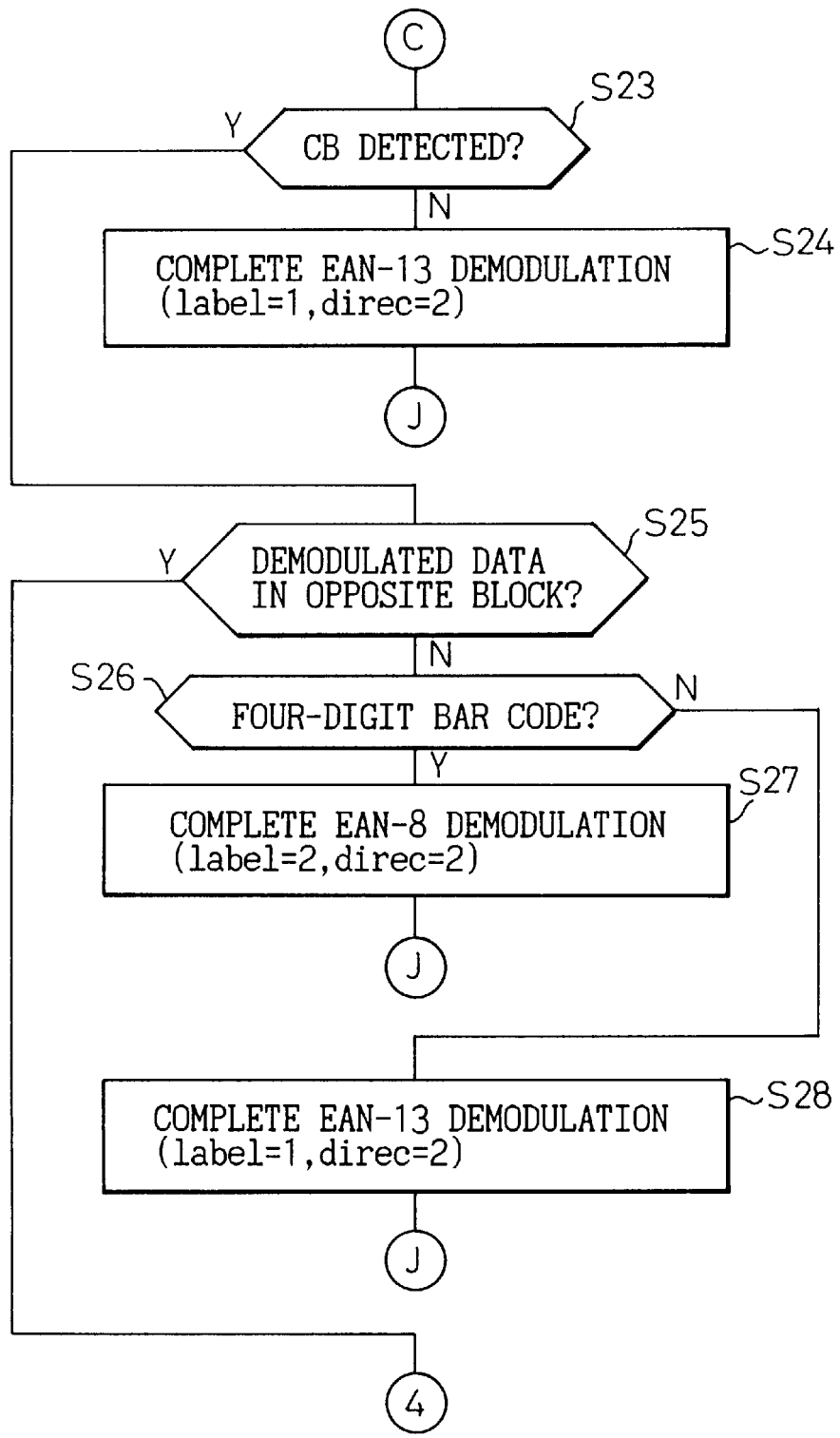
FIGS. 26A and 26B are a flowchart showing the processing of bar code demodulation.
Figure 26B:
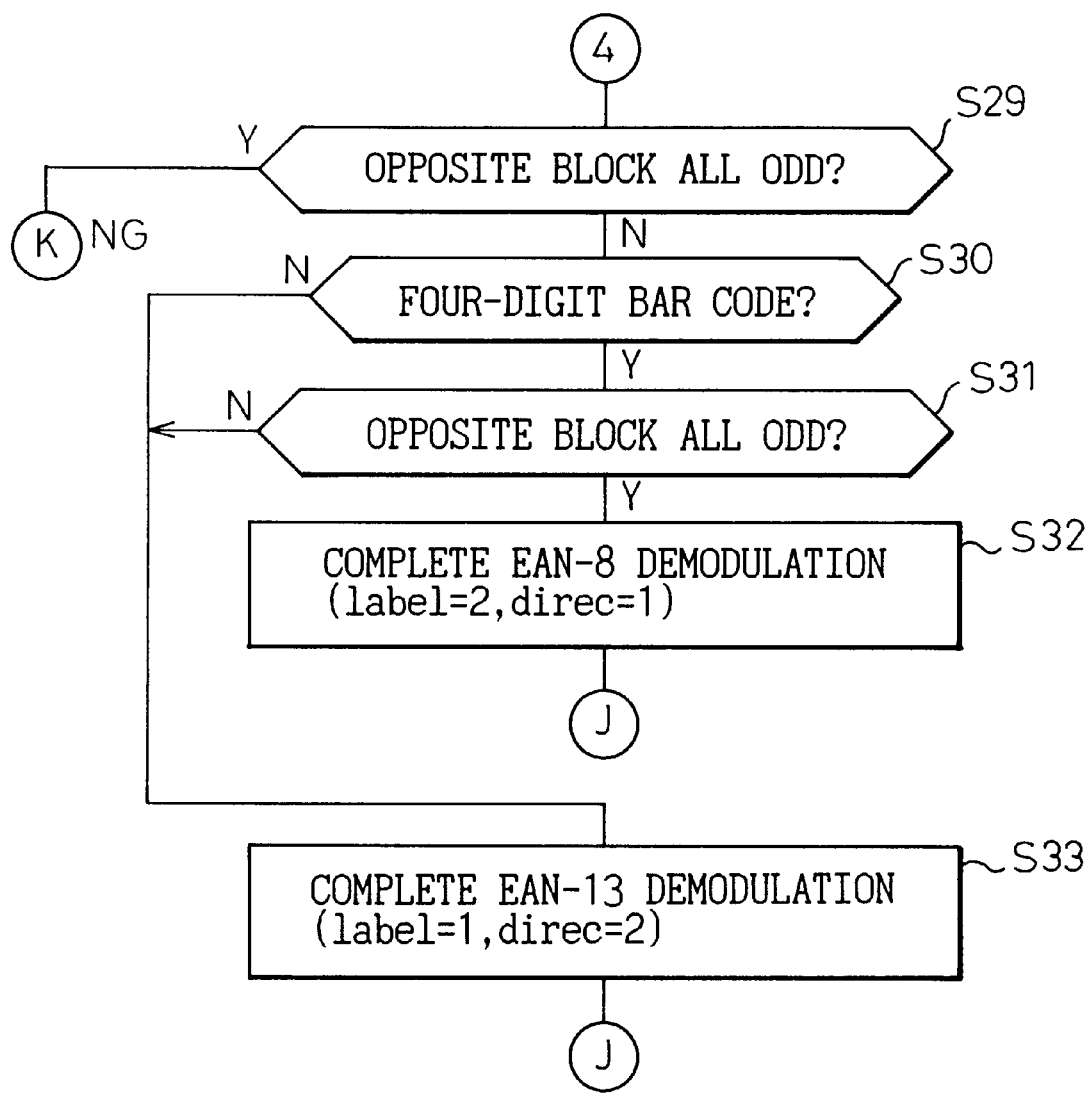

In view of this, the process C is followed by the decision in step 23 of FIG. 26A whether CB is detected. If CB is not detected, the demodulated data is determined as the one for the right block of EAN-13 read in plural sweeps, so that the "label" flag is set to 1 and the "direc" flag to 2 (step 24).

In the case where the decision in step 23 is that CB is detected, on the other hand, step 25 decides whether or not the demodulated data is contained in the opposite block. If the data is not contained in the opposite block, it is decided whether the bar code has four digits (step 26). In the case of a four-digit bar code, the demodulated data is determined to belong to EAN-8, so that the "label" flag is set to 2 and the "direc" flag to 2 (step 27).

Also, if the decision in step 26 is that the demodulated data is not for a four-digit bar code, the demodulated data belongs to EAN-13. In this case, it is decided that the right block data of EAN-13 is involved, so that "label" flag is set to 1 and the "direc" flag to 2 (step 28).

In either case, the process proceeds to J.

In the case where the decision in step 25 is that the demodulated data is present in the opposite block, on the other hand, it is decided whether all the characters of the opposite block are of an even configuration (step 29). In the case where the characters of the opposite block are all of even configuration, a read error is known to derive from the bar code configuration, and the process proceeds to K considering that the decision is NG.

In the case where the characters of the opposite block are of not even configuration, on the other hand, it indicates that the bar code is normally read. In such a case, the next decision is whether or not the demodulated data is for a four-digit bar code (step 30). If the demodulated data is for a four-digit bar code, the next step decides whether all the characters of the opposite block are of odd configuration (step 31). When all the characters of the opposite block are of odd configuration, the data for EAN-8 are determined to have been demodulated in a single sweep, so that the "label" flag is set to 2 and the "direc" flag to 1 (step 32).

Assume that the characters of the opposite block are not of a four-digit bar code or that none of the characters of the opposite block is of odd configuration. Then, it is decided that the demodulation of the data including the right block of EAN-13 is complete, with the result that the "label" flag is set to 1 and the "direc" flag to 2 (step 33).

In either case, the process proceeds to J.

Figure 27A:
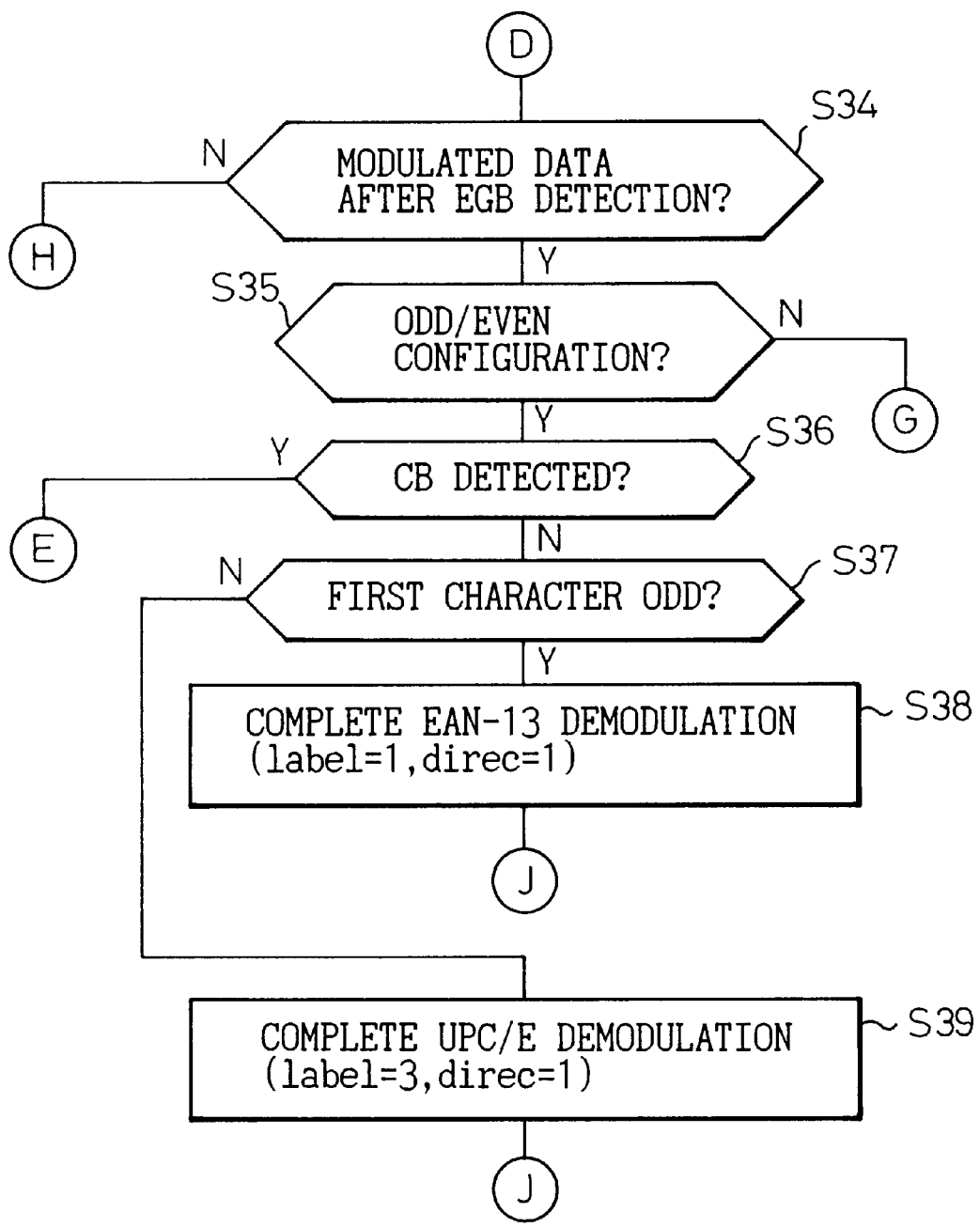
FIGS. 27A and 27B are a flowchart showing the processing of bar code demodulation.

If step 2 decides that the demodulated data is not the one after SGB is detected, then D is followed by the decision in step 34 of FIG. 27A whether the demodulated data is the one after EGB is detected. In the case where the decision is that the demodulated data is not the one after EGB is detected, the process proceeds to H.

In the case where step 2 decides that the demodulated data is the one after EGB is detected, on the other hand, the next decision is as to whether the particular block is of odd/even configuration (step 35). If the decision is that this block has no odd/even configuration, the process proceeds to G.

If the decision is that the block data is of odd/even configuration, on the other hand, the decision is made as to whether CB is detected (step 36). Upon detection of CB, the process proceeds to E.

If CB is not detected, the demodulated data can be determined to be for the left block of EAN-13 or a part of the data for UPC/E. Then, the next decision is whether the first character is of odd configuration or not (step 37). If the first character is of odd configuration, the block to which the character belong is determined to constitute the left block of EAN-13, so that the "label" flag is set to 1 and the "direc" flag to 1 (step 38).

In the case where the first character is not of an odd configuration, by contrast, the demodulated data is found to represent a part of the UPC/E data. And the "label" flag is set to 3, and the "direc" flag to 1 (step 39).

In either case, the process proceeds to J.

Figure 27B:
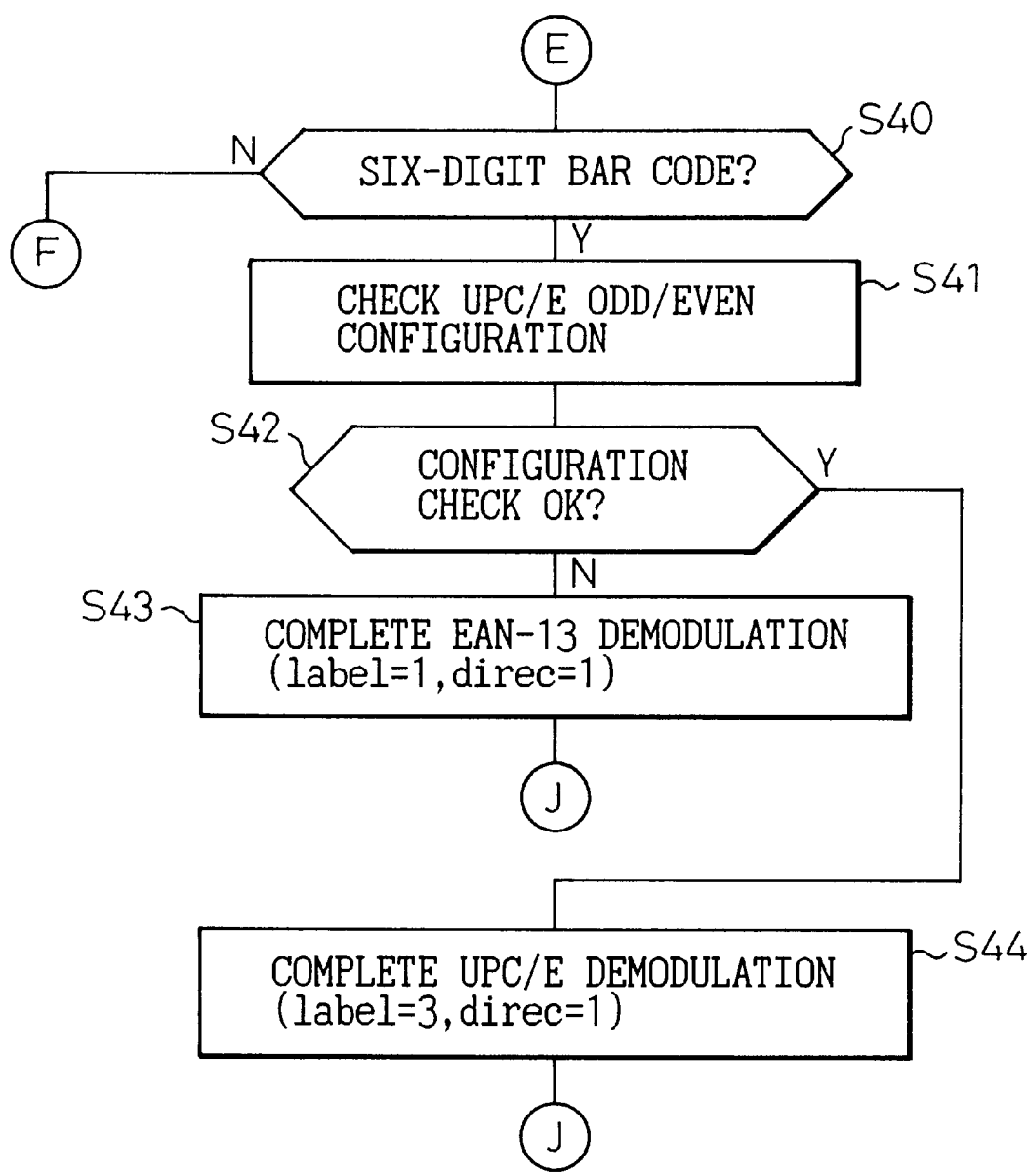

If step 36 detects CB, it is decided that the particular block is a six-digit bar code (step 40 in FIG. 27B). In the case where the demodulated data is not a six-digit bar code, the process proceeds to F. If the demodulated data is a six-digit bar code, on the other hand, the particular demodulated data is found to represent the left block of EAN-13 or the UPC/E read in a single sweep.

In order to decide whether the demodulate data represents UPC/E or EAN-13, step 41 decides whether the demodulated data has an odd/even configuration of UPC/E. In the case where the configuration check result is NG, the demodulated data is for EAN-13, and therefore the "label" flag is set to 1 and the "direc" flag to 1 (step 43).

If the configuration check result is OK, it indicates that the demodulated data is for UPC/E so that the "label" flag is set to 3 and the "direc" flag to 1 (step 44).

In either case, the process proceeds to J.

Figure 28A:
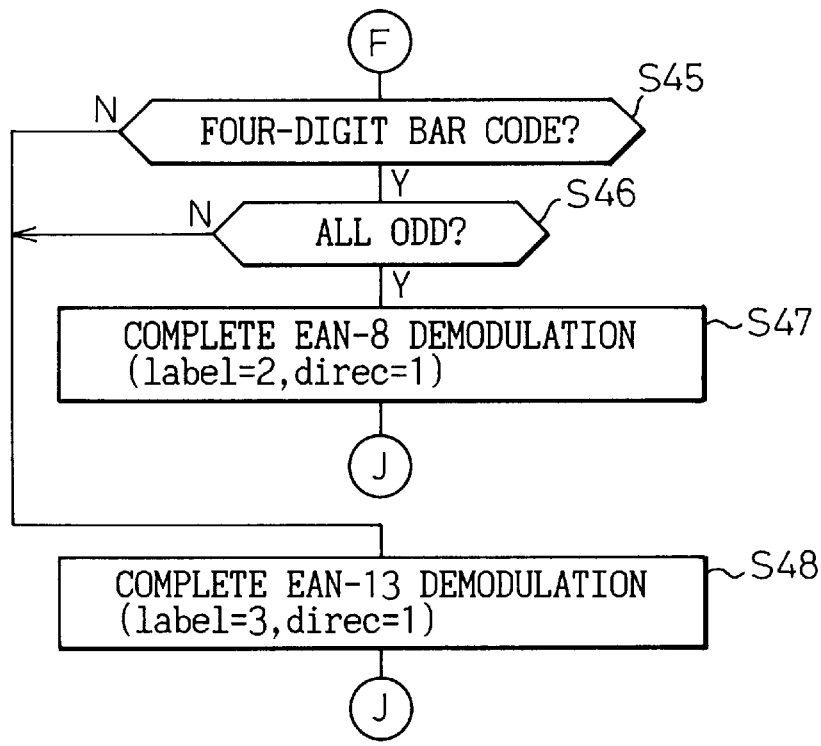
FIGS. 28A and 28B are a flowchart showing the processing of bar code demodulation.
Figure 28B:
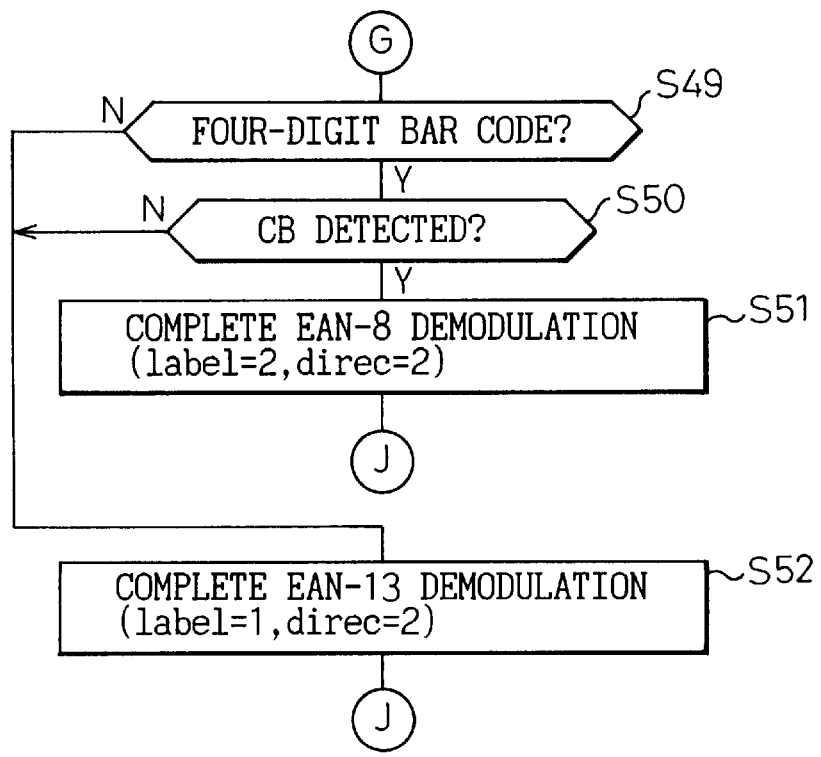

If step 40 decides that the demodulated data is not of a six-digit bar code, step 45 in FIG. 28A decides whether the particular data is of a four-digit bar code. In the case where step 45 decides that the data is of a four-digit bar code, the next decision is whether all the characters in the particular block are of an odd configuration (step 46). If all the characters are of an odd configuration, the demodulated data are those including the left block of EAN-8, and therefore the "label" flag is set to 2 and the "direc" flag is set to 1 (step 47).

If the demodulated data is not a four-digit bar code or none of the characters is of an odd configuration, on the other hand, the demodulated data includes the left block of EAN-13, so that the "label" flag is set to 1 and the "direc" flag is set to 1 (step 48).

In either case, the process proceeds to J.

Assume that step 35 decides that a character is not of odd/even configuration. Step 49 in FIG. 28B decides whether the bar code is a 4-digit one or not. If the bar code represents the data demodulated from the four-digit one, the next step 50 decides whether CB is detected or not. In the case where CB is detected, the demodulated data is the one including the right block of EAN-8, so that the "label" flag is set to 2 and the "direc" flag to 2 (step 51). If the bar code is not a four-digit one or if CB is not detected, on the other hand, the demodulated data is a partial one representing the right block of EAN-13, so that the "label" flag is set to 1 and the "direc" flag to 2 (step 52).

In either case, the process proceeds to J.

Figure 29A:
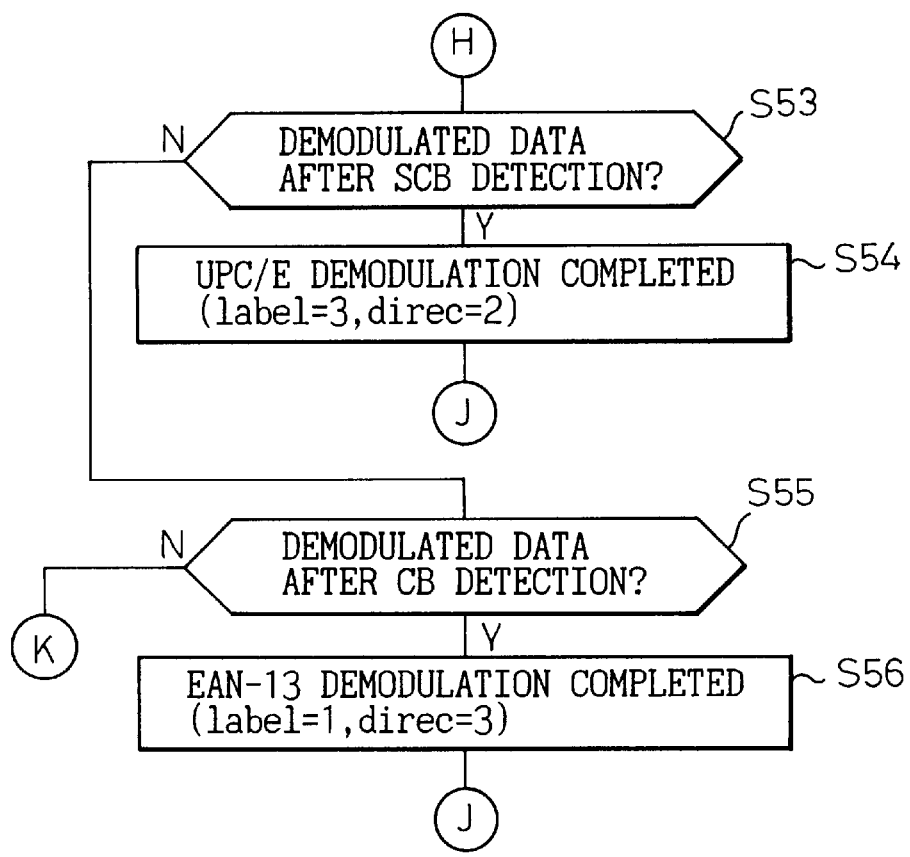
FIGS. 29A, 29B and 29C are a flowchart showing the processing of bar code demodulation.
Figure 29B:
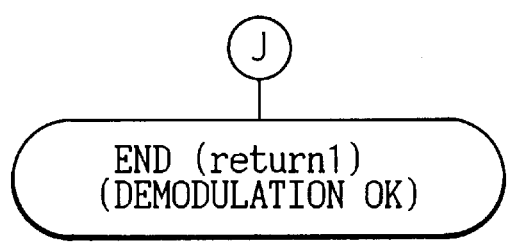
Figure 29C:
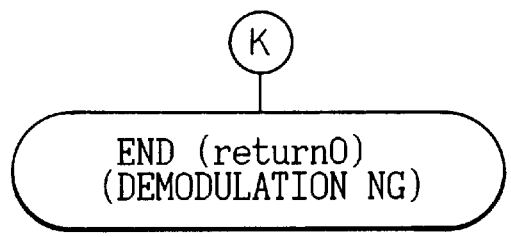

If step 34 decides that the demodulated data is not the one after EGB detection, step 53 in FIG. 29A decides whether the demodulated data is the one after SCB detection. In the case where the demodulated data is the one after SCB detection, the demodulated data is determined to be that of UPC/E, and the "label" flag is set to 3 and the "direc" flag to 2 (step 54).

If the demodulated data is not the one after SCB detection, it is determined to be the demodulated data of EAN-13 after CB detection (step 55), so that the "label" flag is set to 1 and the "direc" flag to 3 (step 56).

In either case, the process proceeds to J.

When the process proceeds to J, the demodulation is decided as OK and the process is completed. In the case where the process proceeds to K, on the other hand, the demodulation is decided as NG, and the process is terminated.

FIGS. 33A and 33B are tables showing the output of the bar code demodulation process result.

The "label" flag designates the type of the demodulated bar code, numeral 1 designates EAN-13, numeral 2 EAN-8 and numeral 3 UPC/E.

The "direc" flag, on the other hand, indicates the scanning direction. With the "label" flag set to 1, the "direc" flag set to 1 indicates that the demodulated data (including the left block) is read in a single sweep or scanned from the left block, the "direc" flag set to 2 indicates that the demodulated data is read from the right block, and the "direc" flag set to 3 indicates the demodulated data including only CB.

If the "label" flag is set to 2, the "direc" flag set to 1 indicates the demodulated data (including the left block) is read in a single sweep or read from the left block, and the "direc" flag set to 2 indicates the demodulated data (including the right block) read from the right block.

In the case where the "label" flag is set to 3, on the other hand, the "direc" flag set to 1 indicates a block is demodulated (in plural sweeps) or the demodulated data includes SGB, and the "direc" flag set to 2 indicates the demodulated data (scanned from SCB toward SGB) including EGB.

Figure 34:
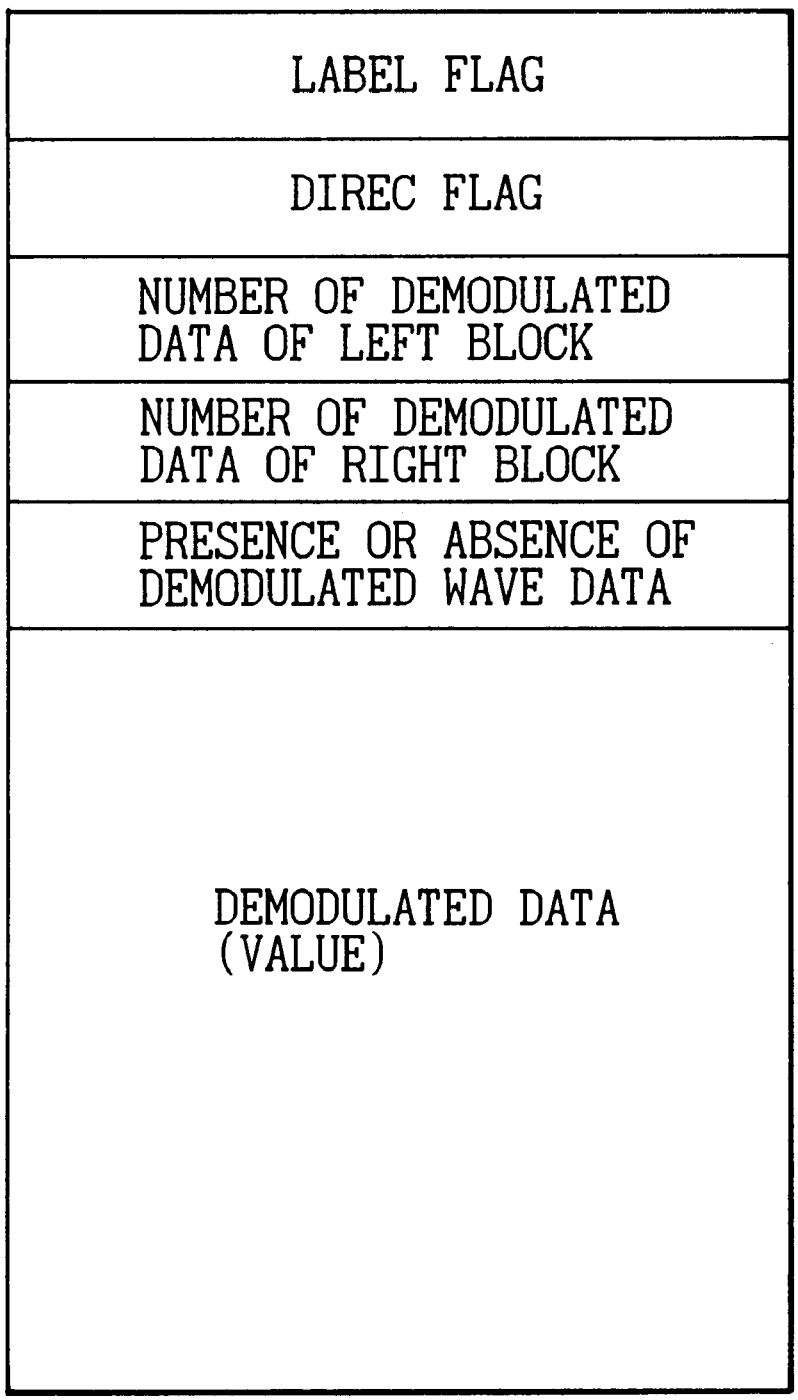
FIG. 34 is a diagram showing a configuration of a demodulation data buffer.

FIG. 34 shows the contents of a demodulated data buffer.

The demodulated data buffer has stored therein the above-mentioned "label" flag and "direc" flag, the number of the demodulated data (characters) in the left block, the number of the demodulated data (characters) in the right block, the presence or absence of the demodulated wave data (occurrence or non-occurrence of wave error), and the demodulated data. The demodulated data, etc. obtained as a result of the demodulation process are stored in the demodulated data buffer and used for synthesis as required.

Figure 35:
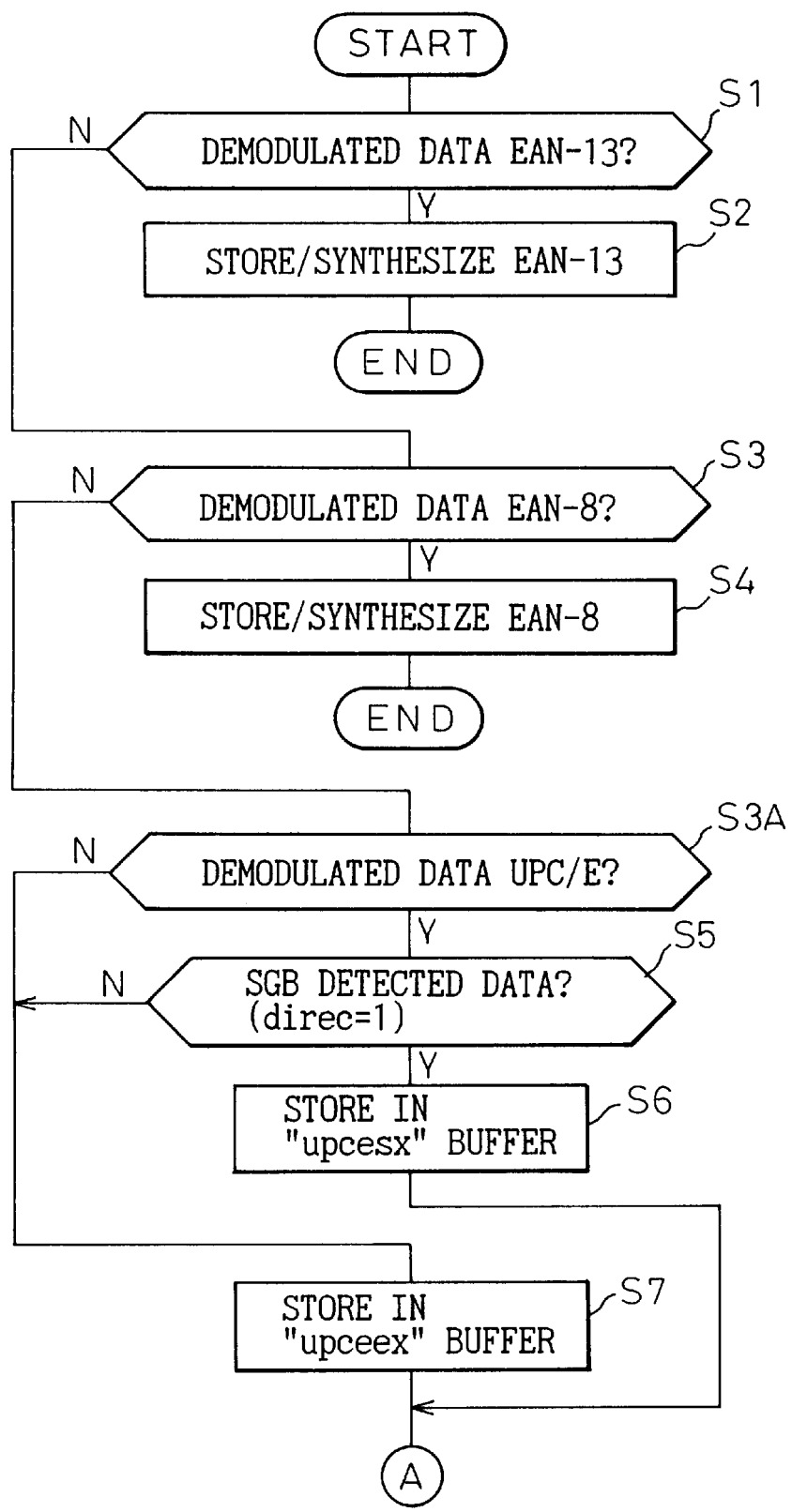
FIG. 35 is a flowchart showing the storage synthesis processing.
Figure 36:
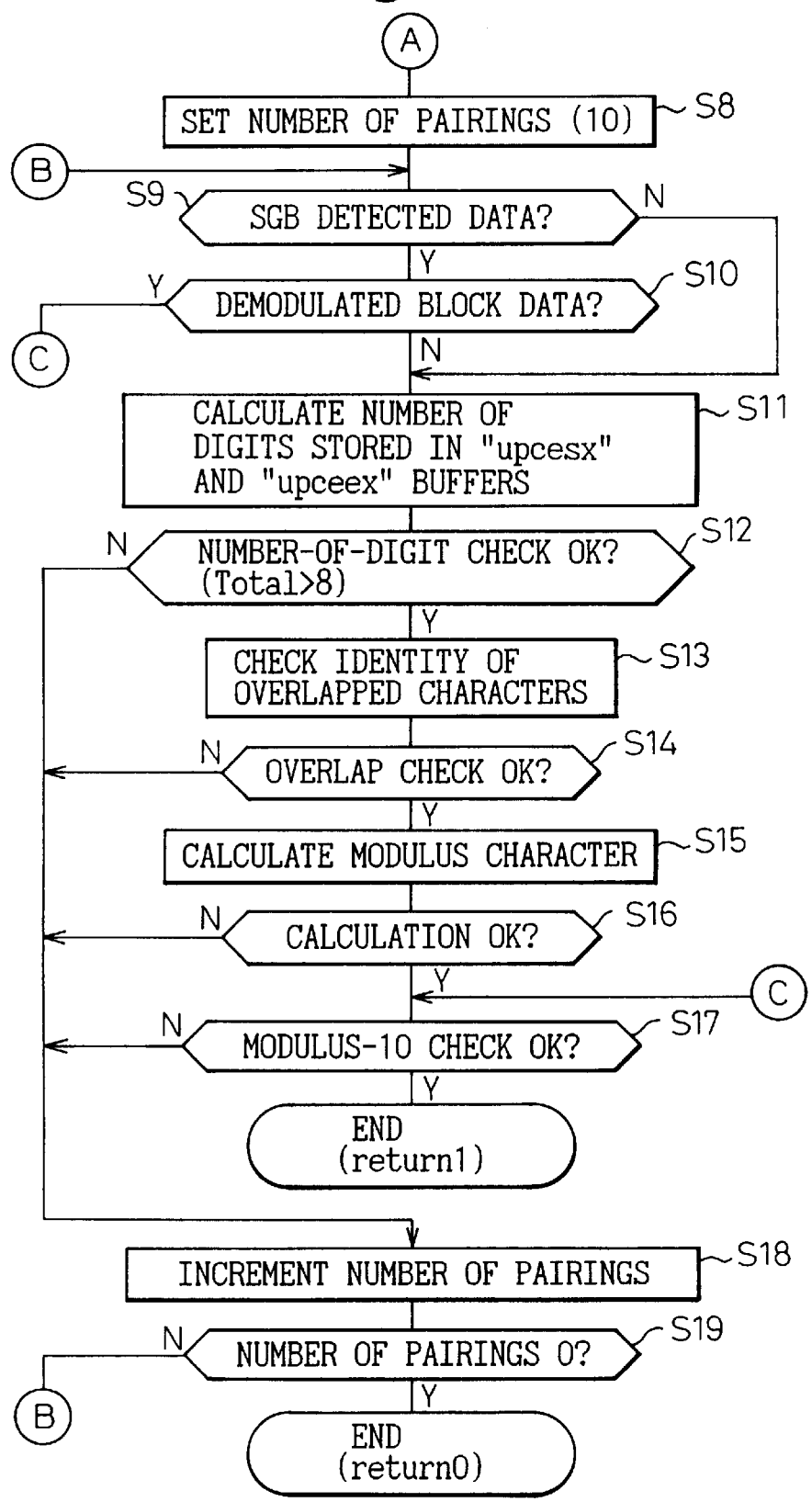
FIG. 36 is a flowchart showing the storage synthesis processing.

FIGS. 35 and 36 are a flowchart showing the storage and synthesis process in detail. In performing the storage and synthesis process, the demodulated data, etc. are read from the demodulated data buffer.

In this process, it is decided whether the demodulated data are those of EAN-13, EAN-8 or UPC/E on the basis of the "label" flag read out, so that they are stored and synthesized according to the respective types.

In the case where the demodulated data belong to UPC/E in step S 3A (when decision in both steps 1 and 3 is NO), step 5 decides whether the demodulated data are those after SGB detection (whether "direc"=1 or not). In the case of the demodulated data after SGB detection, the demodulated data is stored in an "upcesx" buffer (step 6). In the case of the demodulated data not after SGB detection, on the other hand, the demodulated data is stored in an "upceex" buffer (step 7).

Both the "upceex" buffer and the "upcesx" buffer are used for bar code data synthesis. Character "s" means "start", and "e" means "end".

Figure 37:
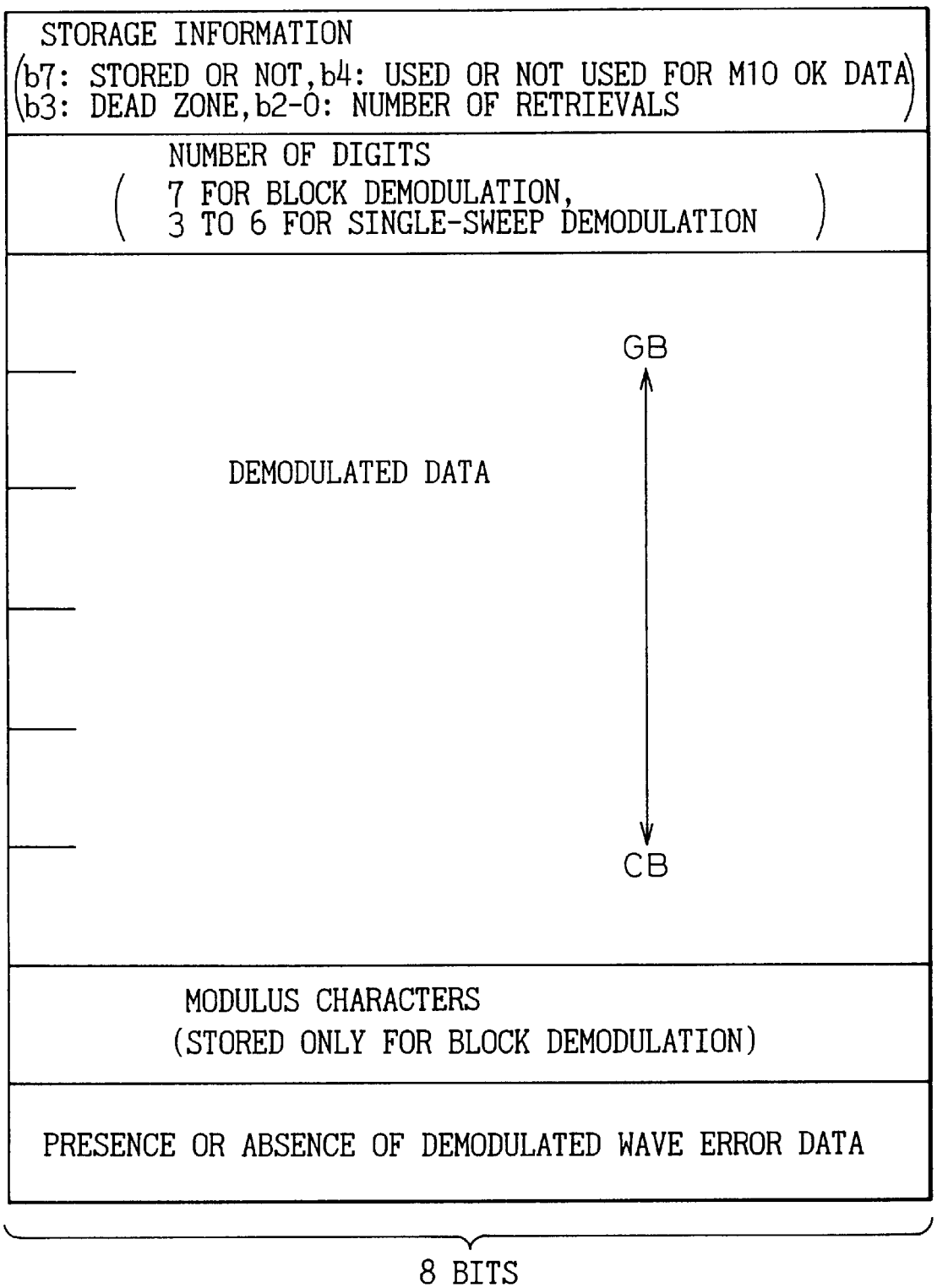
FIG. 37 is a diagram showing a configuration of a synthesis buffer.
Figure 38A:
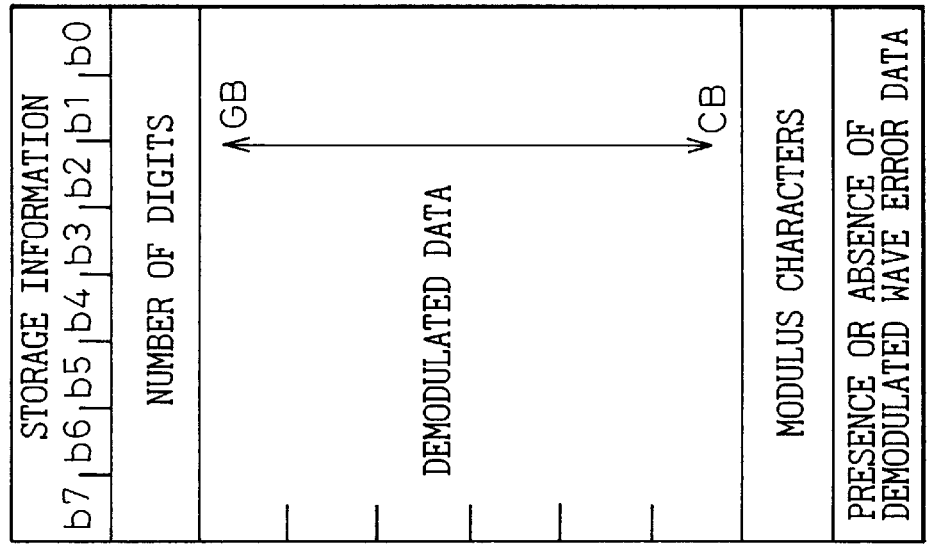
FIGS. 38A and 38B are diagrams showing a configuration of a synthesis buffer.
Figure 38B:
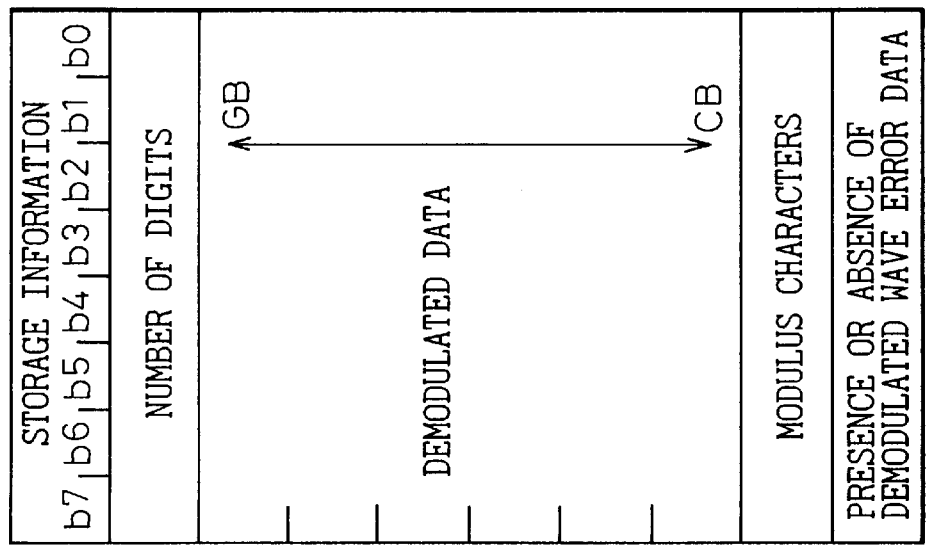

FIGS. 37, 38A and 38B illustrate the contents of these synthesis buffers. FIGS. 38A and 38B respectively show the "upceex" buffer and the "upcesx" buffer.

The synthesis buffers have stored therein a storage information area indicating the stored information, a number-of-digit area indicating the number of digits of the stored characters, a demodulated data storage area, a modulus character storage area and an area indicating the presence or absence of the demodulated data that has developed a wave error.

Of all the synthesis buffers, the "upceex" buffer has stored therein the demodulated data scanned and read from SCB side, and the "upcesx" buffer the data demodulated from SGB side. In the drawing, GB (SGB) is shown at top, and CB (SCB) down. The demodulated data are stored top down in the "upcesx" buffer, and bottom up in the "upceex" buffer. The bar code synthesis process is executed utilizing the demodulated data once stored in the synthesis buffers.

The synthesis buffers for EAN-13 include "lgbfxx", "rgbfxx" and "cbbfxx" buffers, and the synthesis buffers for EAN-8 include "ean8lx" and "ean8rx" buffers (not shown).

The "lgbfxx", "rgbfxx" and "cbbfxx" buffers are for storing the demodulated data including the left block, the right block and CB, respectively. The "ean8lx" and "ean8rx" buffers, on the other hand, are for storing the data including the left block and the right block of EAN-8, respectively.

The demodulated data are stored in the synthesis buffers on the basis of the values of the "label" flag and the "direc" flag.

Figures 39, 40:
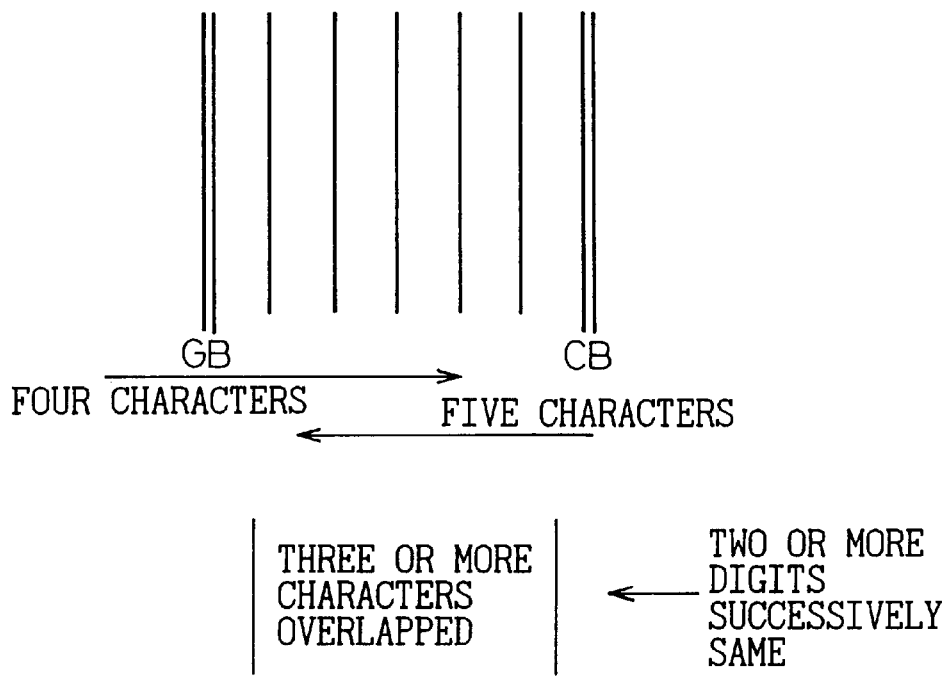
FIG. 39 is a diagram showing the relation between the storage processing and the synthesis processing of the demodulated data.
FIG. 40 is a diagram showing overlapped digits in the demodulation of UPC/E.
Figure 42A:
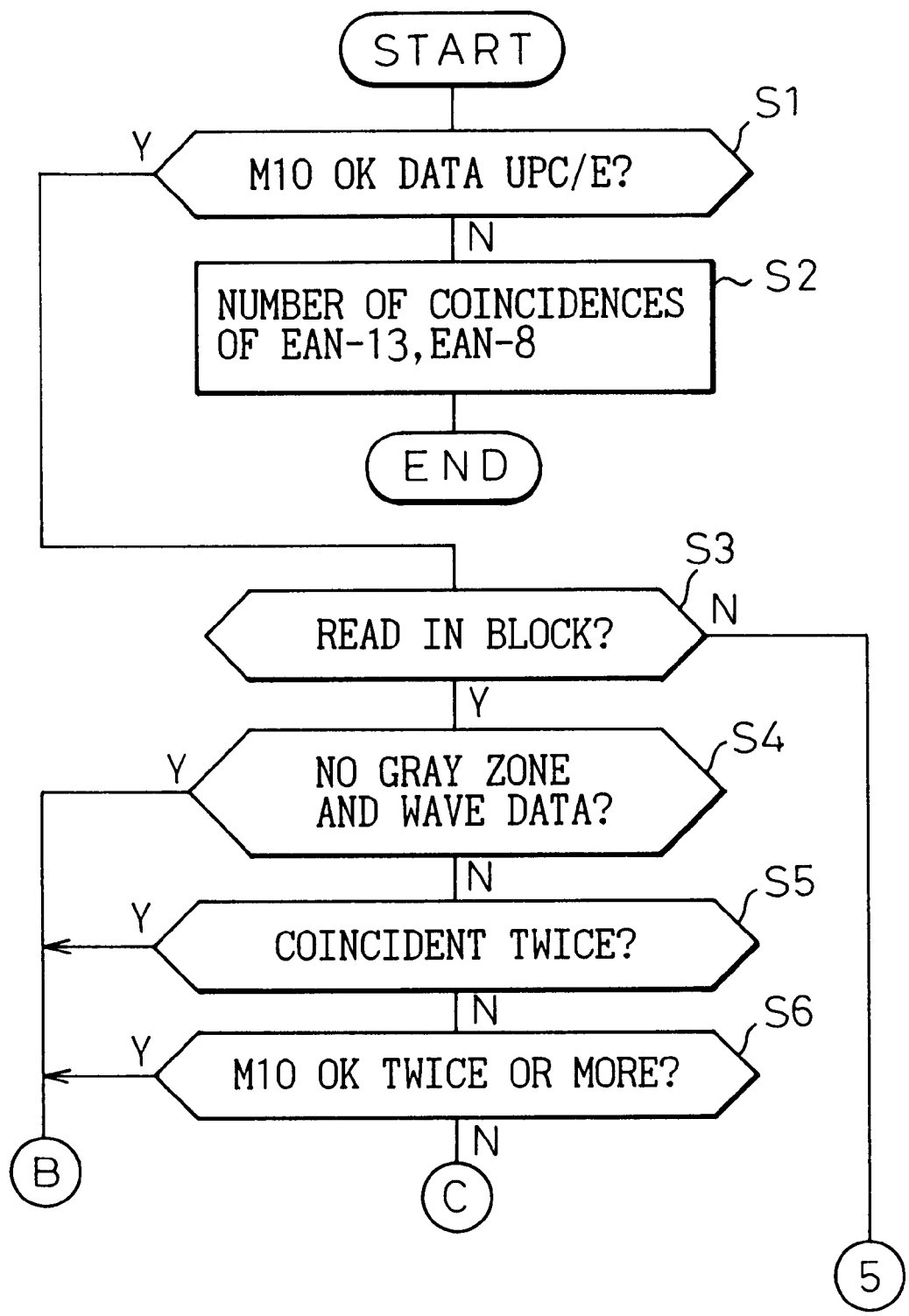
FIGS. 42A, 42B, 42C, and 42D are a flowchart showing the processing of the number of coincidences.
Figure 42B:
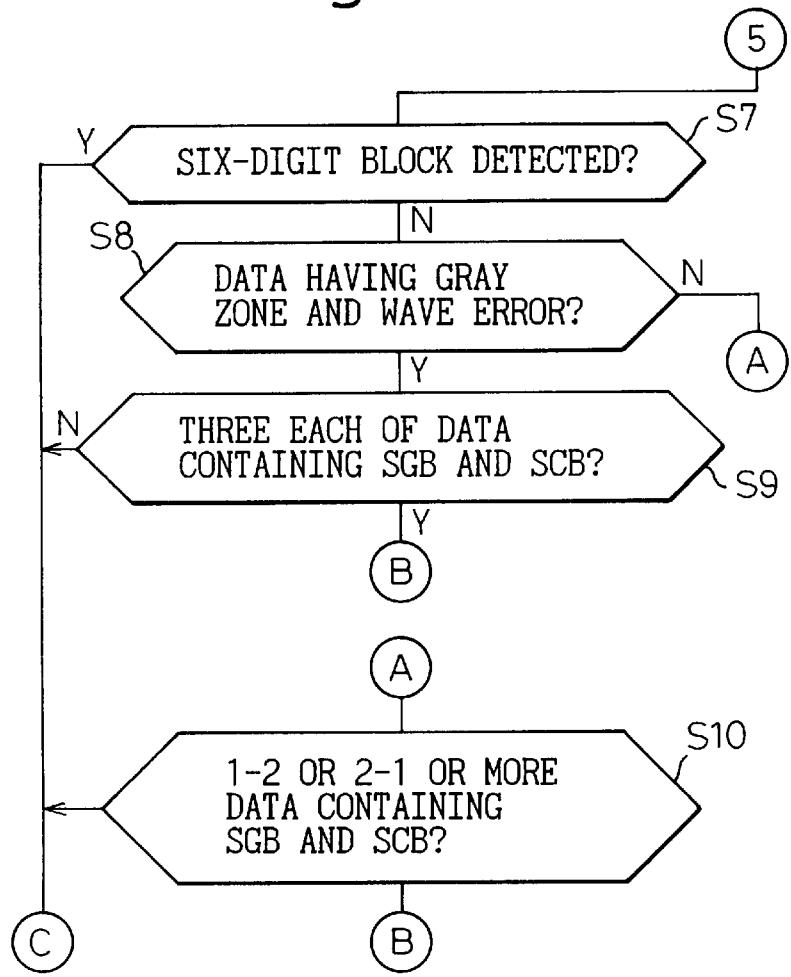
Figure 42C:
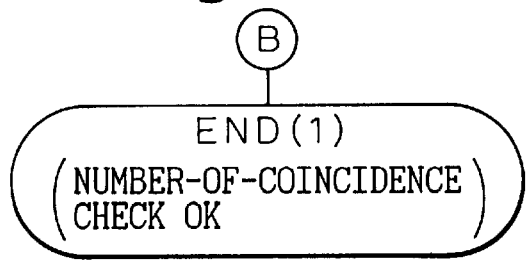
Figure 42D:
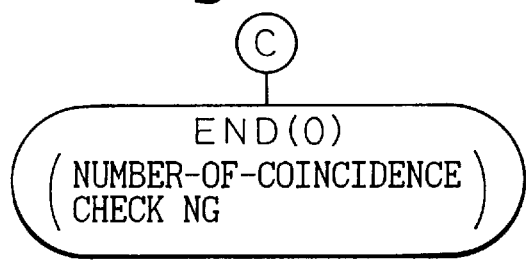
Figure 43:
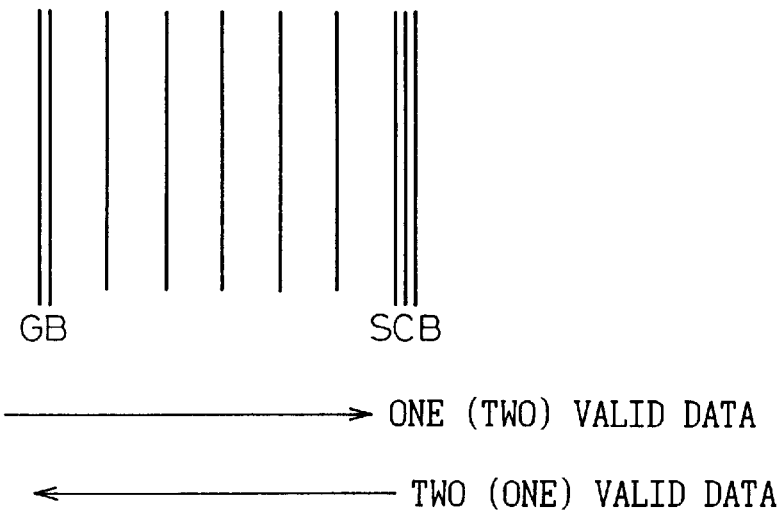
FIG. 43 is a diagram showing the number of valid data required according to the scanning direction.

FIG. 39 is a diagram showing the correspondence between the state of the "label" flag and the storage process.

First, the bar code type is identified according to the state of the "label" flag. It is known that the demodulated data are stored in the EAN-13 synthesis buffer in the case where the "label" flag is 1, in the EAN-8 synthesis buffer in the case where the "label" flag is 2, and in the UPC/E synthesis buffer in the case where the "label" flag is 3.

Then, the value of the "direc" flag is referred to. With the "label" flag set to 1, for example, the "direc" flag set to 1 indicates the demodulated data including the left block, so that the demodulated data is stored in the synthesis buffer "lgbfxx". In similar fashion, the "direc" flag set to 2 indicates the demodulated data containing the right block and therefore the data is stored in the synthesis buffer "fgbfxx". The "direc" flag set to 3 indicates the demodulated data containing CB and therefore the data is stored in the synthesis buffer "cbbfxx".

This process similarly applies to EAN-8 and UPC/E. The data demodulated from EAN-8 is stored in the synthesis buffer "ean8lx" when the "direc" flag is set to 1, and in the synthesis buffer "ean8rx" when the "direc" flag is set to 2. The data demodulated from UPC/E, on the other hand, is stored in the synthesis buffer "upcesx" when the "direc" flag is set to 1, and in the synthesis buffer "upceex" when the "direc" flag is set to 2.

Now, an explanation will be made about the synthesis process of the demodulated data which have been read in plural sweeps. Specific reference is made to UPC/E below.

Prior to the synthesis process, step 8 in FIG. 36 sets the number of pairing trials. The number of trials indicates the number of times the synthesis process is repeated in the case of a trial failure. According to this embodiment, trials are made ten times or another arbitrary number of times.

The demodulated data is read from the synthesis buffers and step 9 decides whether or not the demodulated data is the one after SGB detection. In the case where the demodulated data is the one after SGB detection, the next step 10 decides whether the demodulated data represents a block data, i.e., a data demodulated in a single sweep. In the case where the demodulated data is a block data, the process proceeds to C, and the process proceeds to C. After the modulo-10 check in step 17, the check result is determined OK or not. If OK, the reading is successful. In the case where the decision in step 9 is that the demodulated data is not the one after SGB detection, on the other hand, step 10 is skipped.

Step 11 reads and adds the number of digits of the demodulated data stored in the "upcex" buffer and the "upcsx" buffer. Then, step 12 checks the number of digits. In executing the UPC/E synthesis process, as shown in FIG. 40, assume that three or more digits are required to be overlapped. Then, step 12 decides whether the number of digits is more than 8. If the number of digits is not more than 8, a read error is determined.

In the case where the number of digits is more than eight (9 or more), the UPC/E code is configured of 6 characters. It is therefore known that three or more characters are overlapped. In this case, step 13 decides whether the demodulated data of the overlapped digits coincide with each other. By checking the identity, it is decided whether or not the demodulated data of the overlapped portion are identical to each other and therefore can be synthesized or not. In the case where the decision in step 14 is that the overlapped portions are identical (in which case two successive characters are required to be identical), the next step 15 calculates the modulus character. In the case where the decision in step 14 is that two or more identical characters are not successive, a read error is determined.

A different number of overlapped digits may be used for step 12, and the condition of character coincidence in step 14 may also be differentiated. The number of digits is required for guaranteeing the legitimacy of the bar code data synthesized. The greater the number of digits, the higher the degree of legitimacy of the bar code data synthesized.

In response to step 15, step 16 decides whether or not the modulus character calculation result is OK. If the calculation result is NG, a read error is decided.

In the case where the modulus character calculation result is OK, on the other hand, the modulo-10 check is performed. If the modulo-10 check result is OK, the synthesized bar code data is considered legitimate and the synthesis process is completed.

In the case where a read error is decided, in contrast, step 18 decrements the number of pairings, followed by step 19 for deciding whether the number of pairings has reached zero. If the number of pairings has reached zero, the synthesis process is terminated. In the case where the number of pairings is more than zero, on the other hand, the process returns to step 9 for executing the synthesis process.

For EAN-13 and EAN-8, the synthesis process is executed in a similar manner to that in FIG. 36. With EAN-13 and the like, the number-of-digit check result in step 12 is OK if the number of overlapped digits is 2 characters or more. In other words, the number-of-digit check result is OK if the number of digits is 14, i.e., 12 digits plus two overlapped digits for EAN-13, and the check result is OK if the number of digits is 10, i.e., eight digits plus two overlapped digits for EAN-8.

It may be that SCB of UPC/E is difficult to distinguish from CB of EAN-13 depending on the manner in which the bar code is scanned. In the case of EAN-13, the decision on the presence or absence on both sides of CB facilitates the check as to whether a portion of EAN-13 is read or not. For SCB of UPC/E, in contrast, detection of a bar of six-module configuration cannot exclude the possibility of being CB of EAN-13 for the reason described above.

If a UPC/E code is to be demodulated with a higher successful reading rate, therefore, the quality of check is required to be improved to assure sufficient confirmation that the bar code read is UPC/E.

According to this embodiment, the characters to be overlapped for the digit-of-number check are differentiated between EAN-13/EAN-8 and UPC/E.

FIG. 41A is a diagram showing a configuration of a pairing buffer. The pairing buffer is for storing the paired demodulated data. FIG. 41B shows a pairing synthesis buffer for EAN-8 and a synthesis buffer for UPC/E. The pairing buffer for EAN-13 also has a similar configuration.

The pairing buffer for EAN-8 has therein 25 areas of addresses 0 to 24. The split data including the left block are of five types of "ean11" to "ean15", and those including the right block are of five types of "ean8f1" to "ean8r5". A total of 25 sets of data as combinations of the above-mentioned two groups of five types of demodulated data are stored in the EAN-8 synthesis buffer.

In similar fashion, a UPC/E pairing buffer has 100 areas set therein at addresses 15 to 124 in order to store a total of 100 sets of demodulated data as combinations of the ten types each of data "upces1" to "upces10" and data "upcee1" to "upcee10".

FIGS. 42A to 42D are a flowchart showing the number-of-coincidence process in detail. The process is performed for counting the number of coincidences of data already demodulated (already synthesized), and deciding on the success or failure of reading accordingly.

First, step 1 decides whether or not the data for which the M-10 (modulo-10 check) result is OK belongs to UPC/E. If the particular data is not associated with UPC/E, it belongs to EAN-13 or EAN-8. In that case, step 2 checks whether EAN-8 or ENA-13 has the same demodulated data as many as the number of coincidences, and then the process is terminated.

In the case where the data for which the M10 check result is OK belongs to UPC/E, on the other hand, step 3 decides whether the particular data is the one read as a block (i.e., the data passed through SGB and SCB). In the case where it is the data read in a block, the next step 4 decides whether there is any gray zone wave data. This process is for checking whether the above-mentioned wave error or an inaccurate data is not contained. In the absence of such data, the reading is considered successful.

Upon a decision in step 4 of the presence of such undesirable data, on the other hand, step 5 checks whether the demodulated data are coincident twice. For this purpose, the presence or absence of the same demodulated data is checked for. In the presence of the data coinciding twice, a successful reading is determined.

In the absence of data which coincide twice, on the other hand, it is decided whether the M10 check result is OK at least twice (step 6). In the case where the M10 check result is OK at least twice, the number-of-coincide check result is considered OK. If the conditions for step 6 fail to be met, on the other hand, a read error (number-of-coincidence check result NG) is decided.

In the case where step 3 decides on other than a block reading, i.e., data read in plural sweeps, on the other hand, step 7 decides whether or not a 6-digit block is detected. If a 6-digit block is not detected, the number-of-coincidence check result is decided as NG. Upon detection of a 6-digit block, by contrast, step 8 decides on the presence or absence of a gray zone wave data. In the presence of such data, step 9 decides whether the data containing SGB and SCB are each three. If the answer is YES, the number-of-coincidence check result is OK, and if not, the number-of-coincidence check result is determined to be NG.

In the case where the decision in step 8 is the absence of a gray zone or the like, step 10 decides whether the data containing SGB or SCB are at least 1-2 and 2-1, respectively. This step is for deciding whether there are at least two data containing SCB when only one data contains SGB, and whether there are at least two data containing SGB when only one data contains SCB.

In the case where the above-mentioned conditions are met, the number-of-coincidence check result is OK, while when the same conditions fail to be met, the check result is NG.

In order to prevent the UPC/E bar code from being erroneously read, the modulo-10 check which may be conducted using the demodulated data containing a wave data or a gray zone includes the process of changing the number of coincidences (number of times the data are retrieved) under normal conditions.

The demodulated data containing a wave data or the like is liable to contain waste data (such as noise). As a result, the number-of-coincidence check is conducted in more strict way on the data for which the modulo-10 check result is OK.

In the SCB check and the CB check, the result is determined OK when one of the bar widths is included within ±25% of the other. As already described, however, SCB is hard to distinguish from CB. Therefore, SCB is desirably checked sometimes in a more strict way than CB.

Figure 44A:
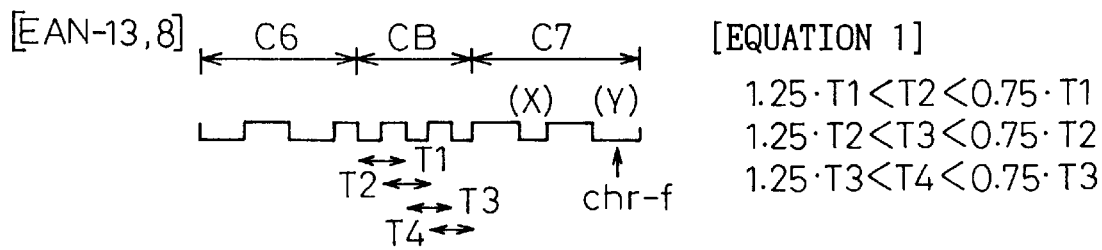
FIGS. 44A and 44B are diagrams for explaining that the degree of character length check for EAN-13 is different from the check for UPC/E.
Figure 44B:
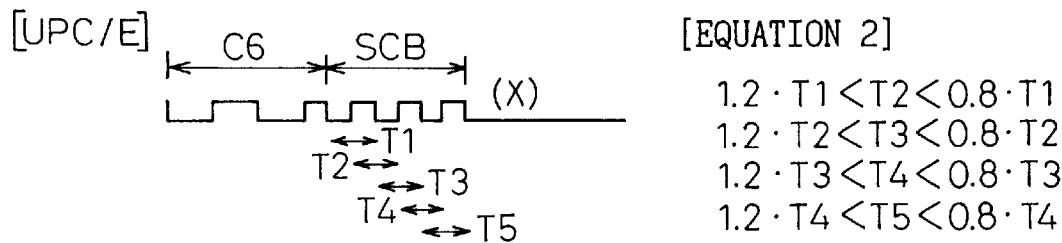

FIGS. 44A and 44B illustrate means used for the above-mentioned purpose. Although the CB check is based on the condition of meeting the ±25% limit, the SCB check involves the condition of meeting the limit of ±20% for the check result of OK. Consequently, the strictness of SCB check is increased further thereby removing all data having features even slightly different from SCB.

Figure 45:
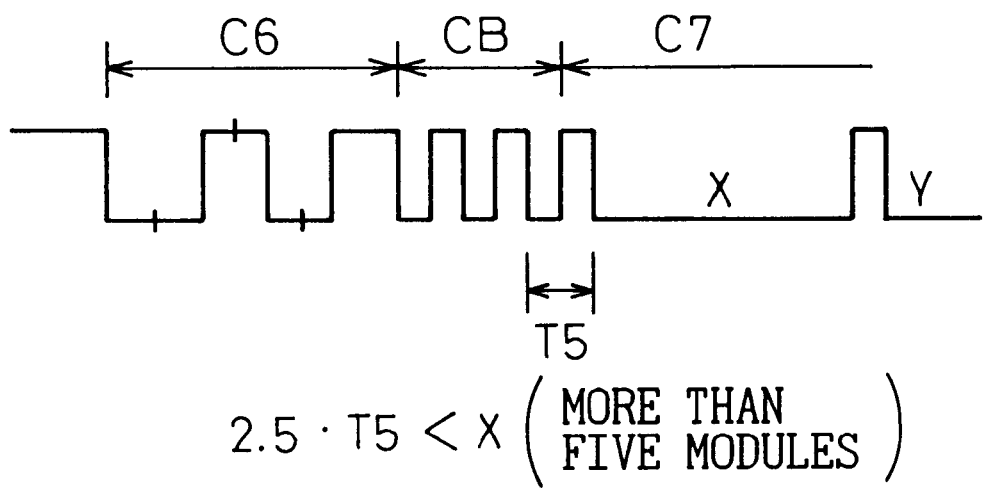
FIG. 45 is a diagram showing a white bar length check.

In order to further improve the SCB check accuracy, the width of the white bar following SCB (CB) is checked. The check is called 2.5×T5<X (X indicates the width of the white bar adjacent to CB shown in FIG. 45). In the case where this relation holds, X is known to be the white bar at the start of the character C7 adjacent to CB of EAN-13. If the relation fails to hold, on the other hand, X is determined to constitute a margin following SCB of UPC/E. By checking the white bar length in this way, the SCB/CB can be detected more accurately. After this check, the chr-f bit of the bar Y is checked to see that it is not set.

As described above, according to this invention, in the case where a bar code of a type difficult to extract the feature (partition) from is read, whether or not the information appearing to represent the feature contained in the data that has been read is really a feature thereof is checked more strictly than when checking other types of bar code. As a result, the feature can be extracted more accurately regardless of the bar code type. Even in the case where a plurality of bar code types are coexistent, therefore, all types of bar codes can be read and demodulated in the same way.

Also, in extracting a feature, a flag indicating the sequence of scanning or the like is set, so that the data corresponding to the feature (partition) can be easily searched for at the time of demodulation or a like subsequent process, thereby improving the efficiency of the demodulation process.

Further, a feature is checked in accordance with the flag type and the type of the bar to which the flag is attached to decide the type of the feature that has been read, and furthermore, the determination of the bar code type that has been read is facilitated.

By ascertaining whether or not there exists an adjacent character before or after a feature at the same time as extraction of the feature (partition), on the other hand, it can be decided more accurately whether the feature type determined is correct or not.

In the case where a plurality of flags indicating different scanning types are attached to the same character, the length of an adjacent character is checked. In this way, it is decided which flag should be considered valid, thereby making it possible to discriminate the feature type and the bar code type that have been read.

Also, since a demodulation method or the like can be selected in accordance with the bar code type determined this way, the bar code can be demodulated more accurately and more quickly in accordance with the bar code type that has been read.

Further, upon detection of a feature (partition), the presence or absence of a character before or after the feature is decided and, according to this decision, the type of the bar code read is determined, thereby improving the accuracy of bar code type decision.

Also, the number of characters validating the character check length is counted on both sides of a feature (partition), whereby the feature and the type of the bar code that have been read can be determined.

In the case where a feature shared by a plurality of bar code types is extracted, on the other hand, the type of the bar code that has been read can be easily identified by determining the character configuration following the feature.

Further, the number of overlapped character digits of the data to be synthesized is changed as required according to the bar code type. As a result, a bar code of a type which easily develops a reading error is checked more strictly by increasing the number of overlapped digits at the time of synthesis. In this way, the probability of a reading error which would otherwise pose a problem can be reduced.

Also, the required identical data existing in the overlapped character digits, can be rendered to have the same number of digits regardless of the bar code type.

In similar fashion, a bar code which easily develops a reading error can be checked more strictly by changing the number of the same bar code data required for decision on a successful reading according to the bar code type. The possibility of a reduced development of a reading error can thus be made possible.

Furthermore, according to the present invention, a method and an apparatus for reading a bar code are provided that allows operators to scan the surface of the bar code with different scan lines in a direction perpendicular to, or at a wider angle relative to the bars arranged in the bar code, thereby reducing the time to read the bar code.

We claim:

1. A method for reading a bar code having at least one code block of bars and spaces between the bars having respective widths and representing a plurality of characters and partitions of respective, different types flanked beside the block, comprising:

scanning a surface of the bar code with different scan lines;

measuring the widths of the bars and the widths of the spaces between the bars in each scan line;

storing a plurality of rows of data in a storage unit, each row of data having a plurality of bar width and space width data obtained by scanning the bar code with each scan line;

extracting partition indicative data, each having a series of bar width and space width data and each corresponding to a partition and an adjacent character to the partition in the bar code, from the row of data stored in the storage unit;

appending a first flag to the partition indicative data, which represents a scanning sequence indicating which is scanned first, from among the partition and the adjacent character;

appending a second flag to the partitioning indicative data, which determines the type of the partition;

determining whether the partition is a first type or a second type based on the bar configuration of the partition; and determining the type and the direction of each scan line scanned when obtaining each partition indicative data based on respective states of the first flag and the second flag and thus the determined type of the partition.

2. The method claimed in claim 1, wherein whether the partition is the first type or the second type is determined based on whether or not a character adjacent to the partition exists after the partition is scanned.

3. The method claimed in claim 2, wherein the type of a bar code is determined based on an existence of a margin having a predetermined length on one side of the partition in the bar code when the bar code, the type of which is to be determined, has a predetermined bar configuration in at least one part of the partition.

4. The method claimed in claim 3, comprising:

a first step checking whether or not a length of a first character adjacent to the partition in a forward scanning direction in each scan line is within the predetermined length from each row of data after the partition indicative data is extracted, the row of data being obtained by scanning the bar code with each scan line and producing a corresponding checking result;

a second step determining that the first character is true if the checking result in the first step is affirmative;

a third step calculating lengths of a plurality of successive characters adjacent to the first character in the forward scanning direction in each scan line;

a fourth step executing an adjacent character length check between a plurality of successive characters adjacent to the partition in the forward scanning direction in each scan line in which the adjacent character length check compares the length of a first character determined as true and the length of a second character adjacent to the first character and determines the second character as true if the difference between the lengths is within the determined length;

a fifth step executing the first step to the fourth step for a plurality of successive characters adjacent to the partition in a backward scanning direction in each scan line;

a sixth step counting a number of the successive characters which are determined as true as a result of the execution of the above steps in each block in each scan line; and a seventh step determining if each row of data is a first type bar code having characters on one side of the partition or a second type bar code having characters on both sides of the partition based on the number counted in the sixth step.

5. The method claimed in claim 4, wherein partially scanned data obtained by scanning along separate scan lines that pass through a partition and a part of a block adjacent to the partition in the bar code are extracted from a plurality of row of data based on the number of characters counted in each block.

6. The method claimed in claim 2, wherein when different flags representing the scanning sequences are set in a bar width data or a space width data, which flag is true may be determined by checking lengths of two successive characters adjacent to the partition to be scanned after the partition is scanned in the bar code.

7. The method claimed in claim 1, wherein the first flag is set in a buffer that stores bar width data or space width data in the partition indicative data corresponding to a bar or a space appearing in a predetermined order in the bar code in accordance with the scanning sequence.

8. The method claimed in claim 7, wherein it is determined that the partition indicative data includes data for a first type of partition if a first delta distance thereof, that is a sum of respective widths of a first bar and a first space adjacent to the first bar in the partition, is substantially the same as a second delta distance thereof, that is a sum of respective widths of the first space and a second bar adjacent to the first space in the partition, and successive delta distances are also substantially the same up to a predetermined time repeatedly, while it is determined that the partition indicative data includes data for a second type of partition if delta distances thereof are substantially the same up another predetermined time repeatedly, when data for the first type of partition or the second type of partition is included in the partition indicative data.

9. The method claimed in claim 8, wherein when different flags representing the scanning sequences are set in a bar width data or a space width data, which flag is true may be determined by checking lengths of two successive characters adjacent to the partition to be scanned after the partition is scanned in the bar code.

10. The method claimed in claim 7, wherein it is determined that the partition indicative data includes data for a first type of partition if a first delta distance thereof, that is a sum of respective widths of a first bar and a first space adjacent to the first bar in the partition, is substantially the same as a second delta distance thereof, that is a sum of respective widths of the first space and a second bar adjacent to the first space in the partition, and successive delta distances are also substantially the same up to a predetermined time repeatedly, while it is determined that the partition indicative data includes data for a second type of partition if the delta distances thereof are substantially the same up to another predetermined time repeatedly, when two kinds of first flags are set in a partition indicative data.

11. The method claimed in claim 10, wherein when different flags representing the scanning sequences are set in a bar width data or a space width data, which flag is true may be determined by checking lengths of two successive characters adjacent to the partition to be scanned after the partition is scanned in the bar code.

12. The method claimed in claim 7, wherein when different flags representing the scanning sequences are set in a bar width data or a space width data, which flag is true may be determined by checking lengths of two successive characters adjacent to the partition to be scanned after the partition is scanned in the bar code.

13. The method claimed in claim 1, wherein when different flags representing the scanning sequences are set in a bar width data or a space width data, which flag is true may be determined by checking lengths of two successive characters adjacent to the partition to be scanned after the partition is scanned in the bar code.

14. A method for reading a bar code having a least one code block of bars and spaces between the bars having respective widths and representing a plurality of characters and partitions of respective, different types flanked beside the block, comprising:

scanning a surface of the bar code with different scan lines;

reading a plurality of different scan data obtained by scanning along the different scan lines;

storing the plurality of different scan data in a storage unit;

extracting partially scanned data obtained by scanning along separate scan lines that pass through a partition and a part of a block adjacent to the partition in the bar code from the plurality of scan data stored in the storage unit;

reproducing a plurality of partially decoded data form the partially scanned data;

extracting a pair of decoded data from the partially decoded data, each thereof having a number of character digits overlapped with each other and having different respective partitions;

calculating the number of character digits overlapped with between the pair of extracted decoded data; and reading the bar code by synthesizing the pair of decoded data when the calculated number is equal to or more than a determined value in response to a type of the bar code.

15. The method claimed in claim 14, comprising the steps of:

determining whether the calculated number of the data representing the same character which exists in each of the pair of decoded data is equal to or more than the determined value; and reading the bar code by synthesizing the pair of decoded data when the above determining result is affirmative.

16. The method claimed in claim 15, wherein the determined value is set depending on the type of the bar code.

17. An apparatus for reading a bar code having at least one code block of bars and spaces between the bars having respective widths and representing a plurality of characters and partitions of respective, different types flanked beside the block, comprising:

an optical source producing a light illuminating the bar code;

a scanning mechanism applying the light from the optical source to a surface of the bar code along a plurality of scanning lines;

an optical receiver receiving the light reflected from the surface of the bar code illuminated by the light applied thereto and producing a corresponding output;

a counter measuring bar widths and space widths alternatively appearing in each scan line in response to the output of the optical receiver;

a storage unit storing each row of data having a plurality of bar width and space width data obtained from the bar width counter by scanning the bar code each time with each scan line;

an extracting unit extracting partition indicative data each having a series of bar width and space width data from each stored row of data corresponding to a partition and an adjacent character to the partition in the bar code;

a flag appending unit appending a first flag to the partition indicative data which represents a scanning sequence indicating which is scanned first from among the partition and the adjacent character, and for appending a second flag to the partition indicative data which determines the type of the partition; and a scanning line type determining unit determining the type and direction of each scan line scanned when obtaining each partition indicative data based on respective states of the first flag and the second flag and the determined first type or second type of the partition, based on the bar configuration of the partition.

18. The apparatus claimed in claim 17, comprising a first partition determining unit determining whether the partition is the first type or the second type based on whether or not a character adjacent to the partition exists after the partition is scanned.

19. The apparatus claimed in claim 14, comprising a third partition determining unit determining the type of a bar code based on an existence of a margin having a predetermined length on one side of the partition of the bar code when the bar codes, the type of which is to be determined, has a predetermined bar configuration in at least one part of the partition.

20. The apparatus claimed in claim 19, comprising:

a character number counting unit respectively counting the number of successive characters determined as true characters in each block in each scanning line, each of the characters being determined as a true character if a length of the character is within the predetermined length, based on each row of data that is obtained by scanning the bar code with each scan line, the characters being adjacent to the partition in both forward and backward scanning directions in each scanning line, after the partition indicative data is extracted from the row of data; and a bar code type determining unit determining whether or not each row of data includes a first type bar code having characters on one side of the partition or a second type bar code having characters on both side of the partition based on the number counted by the counting unit.

21. The apparatus claimed in claim 20, wherein partially scanned data, obtained by scanning along separate scan lines that pass through a partition and a part of a block adjacent to the partition in the bar code are extracted from a plurality of the row of data based on the number counted by the counting unit.

22. The apparatus claimed in claim 18, wherein when different flags representing types of scan lines are set in a bar width data or a space width data, which flag is true may be determined by checking lengths of two successive characters adjacent to the partition to be scanned after the partition is scanned in the bar code.

23. The apparatus claimed in claim 17, wherein the first flag is set in a buffer that stores bar width data or space width data in the partition indicative data corresponding to a bar or a spaces, respectively, appearing in a predetermined order in the bar code in accordance with the scanning sequence.

24. The apparatus claimed in claim 23, comprising a second partition, determining unit determining that the partition indicative data includes data for a first type partition if a first delta distance thereof, that is a sum of respective widths of a first bar and a first space adjacent to the first bar in the partition, is substantially the same as a second delta distance thereof, that is a sum of respective widths of the first space and a second bar adjacent to the first space in the partition and successive delta distances are also substantially the same up to a predetermined time repeatedly, while determining that the partition indicative data includes data for a second type partition if the delta distances thereof are substantially the same up to another predetermined time repeatedly, when data for the first type of partition or the second type of partition is included in the partition indicative data.

25. The apparatus claimed in claim 24, wherein when different flags representing types of scan lines are set in a bar width data or a space width data, which flag is true may be determined by checking lengths of two successive characters adjacent to the partition to be scanned after the partition is scanned in the bar code.

26. The apparatus claimed in claim 23, comprising a second partition determining unit determining that the partition indicative data includes data for a first type partition if a first delta distance thereof, that is a sum of respective widths of a first bar and a first space adjacent to the first bar in the partition, is substantially the same as a second delta distance thereof, that is a sum of respective widths of the first space and a second bar adjacent to the first space in the partition, and successive delta distances are also substantially the same up to a predetermined time repeatedly, while determining that the partition indicative data includes data for a second type partition if the delta distances thereof are substantially the same up to another predetermined time repeatedly, when two kinds of first flags are set in a partition indicative data.

27. The apparatus claimed in claim 26, wherein when different flags representing types of scan lines are set in a bar width data or a space width data, which flag is-true may be determined by checking lengths of two successive characters adjacent to the partition to be scanned after the partition is scanned in the bar code.

28. The apparatus claimed in claim 23, wherein when different flags representing types of scan lines-are set in a bar width data or a-space width data, which flag is true may be determined by checking lengths of two successive characters adjacent to the partition to be scanned after the partition is scanned in the bar code.

29. The apparatus claimed in claim 17, wherein when different flags representing types of scan lines are set in a bar width data or a space width data, which flag is true may be determined by checking lengths of two successive characters adjacent to the partition to be scanned after the partition is scanned in the bar code.

30. An apparatus for reading a bar code having at least one code block of bars and spaces between the bars having respective widths and representing a plurality of characters and partitions of respective, different types flanked beside the block, comprising:

a scanned data reader reading a plurality of scanned data obtained by scanning a surface of the bar code with different scanning lines;

a storage unit storing the plurality of scanned data;

a first extracting unit extracting partially scanned data, obtained by scanning along separate scanning lines that pass through a partition and a part of a block adjacent to the partition in the bar code, from the plurality of scanned data stored in the storage unit;

a reproducing unit reproducing a plurality of partially decoded data from the partially scanned data;

a second extracting unit extracting a pair of partially decoded data, each having a number of character digits mutually overlapped and having respective different partitions;

a calculator calculating the number of character digits overlapped between the pair of extracted partially decoded data; and a synthesizing unit synthesizing the pair of decoded data when the calculated number of overlapped character digits is equal to or more than a determined value.

31. The apparatus claimed in claim 30, wherein the synthesizing unit determines whether the calculated number of the data representing the same character which exists in each of the pair of decoded data is equal to or more than the determined value and reads the bar code after synthesizing the pair of decoded data when the above determining result is affirmative.

32. The apparatus claimed in claim 31, wherein the determined value is set depending on a type of the bar code.

* * * * *

UNITED STATES PATENT AND TRADEMARK OFFICE
CERTIFICATE OF CORRECTION

PATENT NO.: 5,942,740
DATED : August 24, 199
INVENTOR(S): Mitsuo WATANABE et al.

It is certified that error appears in the above-identified patent and that said Letters Patent is hereby corrected as shown below:

Col. 39,     line 9, after "partition" delete ",";
               line 47, change "is-true" to --is true--.

Col. 40,     line 2, change "lines-are" to --lines are--;
               line 3, change "a-space" to --a space--.

Signed and Sealed this

Seventh Day of March, 2000

Attest:

Q. TODD DICKINSON

*Attesting Officer*      Commissioner of Patents and Trademarks